(12) United States Patent
Corella Ochoa et al.

(10) Patent No.: US 10,882,870 B2
(45) Date of Patent: Jan. 5, 2021

(54) CRYSTALLINE METAL ORGANIC FRAMEWORK

(71) Applicants: FUNDACIÓ INSTITUT CATALÀ D'INVESTIGACIÓ QUÍMICA (ICIQ), Tarragona (ES); INSTITUCIÓ CATALANA DE RECERCA I ESTUDIS AVANÇATS, Barcelona (ES)

(72) Inventors: Mª de las Nieves Corella Ochoa, El Masnou (ES); Vanesa Lillo García, Tarragona (ES); Jose Ramón Galán Mascaros, Valencia (ES)

(73) Assignees: FUNDACIÓ INSTITUT CATALÀ D'INVESTIGACIÓ QUÍMICA (ICIQ), Tarragona (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 0 days.

(21) Appl. No.: 16/340,637

(22) PCT Filed: Oct. 20, 2017

(86) PCT No.: PCT/EP2017/076816
§ 371 (c)(1),
(2) Date: Apr. 9, 2019

(87) PCT Pub. No.: WO2018/073400
PCT Pub. Date: Apr. 26, 2018

(65) Prior Publication Data
US 2019/0256528 A1    Aug. 22, 2019

(30) Foreign Application Priority Data
Oct. 21, 2016   (EP) ..................... 16382480

(51) Int. Cl.
*C07F 1/00*       (2006.01)
*B01D 53/02*      (2006.01)
(Continued)

(52) U.S. Cl.
CPC .............. *C07F 1/005* (2013.01); *B01D 53/02* (2013.01); *C07B 57/00* (2013.01);
(Continued)

(58) Field of Classification Search
CPC ....................................................... C07F 1/005
See application file for complete search history.

(56) References Cited

PUBLICATIONS

International Search Report and Written Opinion dated Jan. 23, 2018 for PCT/EP2017/076816, 12 pages.

(Continued)

*Primary Examiner* — Joseph R Kosack
(74) *Attorney, Agent, or Firm* — Squire Patton Boggs (US) LLP

(57) ABSTRACT

The present invention relates to a crystalline metal organic framework which comprises repeating units of formula (RR)-(IA) or (SS)-(IA) or (RS)-(IA) or (SR)-(IA); or alternatively of formula (RR)-(IB) or (SS)-(IB) or (RS)-(IB) or (SR)-(IB) and a composition containing it. It also relates to processes for their preparation and their uses as a separation agent and as a catalyst.

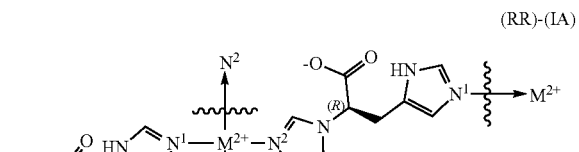

(RR)-(IA)

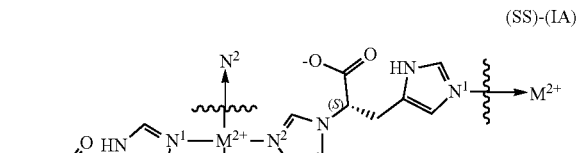

(SS)-(IA)

(RS)-(IA)

(Continued)

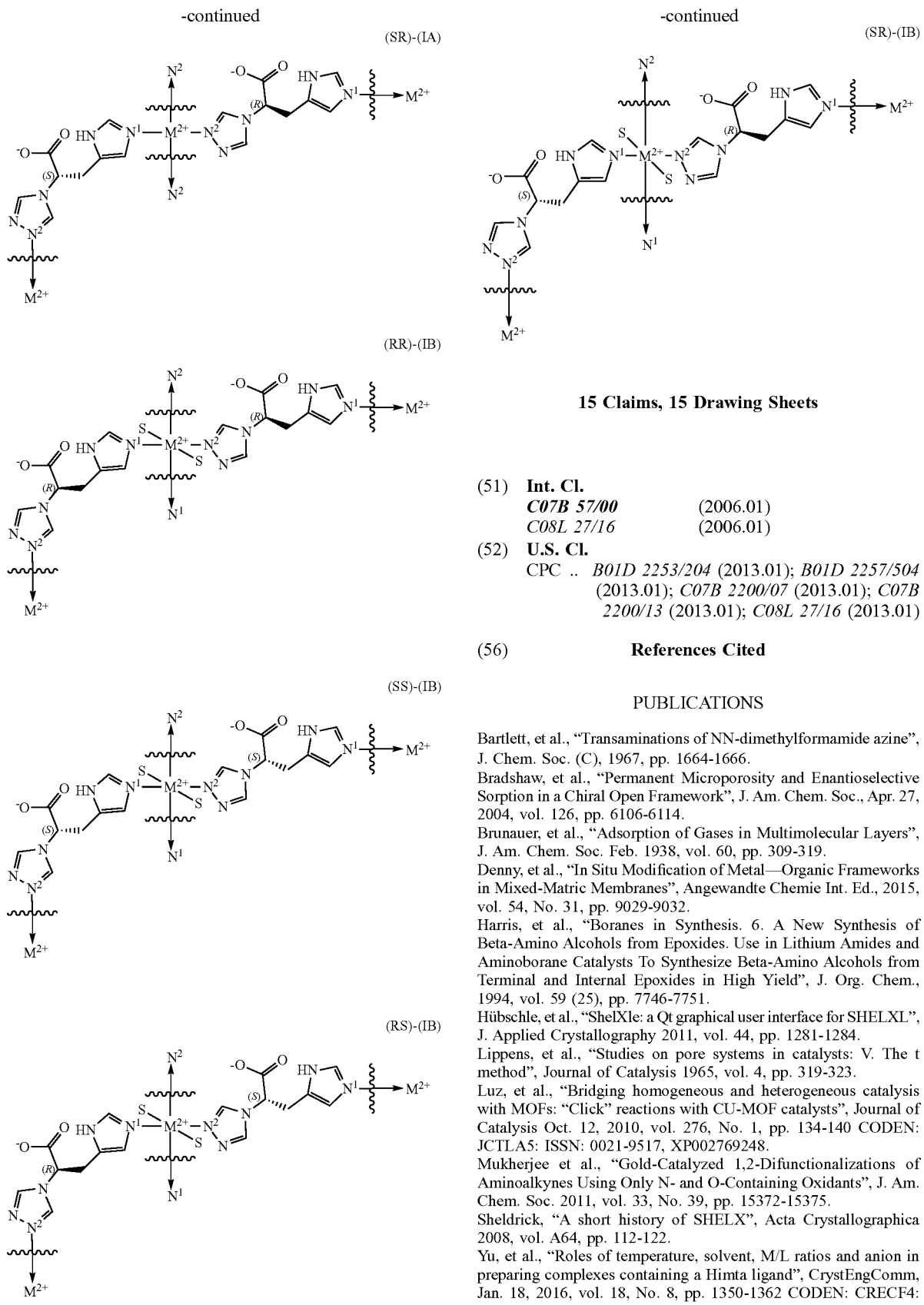

15 Claims, 15 Drawing Sheets

(51) Int. Cl.
 *C07B 57/00* (2006.01)
 *C08L 27/16* (2006.01)
(52) U.S. Cl.
 CPC .. *B01D 2253/204* (2013.01); *B01D 2257/504* (2013.01); *C07B 2200/07* (2013.01); *C07B 2200/13* (2013.01); *C08L 27/16* (2013.01)

(56) References Cited

PUBLICATIONS

Bartlett, et al., "Transaminations of NN-dimethylformamide azine", J. Chem. Soc. (C), 1967, pp. 1664-1666.
Bradshaw, et al., "Permanent Microporosity and Enantioselective Sorption in a Chiral Open Framework", J. Am. Chem. Soc., Apr. 27, 2004, vol. 126, pp. 6106-6114.
Brunauer, et al., "Adsorption of Gases in Multimolecular Layers", J. Am. Chem. Soc. Feb. 1938, vol. 60, pp. 309-319.
Denny, et al., "In Situ Modification of Metal—Organic Frameworks in Mixed-Matric Membranes", Angewandte Chemie Int. Ed., 2015, vol. 54, No. 31, pp. 9029-9032.
Harris, et al., "Boranes in Synthesis. 6. A New Synthesis of Beta-Amino Alcohols from Epoxides. Use in Lithium Amides and Aminoborane Catalysts To Synthesize Beta-Amino Alcohols from Terminal and Internal Epoxides in High Yield", J. Org. Chem., 1994, vol. 59 (25), pp. 7746-7751.
Hübschle, et al., "ShelXle: a Qt graphical user interface for SHELXL", J. Applied Crystallography 2011, vol. 44, pp. 1281-1284.
Lippens, et al., "Studies on pore systems in catalysts: V. The t method", Journal of Catalysis 1965, vol. 4, pp. 319-323.
Luz, et al., "Bridging homogeneous and heterogeneous catalysis with MOFs: "Click" reactions with CU-MOF catalysts", Journal of Catalysis Oct. 12, 2010, vol. 276, No. 1, pp. 134-140 CODEN: JCTLA5: ISSN: 0021-9517, XP002769248.
Mukherjee et al., "Gold-Catalyzed 1,2-Difunctionalizations of Aminoalkynes Using Only N- and O-Containing Oxidants", J. Am. Chem. Soc. 2011, vol. 33, No. 39, pp. 15372-15375.
Sheldrick, "A short history of SHELX", Acta Crystallographica 2008, vol. A64, pp. 112-122.
Yu, et al., "Roles of temperature, solvent, M/L ratios and anion in preparing complexes containing a Himta ligand", CrystEngComm, Jan. 18, 2016, vol. 18, No. 8, pp. 1350-1362 CODEN: CRECF4: ISSN: 1466-8033, XP002769247.

CRYSTALLINE METAL ORGANIC FRAMEWORK

The present invention relates to the field of the metal organic frameworks. Particularly, it relates to a crystalline metal organic framework, a composition comprising them, and processes for their preparation. It also relates to their uses as a separation agent; and also as catalyst.

BACKGROUND ART

Metal organic frameworks, also named MOFs, are coordination compounds formed by repeating (coordination) units (or entities) in one, two or three-dimensions, and forming a porous network. Particularly, the repeating (coordination) units are formed by two major components, a metal ion and an organic compound that is used as a ligand.

The potential application of MOFs is a direct consequence of their three-dimensional structure and, particularly, of the topology and dimensions of the pores. There are several variables that can affect the structure of MOFs, which leads to high specific surface area of these materials. The selection of the metal and the organic ligand can hinder the crystallographic parameters of the MOF. In comparison to the amorphous porous substances that exhibit a low mechanical stability due to their variable channel structures and topologies; ordered porous MOFs having the repeating crystalline units formed by a metal ion and an organic compound commonly have a high mechanical and thermal stability.

MOFs are highly porous materials. It is precisely this property that renders them ideal for a lot of applications. Over the last years, crystalline MOFs have been used in many technical fields. For example, they have been used in storage, separation/purification or controlled release of gases such as hydrogen and carbon dioxide. MOFs have been also disclosed for the controlled release of active ingredients and also for the catalysis and asymmetric synthesis of organic compounds.

Since MOF's properties and applications usually depend on their composition and structure, novel MOFs with unique features are of great interest because they can find unprecedented properties and applications.

For instance, Yu and co-workers disclose the preparation of MOFs based on metals such as copper, lead, manganese, zinc, cobalt, and cadmium coordinated to N-heterocyclic carboxylic acid ligands being the ligand (2-[4-(1H-imidazole-1-ylmethyl)-1H-1,2,3-triazoly-1-yl]acetic acid. Furthermore, it is also disclosed that such MOFs exhibit certain fluorescence properties, which make them suitable only as optical materials. However, the authors are silent about the use of these materials in other applications (cf. Yu, Tiantian et al. "Roles of temperature, solvent, M/L ratios and anion in preparing complexes containing a Himta ligand". CrystEngComm, 2016, vol 18, pp. 1350-1362)

Thus, even though a considerable improvement has been made in the art in the preparation of MOFs having appropriate stability and activity, there is still the need to develop more active and versatile MOFs.

SUMMARY OF THE INVENTION

The inventors have found crystalline MOFs that comprise repeating units that have two ligands $L_1^-$, which can be the same or different, and where each one of the ligands $L_1^-$ is an anion selected from the group consisting of (R)-(imidazole-5-ylmethyl)-(1,2,4-triazol-4-yl)acetate of formula (R)-(II); (S)-(imidazole-5-ylmethyl)-(1,2,4-triazol-4-yl)acetate of formula (S)-(II) coordinated to a divalent metal cation ($M^{2+}$), wherein the carboxylate group of the anion $L_1^-$ is deprotonated but not coordinated to the divalent metal cation and that not only are stable and crystalline but also have multiple anchor sites and the appropriate architecture of pores and channels, which provides them a high and selective separation capability and catalytic activity. Particularly, the inventors have found enantiomerically enriched MOFs that comprise repeating units that have two ligands $L_1^-$ coordinated to a divalent metal cation ($M^{2+}$), where both $L_1^-$ are the same and represent an anion selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II).

In this regard, the specific three-dimensional structure of the MOFs of the invention which comprise repeating units of formula (IA), or alternatively of formula (IB) as defined below are useful as separation agent because they allow a high and selective separation of both gases and liquids; such as for example mixtures of several gases, or mixtures of several liquids, or mixtures of several gases and liquids. Particularly, they allow the separation of gases, such as carbon dioxide, maintaining high permeability at constant temperature (in these conditions, no significant amount of gas is trapped and therefore, its separation occurs through different permeability), which advantageously allows performing a continuous separation process by selective adsorption/desorption processes. This selectivity towards carbon dioxide uptake can also be advantageous for the development of devices for the detection of a particular analyte such as for example carbon dioxide (i.e. sensors).

Furthermore, the specific three-dimensional structure of the MOFs of the invention which comprise repeating units of formula (IA) or alternatively of formula (IB) as defined below are also useful as separation agent because they allow the enantioselective separation of a mixture of enantiomers of a chiral compound, particularly when both $L_1^-$ are identical in the repeating unit of the MOF of the invention.

On the other hand, the enantiomerically enriched MOFs of the present invention are also useful as heterogeneous catalysts for a broad range of chemical reactions including hydrogenation and asymmetric reactions. Particularly, they are advantageous because they allow performing the asymmetric reactions under mild reaction conditions without additional treatments. Furthermore, the MOFs of the invention are also advantageous because of their easy post-reaction separation, catalyst reusability (recycling), and high stability; as well as high efficiency and selectivity.

Thus, an aspect of the invention relates to a crystalline metal organic framework which comprises repeating units of formula (IA), or alternatively a crystalline metal organic framework which comprises repeating units of formula (IB), comprising a metal $M^{2+}$ and two ligands $L_1^-$

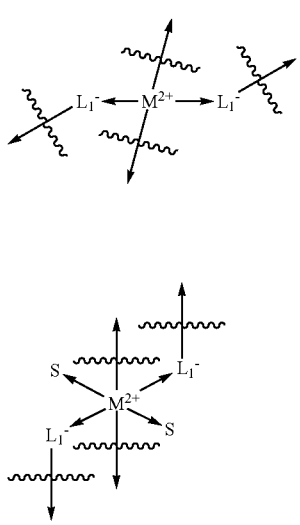

(IA)

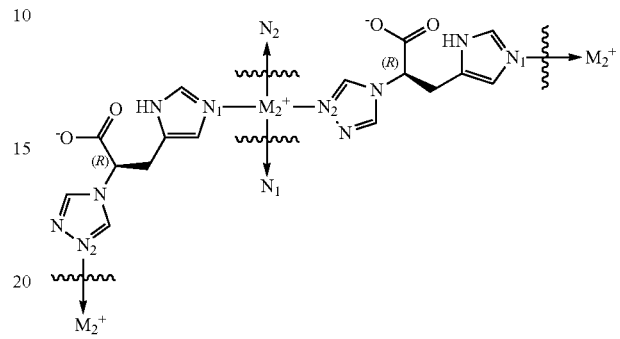

(IB)

wherein:

the two ligands $L_1^-$ can be the same or different, $M^{2+}$ is a divalent metal cation, each $L_1^-$ is an anion independently selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II);

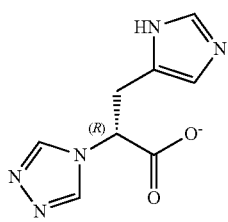

(R)-(II)

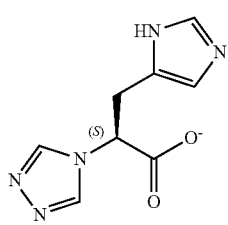

(S)-(II)

in the repeating unit of formula (IB), the metal M is coordinated to two solvent molecules S, both S are equal and are a solvent molecule selected from the group consisting of water, methanol, ethanol, isopropanol, tert-butanol, diethyl ether, 1-4 dioxane, tetrahydrofurane, N,N-dimethylformamide, acetonitrile, acetone, 1,2-ethyleneglycol, dimethylsulfoxide and pyridine, → represents a coordination bond

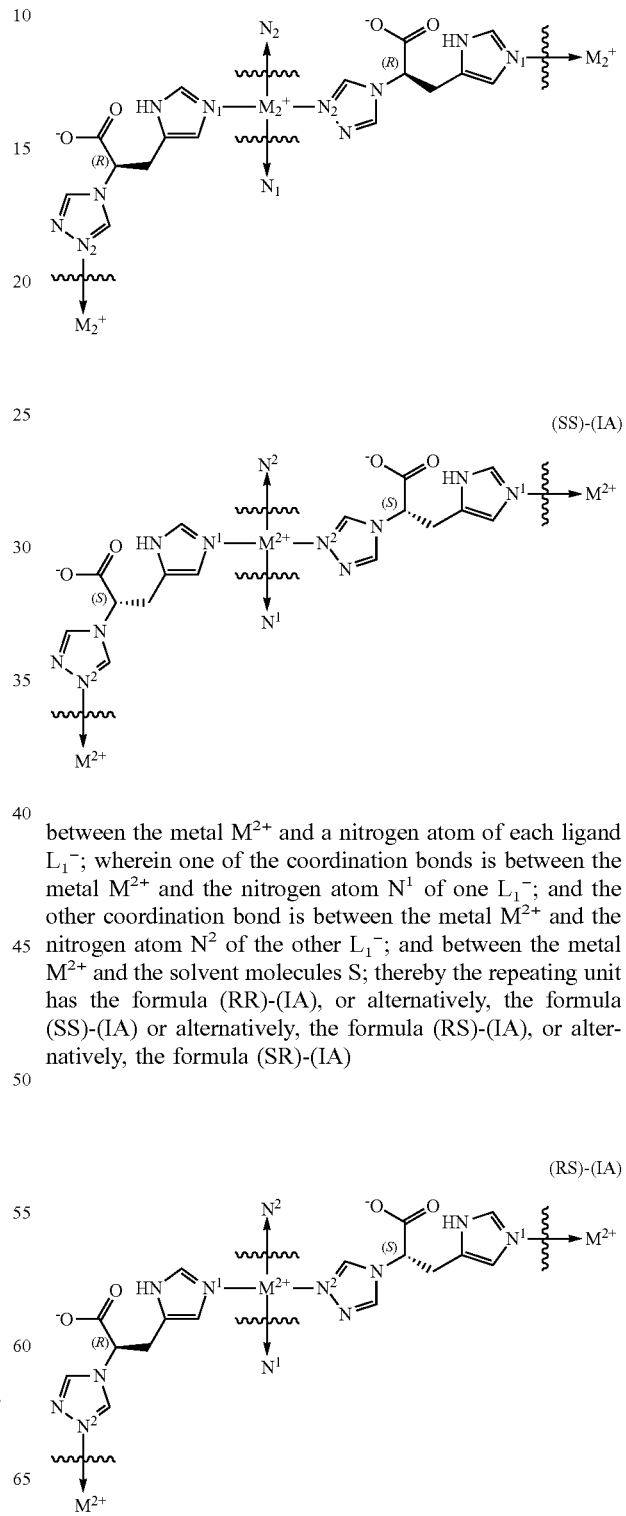

between the metal $M^{2+}$ and a nitrogen atom of each ligand $L_1^-$; wherein one of the coordination bonds is between the metal $M^{2+}$ and the nitrogen atom $N^1$ of one $L_1^-$; and the other coordination bond is between the metal $M^{2+}$ and the nitrogen atom $N^2$ of the other $L_1^-$; and between the metal $M^{2+}$ and the solvent molecules S; thereby the repeating unit has the formula (RR)-(IA), or alternatively, the formula (SS)-(IA) or alternatively the formula (RS)-(IA), or alternatively, the formula (SR)-(IA)

-continued (SR)-(IA)

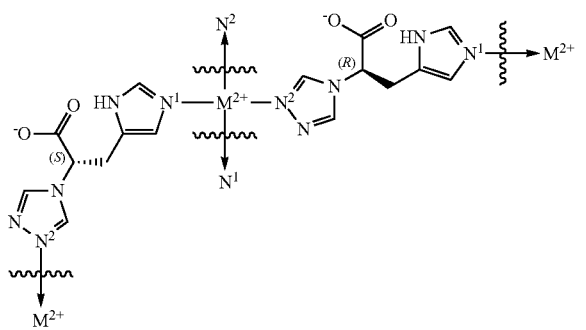

or alternatively, the formula (RR)-(IB), or alternatively, the formula (SS)-(IB)

(RR)-(IB)

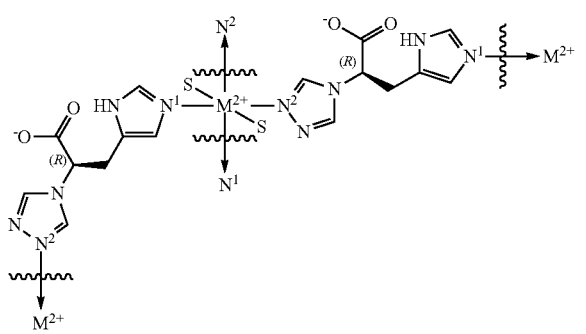

(SS)-(IB)

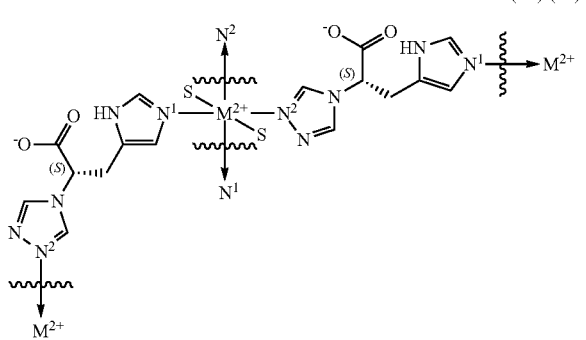

or alternatively, the formula (RS)-(IB), or alternatively, the formula (SR)-(IB)

(RS)-(IB)

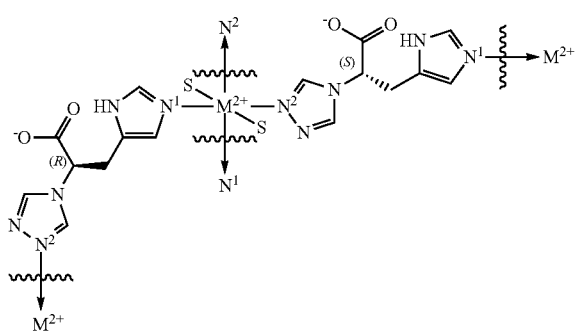

-continued (SR)-(IB)

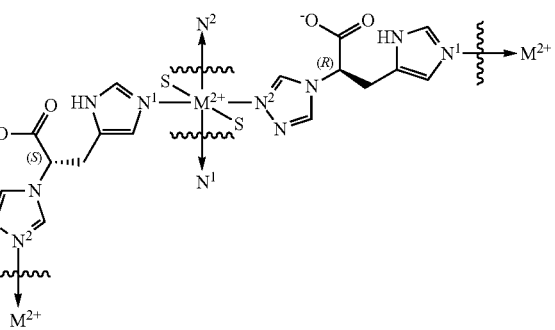

wherein each repeating unit in the metal organic framework is connected to other repeating units in such a way that the metal $M^{2+}$ of one repeating unit is connected to two additional repeating units of formula (IA), or alternatively of formula (IB), through coordination bonds represented by between the metal $M^{2+}$ of the first repeating unit and the nitrogen atoms of the ligands $L_1^-$ of the additional repeating units, wherein one of the additional coordination bonds is between the metal $M^{2+}$ of the first repeating unit and the nitrogen atom $N^1$ of an $L_1^-$ of an additional repeating unit; and the other additional coordination bond is between the metal $M^{2+}$ of the first repeating unit and the nitrogen atom $N^2$ of an $L_1^-$ of another additional repeating unit.

In this respect, the MOFs of the invention are built from square planar, pyramidal or octahedral divalent metal centres coordinated by coordination bonds to four nitrogen atoms from four molecules of the enantiomerically enriched ligand $L_1^-$, and, eventually, to two solvent molecules. Furthermore, the carboxylate group of the anion $L_1^-$ is deprotonated but not coordinated to the divalent metal cation. Specifically, each ligand $L_1^-$ is connected with two divalent metal cations by the nitrogen atom at position 1 of the imidazole moiety (named nitrogen $N^1$) and by the nitrogen atom at position 2 of the triazole moiety (named nitrogen $N^2$) as it is shown in the repeating unit of formula (RR)-(IA) or (RR)-(IB); or alternatively of formula (SS)-(IA) or (SS)-(IB); or alternatively of formula (RS)-(IA) or (RS)-(IB); or alternatively of formula (SR)-(IA) or (SR)-(IB) as defined above.

The second aspect of the invention relates to a process for the preparation of a metal organic framework as defined in the first aspect of the invention having repeating units of formula (RR)-(IB); or alternatively of formula (SS)-(IB), or alternatively of formula (RS)-(IB); or alternatively of formula (SR)-(IB) which comprises: (a) adding a solution of a solvent S as defined in the first aspect of the invention and a salt of formula $MA_2$ to a solution of a solvent S as defined in the first aspect of the invention and of the compound (R)-(imidazol-5-ylmethyl)-(1,2,4-triazol-4-yl)acetic acid of formula (R)-(III) or alternatively, of the compound (S)-(imidazol-5-ylmethyl)-(1,2,4-triazol-4-yl)acetic acid of formula (S)-(III);

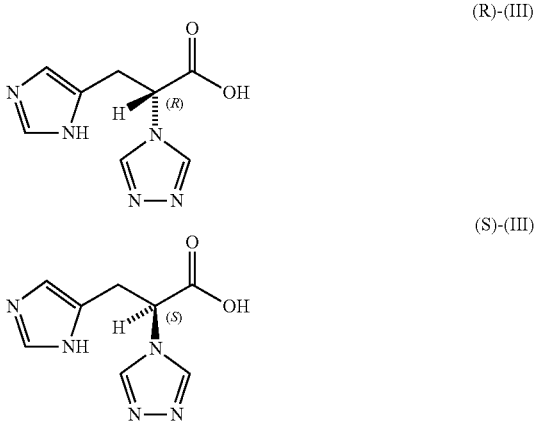

or alternatively, of a mixture of the compound (R)-(imidazol-5-ylmethyl)-(1,2,4-triazol-4-yl)acetic acid of formula (R)-(III) and (S)-(imidazol-5-ylmethyl)-(1,2,4-triazol-4-yl) acetic acid of formula (S)-(III); wherein the pH of the aqueous solution of the compound of formula (R)-(III); or alternatively, of the compound of formula (S)-(III); or alternatively of the mixture of formula (R)-(III) and (S)-(III) is comprised from 4 to 7; (b) maintaining the solution obtained in step (a) at a temperature comprised from 20° C. to 35° C. for the necessary period of time to crystallize the metal organic framework; and (c) isolating the metal organic framework thus obtained, wherein: M is the divalent metal cation $M^{2+}$ as defined in the first aspect of the invention; and A is a monovalent anion $A^-$ selected from the group consisting of an organic anion and an inorganic anion.

The third aspect of the invention relates to a process for the preparation of a metal organic framework as defined in the first aspect of the invention having repeating units of formula (RR)-(IA) or alternatively, of formula (SS)-(IA) or alternatively, of formula (RS)-(IA); or alternatively, of formula (SR)-(IA) which comprises: (d) submitting the metal organic framework having repeating units of formula (RR)-(IB); or alternatively of formula (SS)-(IB), or alternatively of formula (RS)-(IB); or alternatively of formula (SR)-(IB) at such reaction conditions to remove at least both solvent molecules S as defined in the first aspect of the invention.

The fourth aspect of the invention relates to a process for the preparation of a metal organic framework as defined in the first aspect of the invention having repeating units of formula (RR)-(IB) or alternatively, of formula (SS)-(IB) or alternatively, of formula (RS)-(IB) or alternatively, of formula (SR)-(IB) which comprises: (f) contacting the metal organic framework having repeating units of formula (RR)-(IA) or alternatively, of formula (SS)-(IA) or alternatively, of formula (RS)-(IA) or alternatively, of formula (SR)-(IA) with the appropriate amount of S as defined in the first aspect of the invention under such reaction conditions to coordinate two solvent molecules S.

The fifth aspect of the invention relates to a composition comprising a metal organic framework as defined in the first aspect of the invention and one or more carriers.

The sixth aspect of the invention relates to the use of the metal organic framework as defined in the first aspect of the invention, or alternatively of the composition as defined in the fifth aspect of the invention as separation agent; or alternatively as a catalyst.

DETAILED DESCRIPTION OF THE INVENTION

Figure 1:
FIG. 1 shows the three-dimensional representation of the repeating unit of formula (SS)-(IB1'). The white circle represents hydrogen, the black circle represents carbon, the crossed circle represents the nitrogen, the circle with the left half black represents oxygen, and the circle with the upper left quadrant black and the bottom right quadrant black represent copper.
Figure 2:
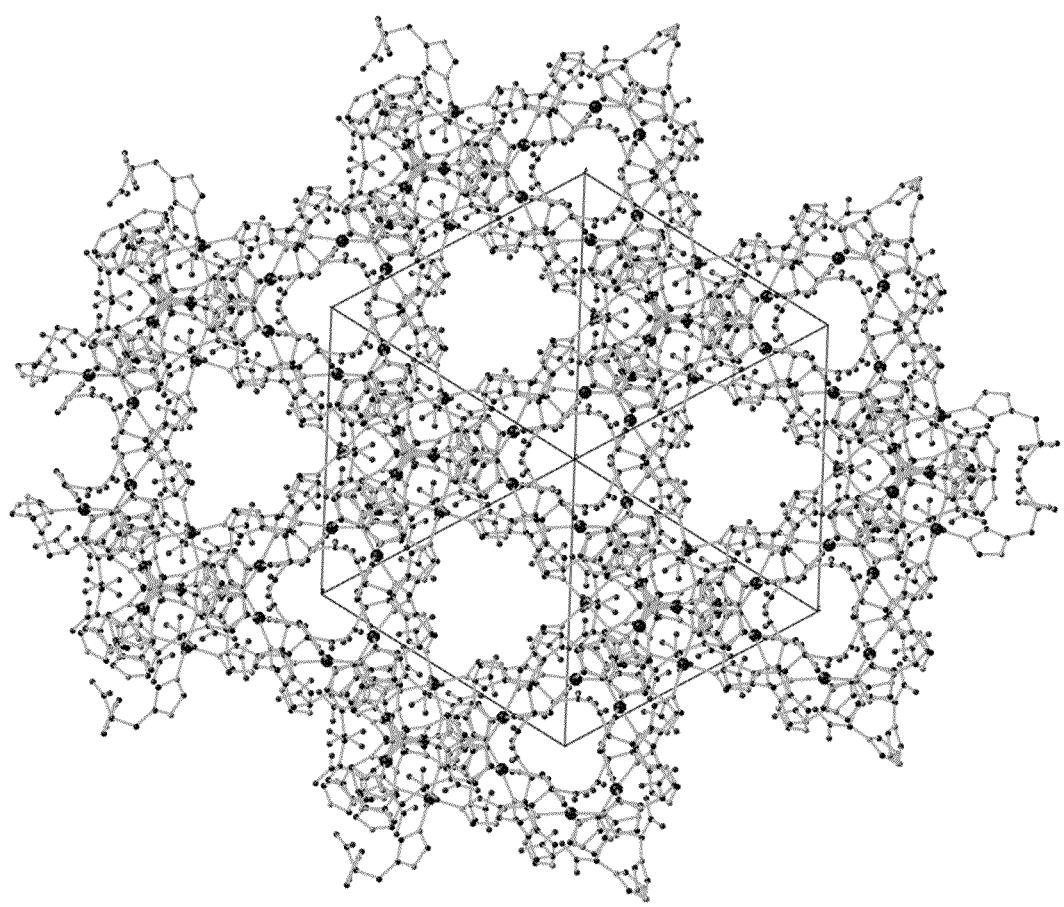
FIG. 2 shows the crystal structure representation of the MOF of the invention having repeating units of formula (SS)-(IB1'). The water molecules and hydrogen atoms have been omitted for clarity.

All terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition.

For the purposes of the invention, any ranges given include both the lower and the upper end-points of the range. Ranges given, such as temperatures, times, and the like, should be considered approximate, unless specifically stated.

Crystallization is a process of formation of solid crystals from a homogeneous solution that involves a chemical solid-liquid separation technique, in which mass transfer of a solute from the liquid solution to a pure crystalline solid phase occurs. The term "crystal" or "crystalline" or "crystalline solid" or "crystal solid form" is a solid material whose constituents are arranged in a highly ordered microscopic structure, forming a crystal lattice that extends in all directions. In addition, macroscopic single crystals are usually identifiable by their geometrical shape, consisting of flat faces with specific, characteristic orientations.

The terms "enantiomerically enriched" or "chiral" or "non-racemic" have the same meaning and are used interchangeable. They refer to a composition of a chiral compound containing an enantiomer in a ratio greater than 50:50. The term "enantiomeric ratio" refers to the ratio of the percentage of one enantiomer in a mixture to that of the other enantiomer. The purity of a chiral compound is measured by the "enantiomeric excess" (abbreviated as ee). The term "enantiomeric excess" refers to the difference between the amounts of each of the enantiomers present in a mixture, relative to the total amount of the compound in the mixture expressed as percentage (×100%). In the context of the invention, a "crystalline enantiomerically enriched metal organic framework" refers to a metal organic framework where both ligands $L_1^-$ are identical.

The term "percentage (%) by weight of the total weight of the composition" refers to the percentage of each compound in relation to the total weight of the composition.

The expressions "obtainable", "obtained" and equivalent expressions are used interchangeably, and in any case, the expression "obtainable" encompasses the expression "obtained".

The term "alcohol" refers to a hydrocarbon derivative in which one or more hydrogen atoms have been replaced by one or more —OH group. The term alcohol also includes glycol compounds. Examples of appropriate alcohols for the present invention include, but are not limited to, methanol, ethanol, 2-propanol (i.e., isopropanol), or n-propanol.

The term "alkyl" refers to a linear or branched saturated hydrocarbon radical which contains the number of carbon atoms specified in the description or the claims.

The term "alkane" refers to a saturated, branched or linear saturated hydrocarbon which contains the number of carbon atoms specified in the description or claims. Examples include methane, ethane, propane, isopropane, butane, isobutane, sec-butane, and tert-butane.

The term "alkene" or "olefin" have the same meaning and are used interchangeably. They refer to a branched or linear hydrocarbon which contains the number of carbon atoms specified in the description or claims, and that also contains at least one double bond. Examples include, among others, ethenyl, 1-propen-1-yl, 1-propen-2-yl, 3-propen-1-yl, 1-buten-1-yl, 1-buten-2-yl, 3-buten-1-yl, 3-buten-2-yl, 2-buten-1-yl, 2-buten-2-yl, 2-methyl-1-propen-1-yl, 2-methyl-2-propen-1-yl, 1,3-butadien-1-yl, and 1,3-butadien-2-yl.

The term "room temperature" refers to a temperature comprised from 20° C. to 25° C.

When values of characteristic peaks of an X-ray diffractogram are given it is said that these are "approximate" values. It should be understood that the values are the ones shown in the corresponding lists or tables ±0.3 degrees 2 theta measured in an X-ray diffractometer with Cu-$K_\alpha$ radiation $\lambda=1.5406*10^{-10}$ m (Å).

For the purpose of the invention, the terms "coordination bond" or "dative covalent bond(ing)" have the same meaning and are used interchangeably.

In the context of the invention, a coordination bond is a bond formed between an atom of a ligand and a metal atom, said two atoms sharing a pair of electrons, and wherein both electrons come from a lone pair of the atom comprised in the ligand.

As it is mentioned above, the first aspect of the invention relates to MOFs which comprise repeating units of formula (IA), or, alternatively of formula (IB) comprising a metal $M^{2+}$ and two ligands $L_1^-$ of the formula (R)-(II) or alternatively, of the formula (S)-(II).

As it was disclosed above, the MOFs of the invention are crystalline compounds. For the purposes of the invention it means that the MOF can contain small amounts of non-crystalline fractions. Particularly, the MOFs as defined above may contain equal to or less than 1% of non-crystalline fractions; more particularly equal to or less than 0.5% of non-crystalline fractions; even more particularly, equal to or less than 0.25% of non-crystalline fractions; and even much more particularly equal to or less than 0.1% of non-crystalline fractions.

In an embodiment, optionally in combination with one or more features of the various embodiments described above or below, the MOFs of the invention are essentially free of other crystalline forms. It means that no other crystalline forms of the MOF are detectable by X-ray powder diffraction measurement when using a X-ray diffractometer with Cu-$K_\alpha$ radiation $\lambda=1.5406*10^{-10}$ m (Å).

Figure 8:
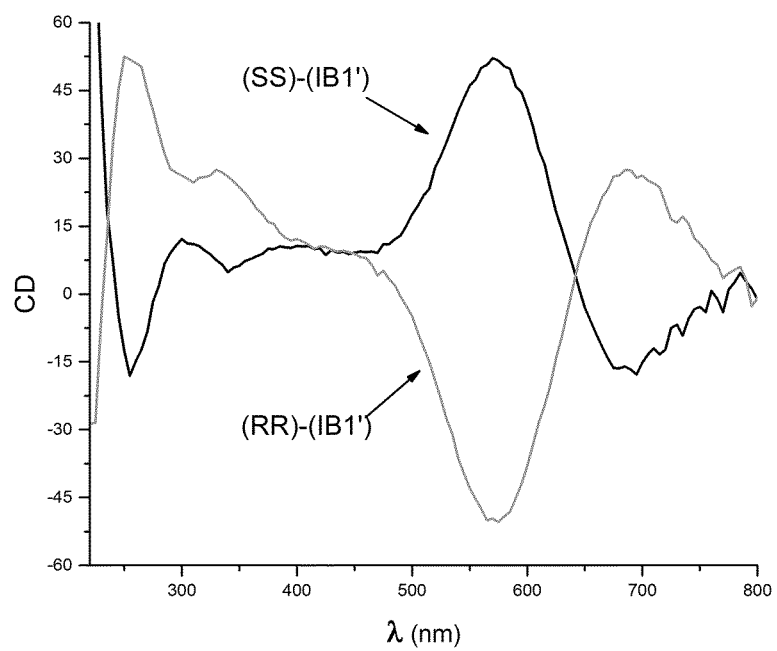
FIG. 8 shows the Circular Dichroism spectra (CD) of the MOFs of the invention having repeating units of formula (SS)-(IB1') and (RR)-(IB1'). The curves express the circular dichroism (deg·cm²/dmol) versus the wavelength (nm).

As it is shown in FIG. 8, certain MOFs of the invention are also enantiomerically enriched compounds. In an embodiment, the MOF of the invention has an enantiomeric excess of more than 50%, preferably equal to or higher than 70%, more preferably equal to or higher than 80%, even more preferably equal to or higher than 90% and most preferably equal to or higher than 95%. In a particular embodiment, the MOFs of the invention are "enantiopure" having an enantiomeric excess equal to or higher than 95%; preferably equal to or higher than 98%; more preferably equal to or higher than 99%; even more preferably equal to or higher than 99.5%. The enantiomeric excess of the MOF, as used herein, is directly related to the enantiomeric excess of $L_1$ in the repeating unit.

In an embodiment, optionally in combination with one or more features of the various embodiments described above or below, the MOF is one wherein M is a divalent metal usually employed for the preparation of MOFs. Non-limiting metals are those from chemical elements being a divalent metal cations such as for example: alkaline earth metals (Be, Mg, Ca, Sr, Ba, Ra), transition metals (Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg) and post-transition metals (Al, Ga, In, Tl, Sn, Pb, Bi). Unusual metals not mentioned above or newly discovered having oxidation state (II) and tetra-, penta- or hexa-coordination modes could be also used in the invention. In an embodiment, optionally in combination with one or more features of the various embodiments described above or below, the MOF is one wherein the metal is selected from the group consisting of $Cu^{2+}$, $Zn^{2+}$, $V^{2+}$, $Pd^{2+}$, $Pt^{2+}$, $Ni^{2+}$, $Ru^{2+}$, $Hg^{2+}$, $Sn^{2+}$, $Co^{2+}$, $Fe^{2+}$, $Mn^{2+}$, $Cr^{2+}$, $Cd^{2+}$, $Be^{2+}$, $Mg^{2+}$, $Ca^{2+}$, $Ba^{2+}$, $Zr^{2+}$, $Gd^{2+}$, $Eu^{2+}$, $Tb^{2+}$ and mixtures thereof. In an embodiment, optionally in combination with one or more features of the various embodiments described above or below, the MOF is one wherein the metal is selected from the group consisting of $Cu^{2+}$, $Zn^{2+}$, $V^{2+}$, $Pd^{2+}$, $Pt^{2+}$, $Ni^{2+}$, $Co^{2+}$, $Fe^{2+}$, $Mn^{2+}$, $Cr^{2+}$ and $Cd^{2+}$. In an embodiment, optionally in combination with one or more features of the various embodiments described above or below, the MOF is one wherein the metal is selected from the group consisting of $Cu^{2+}$, $V^{2+}$, $Pd^{2+}$, $Pt^{2+}$, $Ni^{2+}$, $Mn^{2+}$, and $Cr^{2+}$. In an embodiment, optionally in combination with one or more features of the various embodiments described above or below, the MOF is one wherein the metal is selected from the group consisting of $Cu^{2+}$, $Ni^{2+}$, $Mn^{2+}$, and $Cr^{2+}$. In an embodiment, optionally in combination with one or more features of the various embodiments described above or below, the MOF is one wherein the metal is $Cu^{2+}$.

In an embodiment, optionally in combination with one or more features of the various embodiments described above or below, the crystalline metal organic framework is an enantiomerically enriched metal organic framework wherein both $L_1^-$ are equal and are an anion selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II); and thereby the repeating unit has the formula (RR)-(IA), or alternatively, the formula (SS)-(IA);

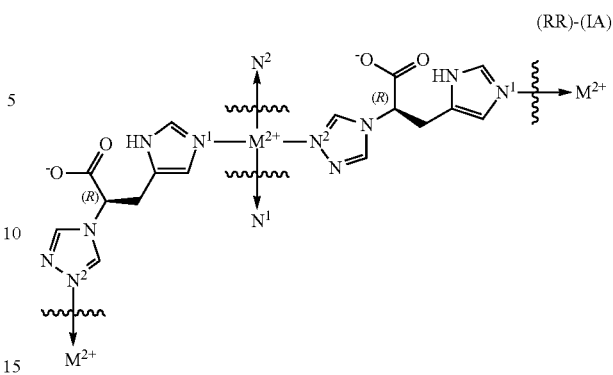

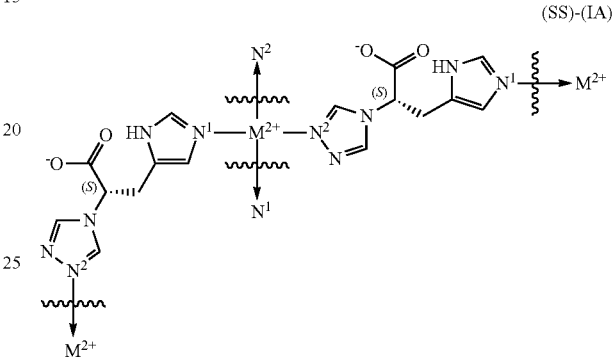

or alternatively the formula (RR)-(IB), or alternatively, the formula (SS)-(IB)

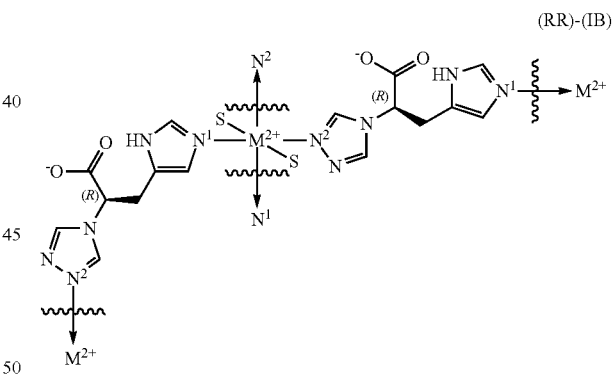

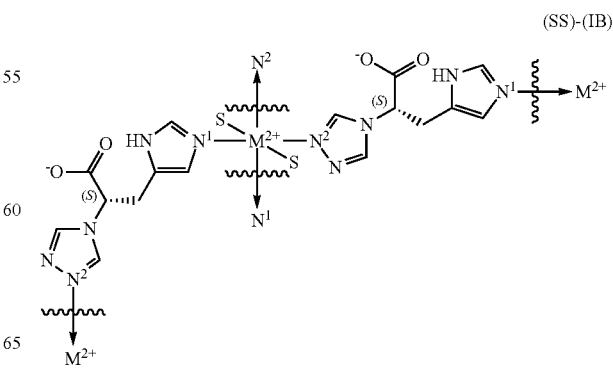

being M²⁺, S,

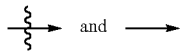

as defined above.

In an alternative of the first aspect of the invention, the crystalline enantiomerically enriched metal organic framework is one having repeating units of formula (RR)-(IB) or alternatively of formula (SS)-(IB), which comprises a metal $M^{2+}$ coordinated to two solvent molecules S and two ligands $L_1^-$. In the above mentioned MOF of the invention which have repeating units of formula (RR)-(IB) or alternatively of formula (SS)-(IB), the two solvent molecules occupy the axial positions, and the $N^1$ and $N^2$ atoms occupying the four equatorial positions. It means that the empty space of the MOFs structure is filled by solvent molecules S, without any further structural modification. These MOFs are especially advantageous because they are stable under the storage and transport conditions and also maintain their activity as a separation agent and as a catalyst.

For the purpose of the invention, the terms "MOF having repeating units of formula (RR)-(IB) or (SS)-(IB) or (RS)-(IB) or (SR)-(IB)", "as-made MOF", and "as synthesized MOF" have the same meaning and are used interchangeably. They refer to a MOF having repeating units of formula (IB) comprising a metal $M^{2+}$ coordinated to two solvent molecules S, and two ligands $L_1^-$.

In an embodiment, optionally in combination with one or more features of the various embodiments described above or below, the MOF is one having repeating units of formula (SS)-(IB), or alternatively of formula (RR)-(IB) and both S are a solvent selected from the group consisting of water, methanol, ethanol, isopropanol, tert-butanol, diethyl ether, 1,4 dioxane, tetrahydrofurane, N,N-dimethylformamide, acetonitrile, acetone, 1,2-ethyleneglycol, dimethylsulfoxide and pyridine; preferably both S are water.

In an embodiment, optionally in combination with one or more features of the various embodiments described above or below, the MOF is one having repeating units of formula (SS)-(IB), or alternatively of formula (RR)-(IB) wherein the metal is selected from the group consisting of $Cu^{2+}$, $V^{2+}$, $Pd^{2+}$, $Pt^{2+}$, $Ni^{2+}$, $Mn^{2+}$, and $Cr^{2+}$. In an embodiment, optionally in combination with one or more features of the various embodiments described above or below, the MOF is one having repeating units of formula (SS)-(IB), or alternatively of formula (RR)-(IB) wherein the metal is selected from the group consisting of $Cu^{2+}$, $Ni^{2+}$, $Mn^{2+}$, and $Cr^{2+}$. In an embodiment, optionally in combination with one or more features of the various embodiments described above or below, the MOF is one having repeating units of formula (SS)-(IB), or alternatively of formula (RR)-(IB) wherein the metal is $Cu^{2+}$.

In an embodiment, optionally in combination with one or more features of the various embodiments described above or below, the MOF is one wherein $M^{2+}$ is $Cu^{2+}$ and thereby the repeating units has the formula (RR)-(IB1):

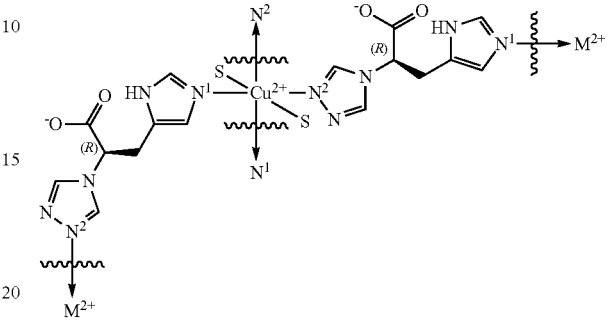

(RR)-(IB1)

or alternatively, the MOF is one wherein $M^{2+}$ is $Cu^{2+}$ and thereby the repeating unit has the formula (SS)-(IB1):

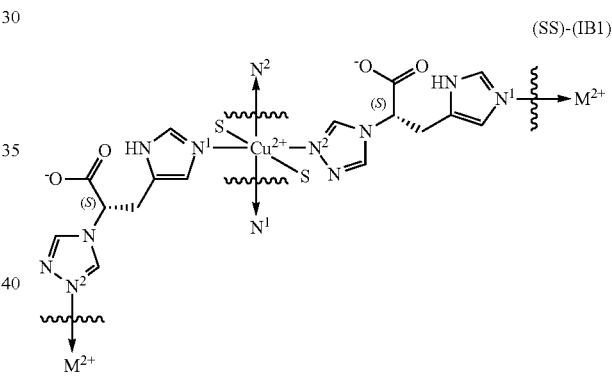

(SS)-(IB1)

being

and as

defined above.

In an embodiment, optionally in combination with one or more features of the various embodiments described above or below, the MOF is one wherein $M^{2+}$ is $Cu^{2+}$, both S are water, and thereby the repeating units has the formula (RR)-(IB1'):

(RR)-(IB1')

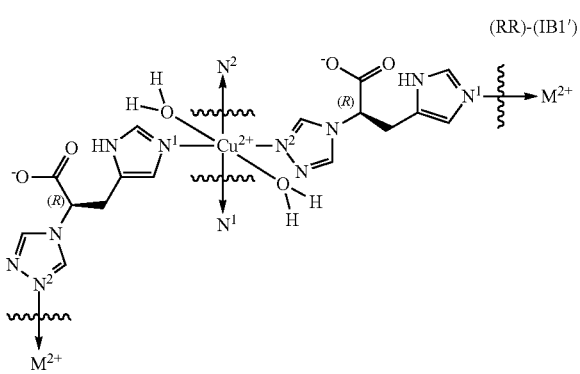

or alternatively, the MOF is one wherein $M^{2+}$ is $Cu^{2+}$, both S are water, and thereby the repeating unit has the formula (SS)-(IB1'):

(SS)-(IB1')

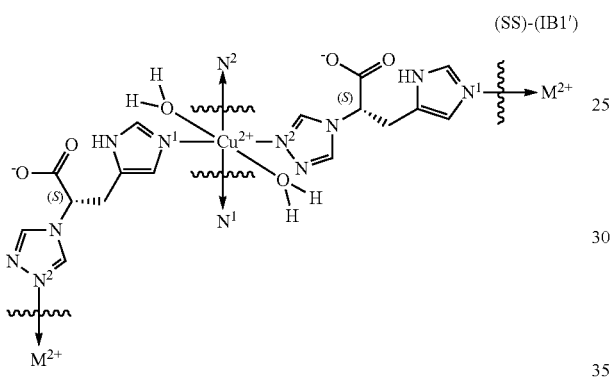

being

and as

defined above.

In an embodiment, the metal organic framework is one wherein the repeating unit has the formula (SS)-(IB1') and the metal organic framework has a X-ray diffractogram that comprises characteristic peaks at 6.2, 7.6, 9.8, 10.7, 14.5, 15.2, 17.6, 18.1, 19.2, 19.7, 20.2, 20.6, 22.5, 22.9, 23.7, 24.2, 26.1, 27.2, 28.3, 30.0, 32.6, 33.2, 33.5, 34.1, 35.0 and 37.0±0.2 degrees 2 theta measured in an X-ray diffractometer with Cu $K_\alpha$ radiation (1.5406*10$^{-10}$ m(Å)). In an embodiment, the MOF of the invention having repeating units of formula (SS)-(IB1') is characterized by having an X-ray diffractogram that further comprises characteristic peaks at 12.4, 13.2, 13.9, 15.8, 16.4, 18.6, 24.9, 25.3, 26.5, 28.6, 29.0, 29.4, 30.7, 31.0, 31.3, 31.7, 32.3, 34.7, 35.6, 35.9, 36.1, 36.7, 37.3, 38.1, 38.6, 39.1 and 39.4±0.2 degrees 2 theta measured in an X-ray diffractometer with Cu $K_\alpha$ radiation (1.5406*10$^{-10}$ m (Å)).

More specifically, the MOF of the invention having repeating units of formula (SS)-(IB1') is characterized by exhibiting in the powder X-ray diffractogram a pattern of peaks, expressed in 2 theta units in degrees, 2θ (°), which is shown in Table 1.

TABLE 1

List of characteristic peaks obtained (with relative intensity over 0.1% with respect to the maximum diffraction peak) by X-ray diffractogram of the MOF of the invention having repeating units of (SS)-(IB1'):

| Pos. [°2 Theta] | Re. Int. [%] |
| --- | --- |
| 6.2 | 100 |
| 7.6 | 1.2 |
| 9.8 | 2.4 |
| 10.7 | 6 |
| 12.4 | 0.2 |
| 13.2 | 0.2 |
| 13.9 | 0.6 |
| 14.5 | 5.4 |
| 15.2 | 4 |
| 15.8 | 0.4 |
| 16.4 | 0.1 |
| 17.6 | 1.4 |
| 18.1 | 4.2 |
| 18.6 | 0.4 |
| 19.2 | 8.7 |
| 19.7 | 1.8 |
| 20.2 | 4.6 |
| 20.6 | 2.6 |
| 22.5 | 2.8 |
| 22.9 | 1 |
| 23.7 | 1.4 |
| 24.2 | 5 |
| 24.9 | 0.2 |
| 25.3 | 0.9 |
| 26.1 | 1.2 |
| 26.5 | 0.2 |
| 27.2 | 6.1 |
| 28.3 | 1.4 |
| 28.6 | 0.7 |
| 29.0 | 0.3 |
| 29.4 | 0.6 |
| 30.0 | 1.2 |
| 30.7 | 0.3 |
| 31.0 | 0.3 |
| 31.3 | 0.5 |
| 31.7 | 0.5 |
| 32.3 | 0.3 |
| 32.6 | 1.6 |
| 33.2 | 1.2 |
| 33.5 | 1.7 |
| 34.1 | 1.8 |
| 34.7 | 0.9 |
| 35.0 | 1.8 |
| 35.6 | 0.4 |
| 35.9 | 0.8 |
| 36.1 | 0.5 |
| 36.7 | 0.5 |
| 37.0 | 1.2 |
| 37.3 | 0.4 |
| 38.1 | 0.5 |
| 38.6 | 1 |
| 39.1 | 0.3 |
| 39.4 | 0.4 |

Figure 3:
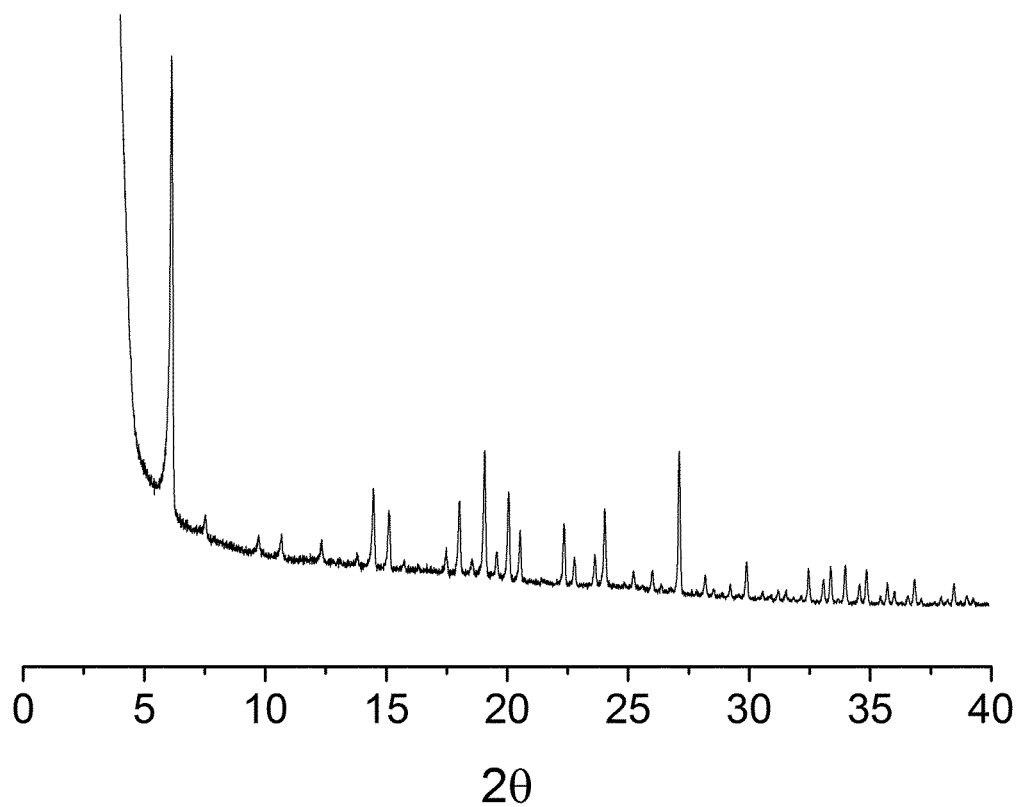
FIG. 3 shows the powder X-ray diffraction pattern of the MOF of the invention having repeating units of formula (SS)-(IB1'). The pattern expresses intensity (counts) versus 2-theta angle (°).
Figure 4:
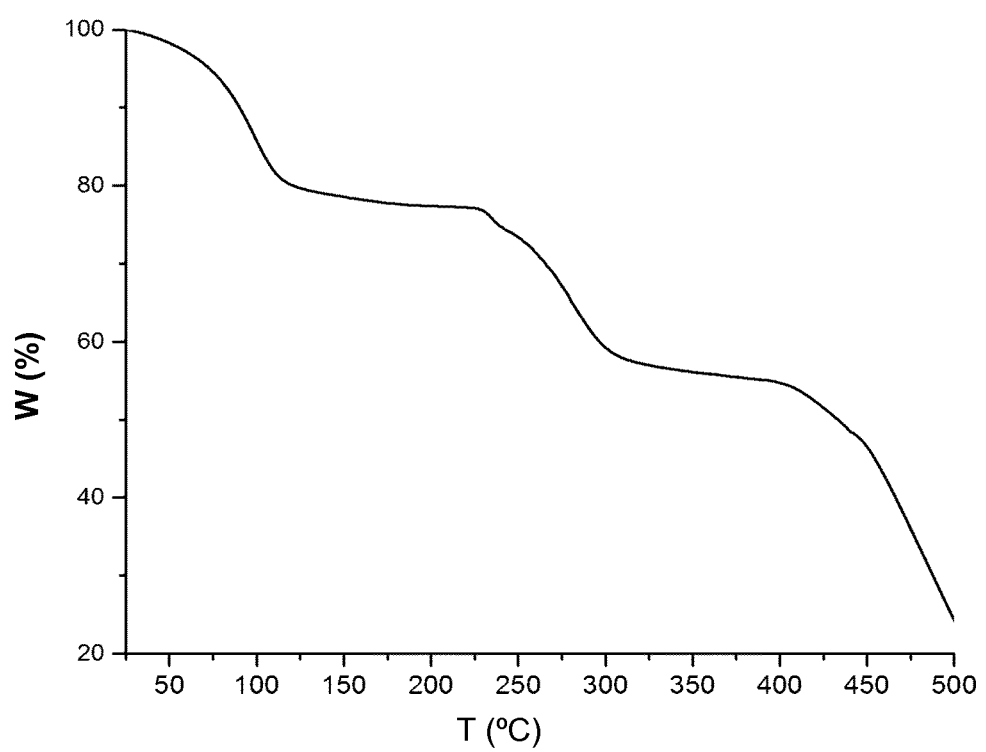
FIG. 4 shows the Thermal Gravimetric Analysis (TGA) curve of the crystalline MOF of the invention having repeating units of formula (SS)-(IB1'). The curve expresses the weight (%) versus the temperature (° C.).
Figure 5:
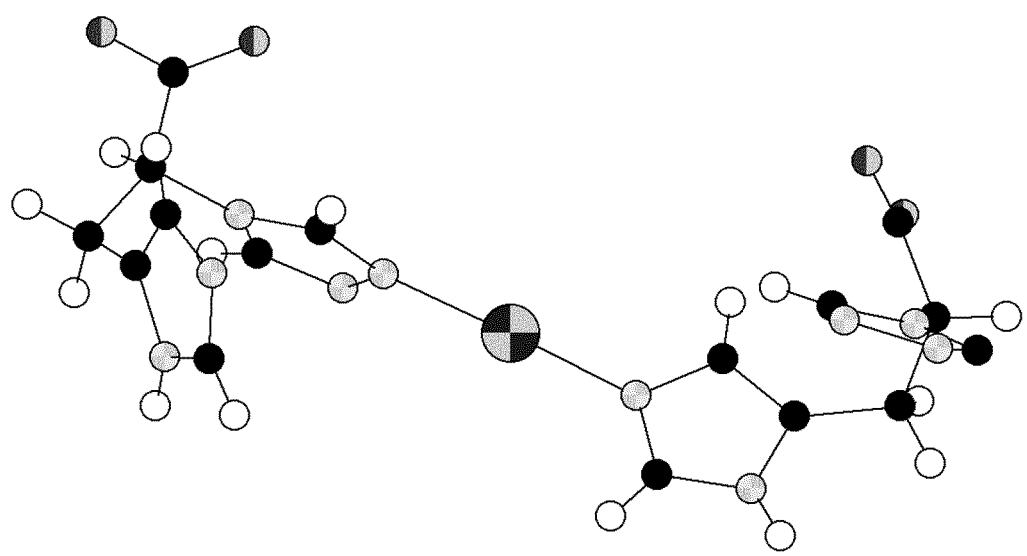
FIG. 5 shows the three-dimensional representation of the repeating unit of formula (SS)-(IA1). The white circle represents hydrogen, the black circle represents carbon, the crossed circle represents the nitrogen, the circle with the left half black represents oxygen, and the circle with the upper left quadrant black and the bottom right quadrant black represent copper.

In an embodiment, the MOF of the invention having repeating units of (SS)-(IB1') may be further characterized by having an X-ray diffractogram as shown in FIG. 3.

Specifically, the MOF of the invention having repeating units of formula (SS)-(IB1'), is further characterized by having the following crystallographic parameters measured by single X-ray diffraction: Crystal system: cubic; Space group: P4(3)/32; Unit cell dimensions: a=20.172(2)*10$^{-10}$ m (Å) α=90°, b=20.172(2)*10$^{-10}$ m (Å) β=90°, c=20.172(2) *10$^{-10}$ m (Å) γ=90°; Volume: 8208(2)*10$^{-10}$ m$^3$ (Å); and Density: 1.359 Mg/m$^3$.

More specifically, the MOF of the invention having repeating units of formula (SS)-(IB1'), is further characterized by exhibiting the crystallographic parameters measured by single X-ray diffraction which is shown in Table 2.

TABLE 2

Crystal data and structure refinement of the MOF having repeating units of formula (SS)-(IB1'):

| Identification code | (SS)-(IB1') |
|---|---|
| Empirical formula | $C_{16}H_{25.33}CuN_{10}O_{8.67}$ |
| Formula weight | 560.00 |
| Temperature | 298(2)K |
| Wavelength | $0.71073 * 10^{-10}$ m (Å) |
| Crystal system | Cubic |
| Space group | P4(3)/32 |
| Unit cell dimensions | a = 20.172(2) * $10^{-10}$ m (Å) α = 90° |
| | b = 20.172(2) * $10^{-10}$ m (Å) β = 90° |
| | c = 20.172(2) * $10^{-10}$ m (Å) γ = 90° |
| Volume | 8208(2) * $10^{-10}$ $m^3$ (Å) |
| Z | 12 |
| Density (calculated) | 1.359 $Mg/m^3$ |
| Absorption coefficient | 0.856 $mm^{-1}$ |
| F(000) | 3476 |
| Crystal size | 0.20 × 0.20 × 0.20 $mm^3$ |
| Theta range for data collection | 1,749 to 32.062°. |
| Index ranges | −11 <= h <= 26, −7 <= k <= 26, |
| | −6 <= l <= 30 |
| Reflections collected | 14133 |
| Independent reflections | 4680[R(int) = 0.0578] |
| Completeness to theta = 36.366° | 97.6% |
| Absorption correction | Empirical (TWINABS) |
| Max. and min. transmission | 0.975 and 0.846 |
| Refinement method | Full-matrix least-squares on $F^2$ |
| Data/restraints/parameters | 4680/207/274 |
| Goodness-of-fit on F2 | 1,054 |
| Final R indices [I > 2 sigma(I)] | R1 = 0.0456, wR2 = 0.1189 |
| R indices (all data) | R1 = 0.0642, wR2 = 0.1263 |
| Flack parameter | x = 0.009(15) |
| Largest diff. peak and hole | 0.541 and −0.275 e. * $10^{-10}$ $m^{-3}$ (Å) |

The crystallographic data shown in the present invention demonstrate that the MOFs of the invention having repeating units of formula (RR)-(IB) or alternatively of formula (SS)-(IB) are built from octahedral metal centres coordinated in the same plane by four nitrogen atoms from four molecules of ligands $L_1^-$ and further coordinated with two solvent molecules on the axial position of the metal atom.

In an embodiment, the metal organic framework is one wherein the repeating unit has the formula (SS)-(IB1') and a weight loss of 22±10% by weight between room temperature and 200° C. in the Thermal Gravimetric Analysis.

In an embodiment, the metal organic framework is one having repeating units of formula (SS)-(IB1') and further characterized by having an infrared (IR) spectrum that shows the following peaks 3289, 1615, 1532, 1495, 1395, 1355, 1263, 1242, 1211, 1180, 1116, 1087, 1015, 979, 891, 845, 752, 701, 660, 647, 549, 511 and 472±5 $cm^{-1}$.

In an alternative of the first aspect of the invention, the crystalline enantiomerically enriched metal organic framework is one having repeating units of formula (RR)-(IA) or alternatively of formula (SS)-(IA), which comprises a metal $M^{2+}$ coordinated to two ligands $L_1^-$ which are identical.

For the purpose of the invention, the terms "MOF having repeating units of formula (RR)-(IA) or (SS)-(IA) or (RS)-(IA) or (SR)-(IA)", and "activated MOF" have the same meaning and can be used interchangeably. They mean that the divalent metal cation $M^{2+}$ of the MOF is only coordinated to two ligands $L_1^-$, but they are not coordinated to solvent molecules S as defined in the present invention, and additionally, that the empty space of the MOFs structure is free of solvent molecules S, without any further structural modification.

In an embodiment, optionally in combination with one or more features of the various embodiments described above or below, the MOF is one having repeating units of formula (SS)-(IA), or alternatively of formula (RR-(IA) wherein the metal is as defined above for the MOF having repeating units of formula (SS)-(IB), or alternatively of formula (RR)-(IB).

In an embodiment, optionally in combination with one or more features of the various embodiments described above or below, the MOF is one wherein the metal is $Cu^{2+}$ and thereby the repeating units has the formula (RR)-(IA1):

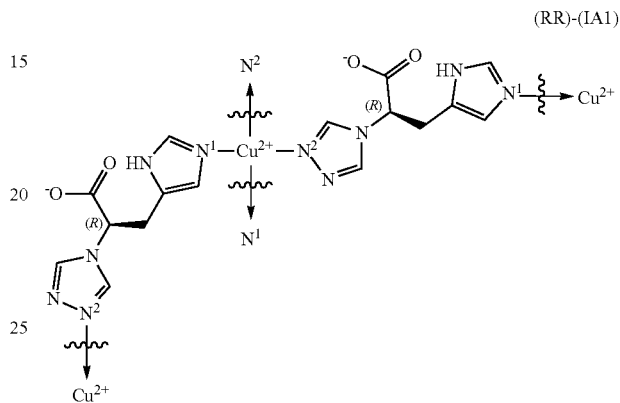

(RR)-(IA1)

or alternatively, the MOF is one wherein $M^{2+}$ is $Cu^{2+}$ and thereby the repeating unit has the formula (SS)-(IA1):

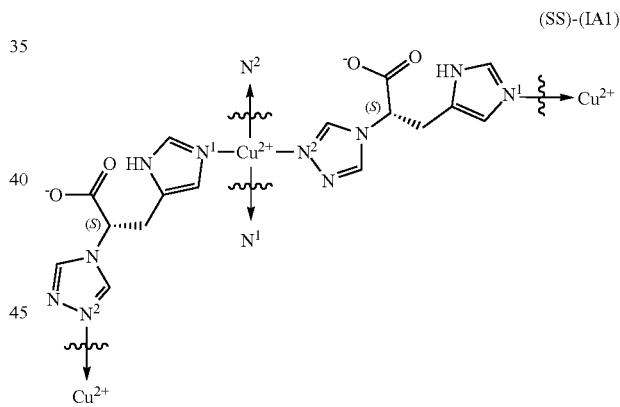

(SS)-(IA1)

being

and as

defined above.

In an embodiment, the metal organic framework is one having repeating units of formula (SS)-(IA1) and the metal organic framework is further characterized for having a X-ray diffractogram that comprises characteristic peaks at 6.2, 10.7, 12.3, 13.1, 13.8, 14.5, 15.1, 15.7, 17.5, 18.0, 19.0, 19.5, 20.0, 24.0 and 27.0±0.2 degrees 2 theta measured in an X-ray diffractometer with Cu K$_\alpha$ radiation (1.5418*10$^{-10}$ m (Å)). In an embodiment, the MOF of the invention is one having repeating units of formula (SS)-(IA1) and is characterized by having an X-ray diffractogram that further comprises characteristic peaks at 7.6, 9.8, 20.5, 21.4, 22.3, 22.7, 23.6, 25.1, 25.9, 28.0, 28.4, 29.1, 29.8, 31.1, 32.3, 33.2, 33.8, 34.7, 35.4, 36.7, 37.9, 38.3 and 29.1±0.2 degrees 2 theta measured in an X-ray diffractometer with Cu K$_\alpha$ radiation (1.5418*10$^{-10}$ m (Å)).

More specifically, the MOF of the invention is one having repeating units of formula (SS)-(IA1) and is further characterized by exhibiting in the powder X-ray diffractogram a pattern of peaks, expressed in 2 theta units in degrees, 2θ (°), which is shown in Table 3.

TABLE 3

List of characteristic peaks obtained (with relative intensity over 5% with respect to the maximum diffraction peak) by X-ray diffractogram of the MOF of the invention having repeating units of (SS)-(IA1):

| Pos. [°2 Theta] | Re. Int. [%] |
|---|---|
| 6.2 | 100 |
| 7.6 | 7.2 |
| 9.8 | 7.5 |
| 10.7 | 13.6 |
| 12.3 | 16.5 |
| 13.1 | 9 |
| 13.8 | 11.6 |
| 14.5 | 19.1 |
| 15.1 | 15.1 |
| 15.7 | 9.2 |
| 17.5 | 10.4 |
| 18.0 | 14.2 |
| 19.0 | 17.4 |
| 19.5 | 9.6 |
| 20.0 | 13.4 |
| 20.5 | 7.4 |
| 21.4 | 6.4 |
| 22.3 | 9.8 |
| 22.7 | 8.4 |
| 23.6 | 8.9 |
| 24.0 | 10.8 |
| 25.1 | 5.6 |
| 25.9 | 7 |
| 27.0 | 11.2 |
| 28.0 | 6.3 |
| 28.4 | 7.3 |
| 29.1 | 5.9 |
| 29.8 | 6.6 |
| 31.1 | 5.9 |
| 32.3 | 7.5 |
| 33.2 | 7.3 |
| 33.8 | 6.4 |
| 34.7 | 6.5 |
| 35.4 | 5.3 |
| 36.7 | 5.8 |
| 37.9 | 5.3 |
| 38.3 | 5.6 |
| 39.1 | 5.2 |

Specifically, the MOF of the invention having repeating units of formula (SS)-(IA1), is further characterized by having the following crystallographic parameters measured by single X-ray diffraction: Crystal system: cubic; Space group: P4(3)/32; Unit cell dimensions: a=20.262(2)*10$^{-10}$ m (Å) α=90°, b=20.262(2)*10$^{-10}$ m (Å) β=90°, c=20.262(2)*10$^{-10}$ m (Å) γ=90°; Volume: 8319(3)*10$^{-10}$ m$^3$ (Å); and Density: 1.140 Mg/m$^3$.

More specifically, the MOF of the invention having repeating units of formula (SS)-(IA1), is further characterized by exhibiting the crystallographic parameters measured by single X-ray diffraction which is shown in Table 4.

TABLE 4

Crystal data and structure refinement of the MOF having repeating units of formula (SS)-(IA1):

| | |
|---|---|
| Identification code | (SS)-(IA1) |
| Empirical formula | C$_{16}$H$_{16}$CuN$_{10}$O$_4$ |
| Formula weight | 475.93 |
| Temperature | 403(2)K |
| Wavelength | 0.71073 * 10$^{-10}$ m (Å) |
| Crystal system | Cubic |
| Space group | P4(3)/32 |
| Unit cell dimensions | a = 20.262(2) * 10$^{-10}$ m(Å) α = 90° |
| | b = 20.262(2) * 10$^{-10}$ m (Å) β = 90° |
| | c = 20.262(2) * 10$^{-10}$ m (Å) γ = 90° |
| Volume | 8319(3) * 10$^{-10}$ m$^3$ (Å) |
| Z | 12 |
| Density (calculated) | 1.140 Mg/m$^3$ |
| Absorption coefficient | 0.822 mm$^{-1}$ |
| F(000) | 2916 |
| Crystal size | 0.20 × 0.20 × 0.20 mm$^3$ |
| Theta range for data collection | 1.741 to 27.108°. |
| Index ranges | −6 <= h <= 21, −14 <= k <= 20, −5 <= l <= 25 |
| Reflections collected | 11230 |
| Independent reflections | 3063[R(int) = 0.0358] |
| Completeness to theta = 36.366° | 99.299995% |
| Absorption correction | Empirical (TWINABS) |
| Max. and min. transmission | 0.976 and 0.899 |
| Refinement method | Full-matrix least-squares on F$^2$ |
| Data/restraints/parameters | 3063/96/141 |
| Goodness-of-fit on F2 | 1.076 |
| Final R indices [I > 2 sigma(I)] | R1 = 0.0333, wR2 = 0.0812 |
| R indices (all data) | R1 = 0.0444, wR2 = 0.0854 |
| Flack parameter | x = −0.016(9) |
| Largest diff. peak and hole | 0.185 and −0.163 e. * 10$^{-10}$ m$^{-3}$ (Å) |

The crystallographic data shown in the present invention demonstrate that the MOFs of the invention having repeating units of formula (RR)-(IA) or alternatively (SS)-(IA) are built from square-planar metal centres coordinated in the same plane by four nitrogen atoms from four molecules of ligands L$_1^-$.

In an embodiment, the metal organic framework is one wherein the repeating unit has the formula (SS)-(IA1) and a BET surface area comprised from 250 m$^2$/g to 1800 m$^2$/g; preferably comprised from 800 m$^2$/g to 1550 m$^2$/g. In a particular embodiment, the MOF of the invention is one having repeating units of formula (SS)-(IA1) and a BET surface area of 970 m$^2$/g. As it is shown in the Examples, the MOFs of the invention having repeating units of formula (SS)-(IA), or alternatively of formula (RR)-(IA) exhibit the appropriate value of BET surface area making them suitable to be used as catalyst and also as a separation agent.

In an embodiment, the metal organic framework is one having the repeating unit has the formula (SS)-(IA1) and a pore volume comprised from 0.10 cm$^3$/g to 0.70 cm$^3$/g; preferably, the pore volume is comprised from 0.20 cm$^3$/g to 0.45 cm$^3$/g; more preferably comprised from 0.30 cm$^3$/g to 0.38 cm$^3$/g. In a particular embodiment, the MOF of the invention having repeating units of formula (SS)-(IA1) is one having a pore volume of 0.35 cm$^3$/g. As it is shown in the Examples, the MOFs of the invention having repeating units of formula (SS)-(IA), or alternatively of formula (RR)-(IA) exhibit the appropriate value of pore volume making them suitable to be used as reservoir for molecules, for catalysts and also for separation agents.

In an embodiment, the MOF of the invention id one having repeating units of formula (SS)-(IA1), a BET surface area comprised from 850 m$^2$/g to 1050 m$^2$/g and a pore volume comprised from 0.30 m$^2$/g to 0.40 cm$^3$/g. In a particular embodiment, the MOF of the invention is one having repeating units of formula (SS)-(IA1), a BET surface area of 970 m²/g and a pore volume of 0.35 cm³/g. As it is shown in the Examples, the MOFs of the invention having repeating units of formula (SS)-(IA), or alternatively of formula (RR)-(IA) exhibit the appropriate combination of the above-mentioned BET surface values and the pore volume values to be used as reservoirs for substances, as catalysts for chemical reactions, and also as separation agents.

As it is mentioned above, the second aspect of the invention relates to a process for the preparation of the MOFs having repeating units of formula (RR)-(IB) or alternatively (SS)-(IB) or alternatively (RS)-(IB) or alternatively (SR)-(IB) which comprises: (a) adding a solution of a solvent S as defined above and a salt of formula $MA_2$ to a solution of a solvent S as defined in the first aspect of the invention and of the compound (R)-(imidazol-5-ylmethyl)-(1,2,4-triazol-4-yl)acetic acid of formula (R)-(III) as defined above; or alternatively, of the compound (S)-(imidazol-5-ylmethyl)-(1,2,4-triazol-4-yl)acetic acid of formula (S)-(III); or alternatively, a mixture of the compound of formula (S)-(III) and of formula (R)-(III); wherein the pH of the aqueous solution of the compound of formula (R)-(III); or alternatively, of the compound of formula (S)-(III); or alternatively, of the mixture of the compound (S)-(III) and of formula (R)-(III) is comprised from 4 to 7; (b) maintaining the solution obtained in step (a) at a temperature from 20° C. to 35° C. for the necessary period of time to crystallize the metal organic framework; and (c) isolating the organic metal framework thus obtained, wherein: M is the divalent metal cation $M^{2+}$ as defined above; and A is a monovalent anion $A^-$ selected from the group consisting of an organic anion or an inorganic anion. This process is advantageous because it allows preparing the crystalline stable MOF of the invention having a high enhanced selective $CO_2$ separation performance as well as high catalytic activity.

In a preferred embodiment, optionally in combination with one or more features of the various embodiments described above or below, in step (a) of the process the anion A is an inorganic anion selected from the group consisting of bromide, chloride, nitrate, sulfate and perchlorate; preferably chloride. In an alternative embodiment, optionally in combination with one or more features of the various embodiments described above or below, in step (a) of the process the anion A is an organic anion selected from the group consisting of tartrate, acetate, carbonate and acetylacetonate; preferably acetate. In an embodiment, optionally in combination with one or more features of the various embodiments described above or below, in step (a) of the process the anion A of the salt of formula $MA_2$ is an anion selected from the group consisting of $F^-$, $Cl^-$, $Br^-$, $I^-$, $(C_1\text{-}C_4\text{alkyl})COO^-$, $ClO_4^-$, $NO_3^-$ and $BF_4^-$; preferably chloride or $(CH_3)COO^-$; more preferably acetate.

In an embodiment, optionally in combination with one or more features of the various embodiments described above or below, step (a) of the process is performed with a solution of a salt of formula $MA_2$ wherein the solvent is selected from the group consisting of water, methanol, ethanol, isopropoanol, tert-butanol, diethyl ether, 1,4 dioxane, tetrahydrofurane, N,N-dimethylformamide (DMF), acetonitrile, acetone, 1,2-ethyleneglycol, dimethylsulfoxide and pyridine. In a preferred embodiment, the solvent is selected from the group consisting of water, methanol, ethanol and DMF. In a more preferred embodiment, the solvent is water.

In an embodiment, optionally in combination with one or more features of the various embodiments described above or below, step (a) of the process is performed at such pH value in which the resulting MOF is stable. In an embodiment, optionally in combination with one or more features of the various embodiments described above or below, step (a) of the process is performed at a pH comprised from 4 to 7; preferably at a pH comprised from 5 to 6; particularly at a pH of 5.5.

In an embodiment, optionally in combination with one or more features of the various embodiments described above or below, step (a) of the process is performed at a molar ratio between the metal salt of formula $MA_2$ and the compound of formula (R)-(III); or alternatively at a molar ratio between the metal salt of formula $MA_2$ and the compound of formula (S)-(III) or alternatively at a molar ratio between the metal salt of formula $MA_2$ and the mixture of the compound (S)-(III) and of formula (R)-(III) comprised from 1:3 to 3:1; preferably at a molar ratio comprised from 2:3 to 2:1; more preferably at a molar ratio of 1:2. The term "molar ratio" refers to the relation of moles between the starting material (that is the metal salt of formula $MA_2$) and the reagent (that is compound of formula (R)-(III); or alternatively of formula (S)-(III)) needed to perform the reaction.

Step (b) of the process is performed for the necessary period of time to crystallize the MOF of the invention having repeating units of formula (SS)-(IB), or alternatively of formula (RR)-(IB) or alternatively of formula (RS)-(IB) or alternatively of formula (SR)-(IB). In an embodiment, optionally in combination with one or more features of the various embodiments described above or below, step (b) is performed for a period of time comprised from 24 hours to 72 hours; preferably comprised from 36 hours to 60 hours; more preferably comprised from 40 hours to 50 hours.

Step (c) of the process can be performed either by filtration or by centrifugation, as well as any suitable other solid-liquid separation technique known in the art.

All the embodiments disclosed above for the MOFs of the invention having repeating units of formula (SS)-(IB), or alternatively of formula (RR)-(IB) or alternatively of formula (RS)-(IB), or alternatively of formula (SR)-(IB) of the first aspect of the invention also apply for its preparation process of the second aspect of the invention.

The MOFs of the invention having repeating units of formula (SS)-(IB), or alternatively of formula (RR)-(IB) or alternatively of formula (RS)-(IB), or alternatively of formula (SR)-(IB) as defined above may be defined by its preparation process and therefore, the MOF having repeating units of formula (SS)-(IB), or alternatively of formula (RR)-(IB), or alternatively of formula (RS)-(IB), or alternatively of formula (SR)-(IB) obtainable by the process of the second aspect as defined above is considered part of the invention. Thus, the MOFs having repeating units of formula (SS)-(IB), or alternatively of formula (RR)-(IB), or alternatively of formula (RS)-(IB), or alternatively of formula (SR)-(IB) and being obtainable by the process which comprises: (a) adding an aqueous or organic solution of a salt of formula $MA_2$ to an aqueous solution of the compound (R)-(imidazol-5-ylmethyl)-(1,2,4-triazol-4-yl)acetic acid of formula (R)-(III) as defined above; or alternatively, to an aqueous solution of the compound (S)-(imidazol-5-ylmethyl)-(1,2,4-triazol-4-yl)acetic acid of formula (S)-(III) as defined above; or alternatively to a mixture of a compound of formula (R)-(III) and (S)-(III) wherein the pH of the aqueous solution of the compound of formula (R)-(III); or alternatively, of the compound of formula (S)-(III); or alternatively of the mixture of a compound of formula (R)-(III) and (S)-(III) is comprised from 4 to 7; (b) maintaining the solution obtained in step (a) at a temperature from 20° C. to 35° C. for the necessary period of time to crystallize the metal organic framework; and (c) isolating the organic metal framework thus obtained, wherein: M is the divalent metal cation $M^{2+}$ as defined above; and A is a monovalent anion $A^-$ selected from the group consisting of an organic anion or an inorganic anion are also part of the invention.

All the embodiments disclosed above for the MOFs of the first aspect of the invention as well as all the embodiments disclosed above for the process for their preparation of the second aspect of the invention also apply for the MOFs obtainable by this process.

As it is mentioned above, the third aspect of the invention relates to a process for the preparation of the MOFs having repeating units of formula (RR)-(IA) or alternatively (SS)-(IA) or alternatively (RS)-(IA) or alternatively (SR)-(IA) of the invention which comprises: (d) submitting the metal organic framework having repeating units of formula (RR)-(IB); or alternatively of formula (SS)-(IB), or alternatively of formula (RS)-(IB); or alternatively of formula (SR)-(IB) at such reaction conditions to remove at least both solvent molecules S.

In an embodiment, optionally in combination with one or more features of the various embodiments described above or below, further comprises a previous step (e) which comprises performing the steps (a)-(c) as defined in the second aspect of the invention to obtain the metal organic framework having repeating units of formula (RR)-(IB); or alternatively of formula (SS)-(I B), or alternatively of formula (RS)-(IB); or alternatively of formula (SR)-(IB).

All the embodiments disclosed above for the MOFs of the first aspect of the invention as well as all the embodiments disclosed above for the process for their preparation of the second aspect of the invention also apply for the MOFs obtainable by this process.

In an embodiment, optionally in combination with one or more features of the various embodiments described above or below, step (d) of the process is performed at a temperature comprised from 100° C. to 180° C. under dry conditions for the necessary period of time to remove at least both solvent molecules S; preferably at a temperature comprised from 120° C. to 170° C. As used herein, the term "dry conditions" refers to an environment substantially free of water content; preferably the water content is up to 25%; more preferably up to 22%. In an embodiment, optionally in combination with one or more features of the various embodiments described above or below, step (d) of the process is performed at a temperature comprised from 100° C. to 180° C. under a flow of an inert gas, such as nitrogen or argon, for the necessary period of time to remove at least both solvent molecules S; preferably at a temperature comprised from 120° C. to 170° C. under a flow of an inert gas, such as nitrogen or argon.

As it is mentioned above, the fourth aspect of the invention relates to a process for the preparation of the MOFs having repeating units of formula (RR)-(IB) or alternatively (SS)-(IB) or alternatively (RS)-(IB) or alternatively (SR)-(IB) of the invention which comprises: (f) contacting the metal organic framework having repeating units of formula (RR)-(IA) or alternatively, of formula (SS)-(IA) or alternatively (RS)-(IA) or alternatively (SS)-(IA) with the appropriate amount of the solvent S under such reaction conditions to coordinate two solvent molecules S.

In an embodiment, optionally in combination with one or more features of the various embodiments described above or below, the process for the preparation of the MOFs having repeating units of formula (RR)-(IB) or alternatively (SS)-(IB) or alternatively (RS)-(IB) or alternatively (SR)-(IB) of the invention further comprises firstly performing the steps (a)-(e) and further performing step (f) as defined above.

The MOFs of the invention having repeating units of formula (SS)-(IB), or alternatively of formula (RR)-(IB) or alternatively of formula (RS)-(IB) or alternatively of formula (SR)-(IB) as defined above may be defined by its preparation process and therefore, the MOF having repeating units of formula (SS)-(IB), or alternatively of formula (RR)-(IB) or alternatively of formula (RS)-(IB) or alternatively of formula (SR)-(IB) obtainable by the process of the fourth aspect as defined above is considered part of the invention. Thus, the MOFs of the invention having repeating units of formula (SS)-(IB), or alternatively of formula (RR)-(IB) or alternatively of formula (RS)-(IB) or alternatively of formula (SR)-(IB) and being obtainable by the process which comprises: (f) contacting the metal organic framework having repeating units of formula (RR)-(IA) or alternatively, of formula (SS)-(IA) or alternatively of formula (RS)-(IA) or alternatively of formula (SR)-(IA) with the appropriate amount of solvent S under such reaction conditions to coordinate two solvent molecules S are also part of the invention.

All the embodiments disclosed above for the MOFs of the first aspect of the invention as well as all the embodiments disclosed above for the process for their preparation (steps (a)-(f)) also apply for the MOFs obtainable by this process.

As it is mentioned above, the fifth aspect of the invention relates to a composition that comprises the MOF of the present invention and one or more carriers. The term "carrier" refers to excipients or vehicles with which the MOF is combined making them suitable to be used in specific applications, for example, as a separation agent or as a catalyst.

In an embodiment, optionally in combination with one or more features of the various embodiments described above or below, the carrier is selected from the group consisting of a liquid carrier and a porous solid carrier. Particularly, when the composition comprises the MOF of the present invention and at least a liquid carrier, then the composition is also called "ink"; or alternatively, when the composition comprises the MOF of the present invention and at least a porous solid carrier, then the composition is also called "membrane".

In an embodiment, optionally in combination with one or more features of the various embodiments described above or below, the composition is one which comprises a liquid carrier selected from the group consisting of dimethylsulfoxide (DMSO), ethylene glycol, 2-propanol, ethanol, hydroxypropyl methylcellulose (HPMC), water, acetone and mixtures thereof.

In an embodiment, optionally in combination with one or more features of the various embodiments described above or below, the composition is one which comprises a porous solid carrier selected from the group consisting of a porous organic solid carrier and a porous inorganic solid carrier.

In an embodiment, optionally in combination with one or more features of the various embodiments described above or below, the composition is one that comprises the MOF of the invention and a porous polymeric organic carrier. Examples of porous polymeric organic carrier appropriate for the present invention include, in a non-limitative way, poly(vinylesters), poly(ethylenimine), polyimides, polysulfones, poly(methyl methacrylate), poly(vinylacetate), poly(pyrroles), poly(acetylenes), poly(thiophenes); preferably, poly(vinylidene fluoride and polypyrrole). Preferred porous polymeric organic carriers are selected from the group consisting of polyvinylidene fluoride (PVDF), poly (methyl methacrylate) (PMMA), thermoplastic polyimide based on a proprietary diamine, 5(6)-amino-1-(4' aminophenyl)-1,3,-trimethylindane (Matrimid® 9725), poly(ethylenimine) (PEI), and polyvinyl acetate (PVAc). In a preferred embodiment, optionally in combination with one or more features of the various embodiments described above or below, the composition is one that comprises the MOF of the invention and polyvinylidene fluoride (PVDF). They are advantageous because these compositions combine the plasticity of the organic polymers with the chemical properties of the MOF. Furthermore, these compositions are advantageous because the chemical and catalytic properties of the MOF of the present invention are combined with the robustness, mechanical strength, processability and magnetic properties of the porous solid support.

In an embodiment, optionally in combination with one or more features of the various embodiments described above or below, the composition is one that comprises the MOF of the invention and a porous polymeric organic carrier as defined in any of the embodiments above wherein the composition comprises from 10% to 99% by weight of the MOF of the invention in relation to the total weight of the composition. In a more particular embodiment, optionally in combination with one or more features of the various embodiments described above or below, the composition is one that comprises the MOF of the invention and a porous polymeric organic carrier as defined in any of the embodiments above wherein the composition comprises from 20% to 90% by weight of the MOF of the invention in relation to the total weight of the composition. In a more particular embodiment, optionally in combination with one or more features of the various embodiments described above or below, the composition is one that comprises the MOF of the invention and a porous polymeric organic carrier as defined in any of the embodiments above wherein the composition comprises from 30% to 80% by weight of the MOF of the invention in relation to the total weight of the composition. In a more particular embodiment, optionally in combination with one or more features of the various embodiments described above or below, the composition is one that comprises the MOF of the invention and a porous polymeric organic carrier as defined in any of the embodiments above wherein the composition comprises from 40% to 70% by weight of the MOF of the invention in relation to the total weight of the composition. Even more particularly, the composition is one that comprises the MOF of the invention and a porous polymeric organic carrier as defined in any of the embodiments above wherein the composition comprises from 60% to 70% by weight of the MOF of the invention in relation to the total weight of the composition.

In a particular embodiment, optionally in combination with one or more features of the various embodiments described above or below, the composition is one that comprises the MOF of the invention and the carrier is polyvinylidene fluoride (PVDF) wherein the composition comprises from 30% to 80% by weight of the MOF of the invention in relation to the total weight of the composition. More preferably, the composition is one that comprises the MOF of the invention and the carrier is polyvinylidene fluoride (PVDF) wherein the composition comprises from 40% to 70% by weight of the MOF of the invention in relation to the total weight of the composition. Even more preferably, the composition is one that comprises the MOF of the invention and the carrier is polyvinylidene fluoride (PVDF) wherein the composition comprises from 60% to 70% by weight of the MOF of the invention in relation to the total weight of the composition.

When the composition is one which comprises a porous polymeric organic carrier, said composition are typically called "mixed matrix membrane". Processes and methods for the preparation of said "mixed matrix membranes" are known in the art and typically comprise dispersing the MOF in a polymer using techniques such as film casting, roll-to-roll, and extrusion.

In an embodiment, the preparation of the mixed matrix membrane comprising the MOF of the invention is performed by film-casting. This process comprises: (i) suspending or dissolving the MOF of the invention in one or more organic solvents, (ii) dissolving the porous polymeric organic carried in one or more solvents, (iii) mixing the solutions obtained in steps (i) and (ii); and (iv) casting the mixture resulting from step (iii); or alternatively, this process comprises: (v) preparing a film dope comprising the MOF of the invention and the porous polymeric organic carrier as defined above in one or more solvents; (vi) feeding a doctor blade with the film dope obtained in step (v); and (vii) drying the resulting cast film obtained in step (v).

In a particular embodiment, when the mixed matrix membrane comprises the MOF of the invention and the carrier is polyvinylidene fluoride (PVDF), the process comprises preparing the film dope comprising the MOF of the invention and polyvinylidene fluoride (PVDF) by suspending the MOF of the invention in N,N-dimethylformamide (DMF) and adding the PVDF in such a way that the concentration of PVDF is 0.15 gram per milliliter of DMF; feeding a doctor blade with the film dope obtained in previous step; and drying the resulting cast film thus obtained.

In an embodiment, optionally in combination with one or more features of the various embodiments described above or below, the composition is one which comprises a porous inorganic solid carrier selected from the group consisting of porous metal oxides, silicon dioxide, metal hydroxides, layered double hydroxides, clays, and zeolites.

The solid composition comprising the MOFs as disclosed above can further comprise additional components such as for example adsorbents, binders and lubricants, among others. These components are typically added during the process of production of the solid supported MOFs.

It is also part of the invention a process for the preparation of the compositions of the fifth aspect of the invention. These compositions can be prepared using the processes disclosed in the state of the art, such as via mechanical, chemical, or thermal mixing to yield a homogeneous body, film, frit, plate, wire, cylinder and/or sponge, among others. The appropriate method for its preparation, as well as amounts and experimental conditions, can readily be determined by those skilled in the art according to the type of composition being prepared.

In particular, the compositions of the fifth aspect of the invention which comprises one or more solid carriers (also called "membranes") can be obtained by any methods known in the state of the art. Examples of processes suitable for the preparation of these membranes include, without limitation, fabrication of continuous MOF membranes via secondary growth, by placing (or depositing) seed crystals onto a porous solid support, optionally followed by solvothermal treatment to grow them into a continuous MOF membrane. Other methods include incorporation of the MOF crystals into mixed-matrix gas-separation membranes, or incorporation into hollow fibers or by film casting methods; even by film-casting of an ink onto a porous solid support. A process for the preparation of the solid composition which comprises the MOFs as defined above is also part of the invention.

As it is mentioned above, the sixth aspect of the invention relates to either the use of the metal organic framework as defined in the first aspect of the invention, or alternatively, of the composition as defined in fifth aspect of the invention, as separation agent or alternatively as a catalyst.

Thus, the metal organic framework as defined in the first aspect of the invention, or alternatively, of the composition as defined in fifth aspect of the invention can be used as separation agent for mixtures of substances in gas or liquid phase. The MOFs of the present invention are especially advantageous because unlike most MOFs of the state of the art for which desorption of the gases adsorbed on the MOF requires further heating of the material (gas release phase), the MOFs of the present invention allows performing a selective separation of gases or liquids without the need to increase the temperature for promoting the release of the gas trapped within the pores of the MOF. It is advantageous because the process can be carried out in a continuous manner, allowing a high productivity. Particularly, as it is shown in the Examples, the MOF of the invention allows the selective separation of methane and carbon dioxide without the need of increasing the temperature above 80° C. (cf. Example 3).

In an embodiment, optionally in combination with one or more features of the various embodiments described above or below, the invention relates to the use of the metal organic framework as defined in the first aspect of the invention, or alternatively, of the composition as defined in fifth aspect of the invention as separating agent for a mixture of substances in gas phase. In an embodiment, optionally in optionally in combination with one or more features of the various embodiments described above or below, the invention relates to the use of the metal organic framework as defined in the first aspect of the invention, or alternatively, of the composition as defined in fifth aspect of the invention as separating agent for a mixture of substances in gas phase wherein the mixture comprises carbon dioxide. In an embodiment, optionally in optionally in combination with one or more features of the various embodiments described above or below, the invention relates to the use of the metal organic framework as defined in the first aspect of the invention, or alternatively, of the composition as defined in fifth aspect of the invention as separating agent for a mixture of substances in gas phase wherein the mixture comprises carbon dioxide and methane. In an embodiment, optionally in combination with one or more features of the various embodiments described above or below, the invention relates to the use of the composition as defined in the fifth aspect of the invention as separating agent for a mixture of substances in gas phase comprising carbon dioxide; preferably carbon dioxide and methane, wherein the composition comprises the MOF of the invention and a porous polymeric organic carrier as defined in any of the embodiments above. In particular, optionally in combination with one or more features of the various embodiments described above or below, the invention relates to the use of the composition as defined in the fifth aspect of the invention as separating agent for a mixture of substances in gas phase comprising carbon dioxide; preferably carbon dioxide and methane, wherein the composition comprises the MOF of the invention and the carrier is polyvinylidene fluoride (PVDF).

It is also part of the invention a process for separating a mixture of substances in gas phase which comprises passing the mixture of gases through a layer of the MOF of the invention or; alternatively, through the composition of the invention which comprises the MOF of the invention.

It is also part of the invention a method for gas and liquid separation which comprises: (i) passing a gas or liquid stream through a bed of a MOF of the present invention; or alternatively through a bed of a composition comprising a MOF of the invention and a carrier as defined above, under such conditions that allows separation of the gas or liquid mixture. This step can be repeated the necessary number of times until reaching the appropriate separation purity. Typically, such gas or liquid separation can be carried out under such range of temperatures, pressures and flow rate in which the bed of the composition comprising the MOF is stable and exhibits selectivity for a specific gas or liquid. The appropriate temperature, pressure and flow rate can readily be determined by those skilled in the art according to the type composition of the bed.

In an embodiment, optionally in combination with one or more features of the various embodiments described above or below, when the MOF of the invention is a MOF having repeating units of formula (RR)-(IB) or alternatively (SS)-(IB) or alternatively (RS)-(IB) or alternatively (SR)-(IB) then, the method for gas and liquid separation further comprises a previous step (i') prior to step (i) which comprises performing step (d) of the third aspect of the invention to obtain the MOFs of the invention having repeating units of (RR)-(IA) or alternatively (SS)-(IA) or alternatively (RS)-(IA) or alternatively (SR)-(IA). In an embodiment, when the MOF of the invention is forming part of a composition comprising a solid carrier ("membrane"), then the step (i') is performed at a temperature comprised from 130° C. to 150° C. under inert atmosphere, particularly under nitrogen atmosphere.

All the embodiments disclosed above for the MOFs of the first aspect of the invention, the compositions of the fifth aspect of the invention as well as all the embodiments disclosed above for step (d) of the process as defined above also apply for the method for gas and liquid separation.

As it is mentioned above, the metal organic framework as defined in the first aspect of the invention, or alternatively, of the composition as defined in the fifth aspect of the invention can be used as separation agent in the enantioselective separation of a mixture of enantiomers of a chiral compound placed in a solvent. As it is shown in the Examples, the MOFs of the invention, preferably those MOFs having repeating units of formula (RR)-(IA) or alternatively (SS)-(IA) allows the chiral separation of racemic ibuprofen (cf. Example 4).

In an embodiment, optionally in combination with one or more features of the various embodiments described above or below, the invention relates to the use of the composition as defined in the fifth aspect of the invention as separating agent of a mixture of enantiomers of a chiral compound in a solvent wherein the chiral compound is a pharmaceutically active ingredient. Appropriate pharmaceutically active ingredients include, but are not limited to, anti-infective, antiseptics, anti-inflammatory agents, anti-cancer agents, antiemetics, local anesthetics, anti-acne agents, wound healing agents, and antiangiogenic agents. In a particular embodiment, the pharmaceutically active ingredient is an anti-inflammatory agent such as ibuprofen. In an embodiment, optionally in combination with one or more features of the various embodiments described above or below, the invention relates to the use of the composition as defined in the fifth aspect of the invention as separating agent of a mixture of enantiomers of a chiral compound in a solvent wherein the chiral compound is ibuprofen.

It is also part of the invention a method for enantioselective separation of a mixture of enantiomers of a chiral compound placed in a solvent which comprises: (j) passing a solution of a mixture of enantiomers of a chiral compound through a bed of a MOF of the present invention; or alternatively through a bed of a composition comprising a MOF of the invention and a carrier as defined above, under such conditions that allow separation of the enantiomers of the chiral compound. This step can be repeated the necessary number of times until reaching the appropriate enantiomerically separation purity.

In an embodiment, optionally in combination with one or more features of the various embodiments described above or below, when the MOF of the invention is a MOF having repeating units of formula (RR)-(IB) or alternatively (SS)-(IB) then, the method for enantioselective separation of a mixture of enantiomers of a chiral compound further comprises a previous step (j') prior to step (j) which comprises performing step e) of the third aspect of the invention to obtain the MOFs of the invention having repeating units of (RR)-(IA) or alternatively (SS)-(IA). In an embodiment, when the MOF of the invention is forming part of a composition comprising a solid carrier ("membrane"), then the step (j') is performed at a temperature comprised from 130° C. to 150° C. under inert atmosphere, particularly under nitrogen atmosphere.

All the embodiments disclosed above for the MOFs of the first aspect of the invention, the compositions of the fifth aspect of the invention as well as all the embodiments disclosed above for step (d) of the process for their preparation also apply for the method of enantioselective separation of a mixture of enantiomers of a chiral compound disclosed above.

Finally, the fifth aspect of the invention also relates to the use of the metal organic framework as in the first aspect of the invention, or alternatively, of a composition as defined in the fifth aspect of the invention, as a catalyst, such as for example for asymmetric reactions or hydrogenation reactions. In this regard, the MOFs of the invention are useful as heterogeneous catalyst for their easy post-reaction separation, catalyst reusability, high stability, high efficiency and selectivity; as well as the advantage that it can be used under mild reaction conditions without additional treatments. As it can be demonstrated in Example 5, the MOFs of the invention, either the MOFs having repeating units of formula (RR)-(IA) or alternatively (SS)-(IA) or alternatively (RS)-(IA) or alternatively (SR)-(IA); or the MOFs having repeating units of formula (RR)-(IB) or alternatively (SS)-(IB) or alternatively (RS)-(IB) or alternatively (SR)-(IB); preferably those MOFs having repeating units of formula (RR)-(IA) or alternatively (SS)-(IA) are useful for the hydrogenation of carbon dioxide; as well as for the stereoselective preparation of enantiomerically enriched 2-phenyl-2-(phenylamino)ethan-1-ol and also 1-phenyl-2-(phenylamino)ethan-1-ol through the asymmetric ring opening of epoxide or asymmetric aminolysis of styrene oxide as it is shown in Tables 8-9.

It is also part of the invention a method for the preparation of enantioselective-enriched compounds which comprises: (k) contacting the MOF of the present invention with a racemic compound under the appropriate reaction conditions to obtain an enantioselective-enriched compound; preferably in liquid phase such as for example in solution or neat conditions; or alternatively in gas phase.

In an embodiment, optionally in combination with one or more features of the various embodiments described above or below, when the MOF of the invention is a MOF having repeating units of formula (RR)-(IB) or alternatively (SS)-(IB) then, the method for enantioselective separation of a mixture of enantiomers of a chiral compound further comprises a previous step (k') prior to step (k) which comprises performing step (d) of the third aspect of the invention to obtain the MOFs of the invention having repeating units of (RR)-(IA) or alternatively (SS)-(IA). In an embodiment, when the MOF of the invention is forming part of a composition comprising a solid carrier ("membrane"), then the step (k') is performed at a temperature comprised from 130° C. to 150° C. under inert atmosphere, particularly under nitrogen atmosphere.

All the embodiments disclosed above for the process of the MOFs of the first aspect of the invention, the compositions of the fifth aspect of the invention, as well as all the embodiments disclosed above for step (d) of the process for their preparation also apply for the method of enantioselective separation of a mixture of enantiomers of a chiral compound disclosed above.

Throughout the description and claims the word "comprise" and variations of the word, are not intended to exclude other technical features, additives, components, or steps. Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Abbreviations

RBF: round-bottom flask
DMF: dimethylformamide
EtOH: ethanol
DMSO: Dimethyl sulfoxide
IPA: Isopropyl
ACN: Acetonitrile
THF: Tetrahydrofuran
TFA: Trifluoracetic acid
EtOAC: Ethyl acetate
$Et_2O$: diethyl ether General Considerations The NMR spectra were recorded on the following spectrometer: Bruker Avance 400 Ultrashield (400 MHz for $^1H$ and 101 MHz for $^{13}C$) and Bruker Avance 500 Ultrashield (500 MHz for $^1H$ and 126 MHz for $^{13}C$). The chemical shift (6 for $^1H$ and $^{13}C$ are given in ppm relative to residual signals of the solvents ($D_2O$ 4.8 ppm, DMSO 2.5 ppm, $CDCl_3$ 7.2 ppm $^1H$ NMR and 39.5 ppm and 77.0 ppm $^{13}C$ NMR respectively). Coupling constant are given in Hertz. The following abbreviations are used to indicate the multiplicity; s, singlet; d, doublet; t, triplet; m, multiplet; bs, broad signal. The elemental analysis was recorded on a LECO CHNS-932.

Fourier Transform Infrared-Attenuated Total Reflectance (FT-IR-ATR) spectra were registered on a Bruker Optics FT-IR Alpha spectrometer equipped with a DTGS detector, KBr beamsplitter at 4 $cm^{-1}$ resolution using a one bounce ATR accessory with diamond windows. Sample was placed on the ATR plate and the measure was carried out in the 4000-400 cm$^{-1}$ range. The term "IR or IR spectrum/spectra" when used in the context refers to spectra registered in the conditions mentioned above.

Powder X-Ray diffraction (PXRD) analyses for compound (SS)-(IA1) were performed using a Apex DUO diffractometer equipped with a Kappa 4-axis goniometer, an APEX II 4K CCD area detector, a Microfocus Source E025 IuS using CuKα radiation, (λ=1.5418*10$^{-10}$ m (Å)) Quazar MX multilayer Optics as monochromator and an Oxford Cryosystems low temperature device Cryostream 700 plus (T=−173° C.).

Diffraction X ray single crystal (SCXRD) analyses were obtained using a Apex DUO diffractometer equipped with a Kappa 4-axis goniometer, an APEX II 4K CCD area detector, a Microfocus Source E025 IuS using MoKα radiation, (λ=0.71073*10$^{-10}$ m (Å)) Quazar MX multilayer Optics as monochromator and an Oxford Cryosystems low temperature device Cryostream 700 plus (T=−173° C.).

Thermal Gravimetric analysis (TGA) were obtained using a Mettler-Toledo TGA thermobalance-851e equipment using alumina crucibles of 404 volume with dry nitrogen atmosphere 20 mL/min flow and heating rate of 10° C./min. The diagrams show simultaneously varying the mass of a sample on heating (TGA) and the signal SDTA expressed in milligrams (mg) vs min (minutes) and ° C. (temperature).

BET surface area and porosity were performed by $N_2$ adsorption at 77K using a Quantachrome Autosorb iQ analyzer. Different chemisorption experiments ($CO_2$, $CH_4$, $H_2$, $N_2$ and CO) were performed using a Quantachrome Autosorb iQ chemistation. Initially, the fresh sample was loaded into the chemisorption cell and activated from room temperature to 150° C. (heating rate 2° C. min$^{-1}$) in $N_2$ atmosphere for 12 h. Once activated, the gas was switched from $N_2$ to $CO_2$ (or $CH_4$, CO, or $H_2$) and the isothermal experiments were performed at different temperatures. $N_2$ adsorption-desorption isotherms at 77 K were measured on a Quantachrome Autosorb iQ analyzer. Prior to analysis, the samples were degassed in vacuum at 150° C. for 12 h. The BET method disclosed in *J. Am. Chem. Soc.* 1938, vol. 60, pp. 309 was applied to calculate the total surface area, and the t-plot method disclosed in *J. Catal.* 1965, vol. 4, pp. 319 was used to discriminate between micro- and mesoporosity.

Diagrams by circular dichroism (CD) were obtained using an Applied Photophysics Chirascan Circular Dichroism spectrometer equipped with a photomultiplier detector, dual polarising prism design monochromator, photo-elastic modulator (PEM) and 150 W Xenon light source.

Example 1. Preparation Process of the MOFs of the Invention

Step 1: Preparation of N'-((dimethylamino)methylene)-N,N-dimethyl formohydrazonamide of formula (IV)

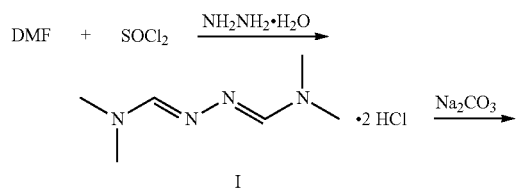

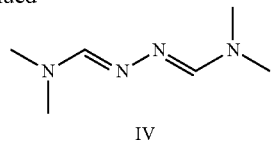

In a 3-neck 250 mL RBF, 150 mL DMF were added and cool down in an ice-batch. Afterwards, 28.6 mL $SOCl_2$ were slowly added under stirring with a syringe. The obtained reaction mixture was stirred for 24 hours. After this time, the RBF was introduced in an ice-bath and once the mixture was cold, 5 mL $NH_2NH_2·H_2O$ dissolved in 15 mL DMF were very slowly added under stirring with a syringe. The reaction mixture was stirred for 48 hours and a precipitate of (IV).2HCl (1) was formed. The precipitate was then filtered and washed with DMF and $Et_2O$. Then, the precipitate (1, MW=215.13 g/mol) was dissolved in 100 mL $H_2O$. In a different beaker $Na_2CO_3$ was dissolved in 100 mL $H_2O$ (ratio 1:$Na_2CO_3$=1:1). Both water solutions were then mixed and the desire product was extracted with 750 mL $Et_2O$, in a liquid-liquid extraction, heating the reaction at 50° C. during 2 days to obtain the compound of formula (IV) (13.5 g, yield 95% yield).

Compound 1:

Anal. Calcd for $C_6H_{16}C_{12}N_4$ (215.12) (%): C, 33.45; H, 7.45; Cl, 33.0; N, 26.0 Found: 33.45; H, 7.7; Cl, 33.0; N, 25.9.

$^1$H NMR (500 MHz, $D_2O$) δ 8.44 (s, 2H), 3.29 (bs, 12H).

Compound IV:

Anal. Calcd for $C_6H_{14}N_4$ (142.1219) (%): C, 50.65; H, 9.85; N, 39.4.

Found: C, 50.35; H, 10.25; N, 39.6%.

$^1$H NMR (400 MHz, DMSO) δ 7.69 (s, 2H), 2.72 (s, 12H).

Step 2. Preparation of (R)- and (S)-enantiomers of the compound (imidazol-5-ylmethyl)-(1,2,4-triazol-4-yl)acetic acid of formula (III)

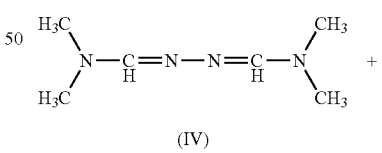

(IV)

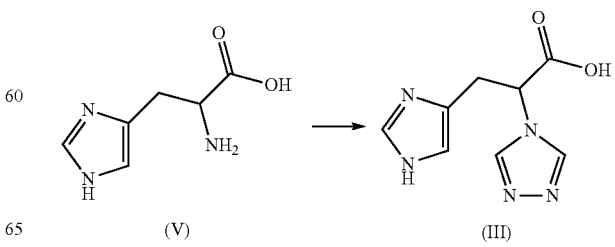

2.1. (S)-(imidazol-5-ylmethyl)-(1,2,4-triazol-4-yl) acetic acid (S)-(III)

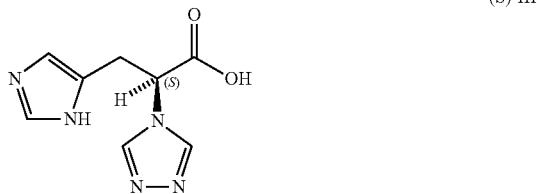

(S)-III

The compound of formula (IV) obtained in step 1 (6.3 g, 0.04 mmol) and L-histidine (L-V; 3.1 g, 0.02 mmol) were mixed together in 150 mL EtOH. The mixture was refluxed with stirring at 80° C. during two days. The final solution was filtered off from unreacted histidine and rota-evaporated to obtain an orange gel that was washed and precipitated with EtOH. The white precipitate obtained was collected by filtration, washed with EtOH and dried in air to yield the compound of formula (S)-(III) (3.5 g; 85%).

Anal. Calcd: $C_8H_9N_5O_2$ (207.08) (%): C: 46.38, H: 4.38, N: 33.80. Found: C, 46.36; H, 4.52; N, 33.78.

IR (ATR, cm$^{-1}$): 1637 (s), 1601 (m), 1535 (s), 1463 (s), 1440 (s), 1397 (s), 1359 (s), 1294 (s), 1261 (s), 1209 (s), 1080 (s), 1031 (s), 1009 (s), 971 (s), 921 (s), 872 (s), 838 (s), 796 (s), 731 (s), 710 (s), 681 (s), 647 (s), 630 (s), 483 (s), 424 (s).

$^1$H NMR (500 MHz, D$_2$O): δ 8.51 (d, J=10.6 Hz, 3H), 7.10 (s, 1H), 5.23 (m, J=9.3, 5.4, 1.2 Hz, 1H), 3.57 (m, 2H).

2.2. (R)-(imidazol-5-ylmethyl)-(1,2,4-triazol-4-yl) acetic acid (R)-(III)

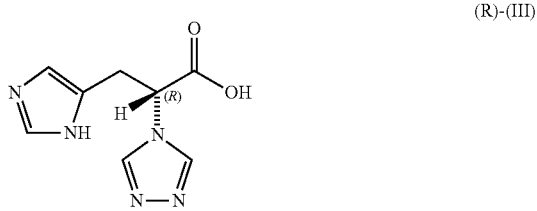

(R)-(III)

The preparation of the compound of formula (R)-(III) was carried out following the process as defined in section 2.1 using D-histidine (D-V) instead of L-histidine (L-V). Following this process 3.5 g of the compound of formula (R)-(III) was obtained (yield 85%).

Anal. Calcd: $C_8H_9N_5O_2$ (207.08) (%): C: 46.38, H: 4.38, N: 33.80. Found: C, 46.36; H, 4.52; N, 33.78.

IR (ATR, cm$^{-1}$): 1637 (s), 1601 (m), 1535 (s), 1463 (s), 1440 (s), 1397 (s), 1359 (s), 1294 (s), 1261 (s), 1209 (s), 1080 (s), 1031 (s), 1009 (s), 971 (s), 921 (s), 872 (s), 838 (s), 796 (s), 731 (s), 710 (s), 681 (s), 647 (s), 630 (s), 483 (s), 424 (s).

$^1$H NMR (500 MHz, D$_2$O): δ 8.51 (d, J=10.6 Hz, 3H), 7.10 (s, 1H), 5.23 (m, J=9.3, 5.4, 1.2 Hz, 1H), 3.57 (m, 2H).

Step 3. Preparation of the MOF

3.1. MOF Having Repeating Units of (SS)-(IB1')

$Cu^{II}(CH_3COO)_2 \cdot H_2O$ of formula (VI) (0.48 g, 2.4 mmol) was dissolved in 50 mL of water and the resulting solution was slowly added to an aqueous solution containing (S)-(imidazol-5-ylmethyl)-(1,2,4-triazol-4-yl)acetic acid (S)-(III) (1.0 g, 4.8 mmol) obtained in section 2.1. The final solution was filtered and stored at room temperature and crystals of the MOF having repeating units of (SS)-(IB1') were obtained within 2 days (1.1 g; 70%).

Anal. Calcd: $C_{16}H_{32}CuN_{10}O_{12}$ (620.04) (%): C: 30.99, H: 5.2, N: 22.59. Found: C, 30.79; H, 4.83; N, 22.30.

IR (ATR, cm$^{-1}$): 3289 (br), 1615 (s), 1532 (s), 1495 (s), 1395 (s), 1355 (s), 1263 (s), 1242 (s), 1211 (s), 1180 (s), 1116 (s), 1087 (s), 1015 (s), 979 (s), 891 (s), 845 (s), 752 (s), 701 (s), 660 (s), 647 (s), 549 (s), 511 (s), 472 (s).

3.2. MOF Having Repeating Units of (RR)-(IB1')

The preparation of the MOF having repeating units of (RR)-(IB1') was carried out following the process as defined in section 3.1 using (R)-(imidazol-5-ylmethyl)-(1,2,4-triazol-4-yl)acetic acid of formula (R)-(III) instead of (S)-(III). Following this process crystals of the MOF having repeating units of (RR)-(IB1') were obtained within 2 days (1.1 g; 70%).

Anal. Calcd: $C_{16}H_{32}CuN_{10}O_{12}$ (620.04) (%): C: 30.99, H: 5.2, N: 22.59. Found: C, 30.79; H, 4.83; N, 22.30.

IR (ATR, cm$^{-1}$): 3289 (br), 1615 (s), 1532 (s), 1495 (s), 1395 (s), 1355 (s), 1263 (s), 1242 (s), 1211 (s), 1180 (s), 1116 (s), 1087 (s), 1015 (s), 979 (s), 891 (s), 845 (s), 752 (s), 701 (s), 660 (s), 647 (s), 549 (s), 511 (s), 472 (s).

3.3. MOF Having Repeating Units of (SS)-(IA1) or (RR)-(IA1)

The preparation of the MOF having repeating units of (SS)-(IA1), or alternatively of (RR)-(IA1)) was carried out by submitting the as-synthesized material MOF having repeating units of (SS)-(IB1'), or alternatively of (RR)-(IB1') obtained in section 3.1. or alternatively respectively 3.2 under vacuum conditions at a temperature of 150° C. for 12 h. Following this process crystals of the MOF having repeating units of (SS)-(IA1) were obtained (quantitative).

Specific (BET) surface area: 970 m$^2$/g.
Pore volume: 0.35 cm$^3$/g.

Example 2. Stability Test

2.1. Method

Samples:
Test sample: MOF having repeating units of (SS)-(IB1')
Aqueous solutions at pH=2.10, pH=3.17, pH=10.55 and pH 11.65

2.1.1 Temperature and pH Stability Test Methodology

For thermal stability test, fresh powder sample of the MOF having repeating units of (SS)-(IB1') was measured in-situ in a range of temperatures between 280K and 500K, using a Bruker D8 advance Powder Diffractometer. Every 10K experimental PXRD were acquired.

The same experiment was done with the single-crystal of the MOF having repeating units of (SS)-(IB1') defined in the present invention using a Rigaku MicroMax-007HF with Pilatus 200K Single Crystal Diffractometer in a range of temperatures between 100 and 500 K.

Upon heating of the sample under a nitrogen atmosphere, (SS)-(IB1') is gradually converted into (SS)-(IA1), due to the loss of water molecules.

For the pH stability test 20 mg of a polycrystalline sample of the MOF having repeating units of (SS)-(IB1') was soaked in each aqueous solution as defined above (aqueous solutions at pH=2.10, pH=3.17, pH=10.55 and pH 11.65) for 24 hours. After that time, each sample was filtered and the filtrates kept. And then, the collected filtrates were evacuated at 150° C. (423 K) for 15 hours prior to BET surface measurements.

2.1.2. $N_2$ Sorption Test Methodology

A fresh polycrystalline sample of the MOF having repeating units of (SS)-(IB1') was loaded into the chemisorption cell and activated from room temperature to 150° C. (heating rate 2° C. min$^{-1}$) in $N_2$ atmosphere for 12 h to obtain the MOF having repeating units of (SS)-(IA1). The BET method disclosed in S. Brunauer et al., "Adsorption of Gases in Multimolecular Layers", J. Am. Chem. Soc. 1938, vol. 60, pp. 309-319 was applied to calculate the total surface area, and the t-plot method B. C. Lippens et al., "Studies on pore systems in catalysts: V. The t method", J. Catal. 1965, vol. 4, pp. 319-323 was used to determine the microporous character of (IA1).

2.2. Results

2.2.1. Results of the pH Stability Test (Pore Volume/BET Surface)

Table 5 summarizes the pore volume values (expressed as cm$^3 \cdot$g$^{-1}$) and the $N_2$ BET surface area values (expressed as m$^2 \cdot$g$^{-1}$) obtained following the process as defined above wherein the MOF having repeating units of (SS)-(IB1') is immersed in a solution of the pH indicated in Table 5:

TABLE 5

| pH | Pore Volume (cm$^3 \cdot$ g$^{-1}$) | BET Surface Area (m$^2 \cdot$ g$^{-1}$) |
|---|---|---|
| 2.10 | 0.215 | 657.19 |
| 3.17 | 0.255 | 669.66 |
| 5-5.5 | 0.349 | 909.88 |
| 10.55 | 0.180 | 499.09 |
| 11.65 | 0.107 | 262.75 |

2.2.2. Results of $N_2$ Adsorption-Desorption Test Methodology

Figure 9:
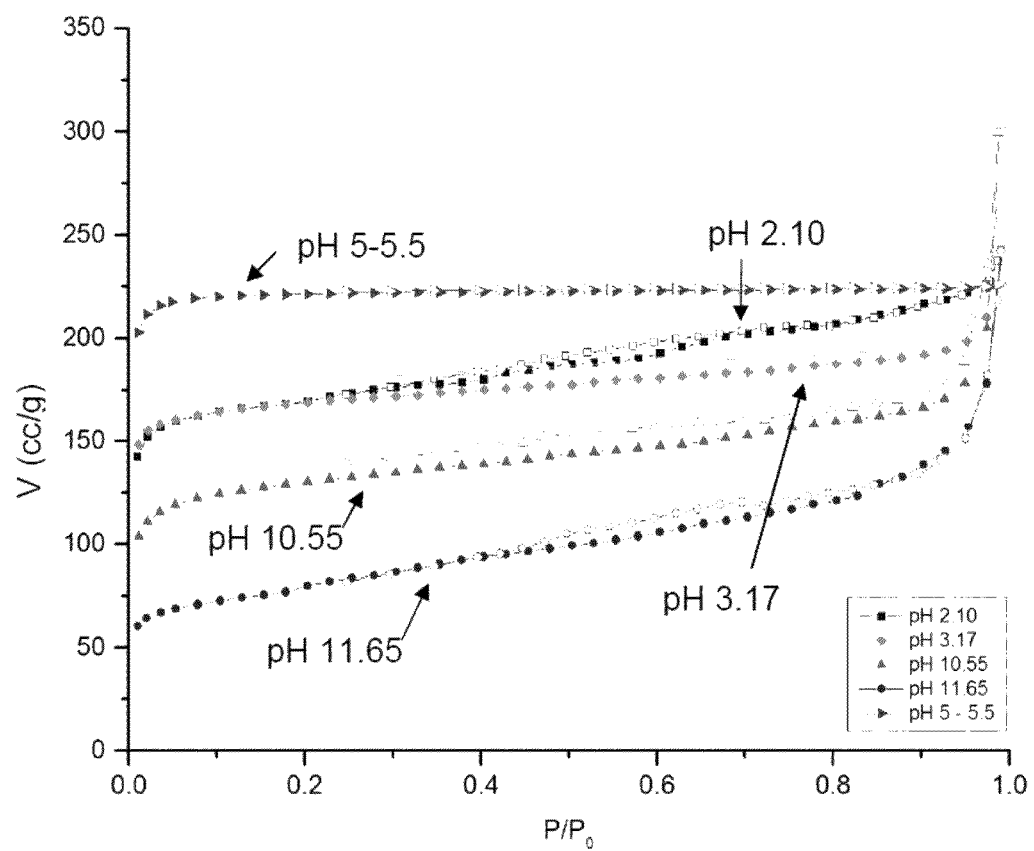
FIG. 9 shows the $N_2$ sorption isotherms of the MOF of the invention having repeating units of formula (SS)-(IA1) after being submitted to the stability test conditions described in Example 2 at the following pH values: pH 2.10, pH 3.17, pH 10.55, pH 11.65, and pH 5-5.5. Filled symbols represent adsorption of $N_2$ and empty symbols represent desorption of $N_2$. The curves express volume (cc/g) versus the ratio (P/P$_0$) wherein: P is the partial vapour pressure of adsorbate gas in equilibrium with the surface at 77.4 K (b.p. of liquid nitrogen) expressed in pascal units, and $P_o$ is the saturated pressure of adsorbate gas expressed in pascal units.
Figure 10:
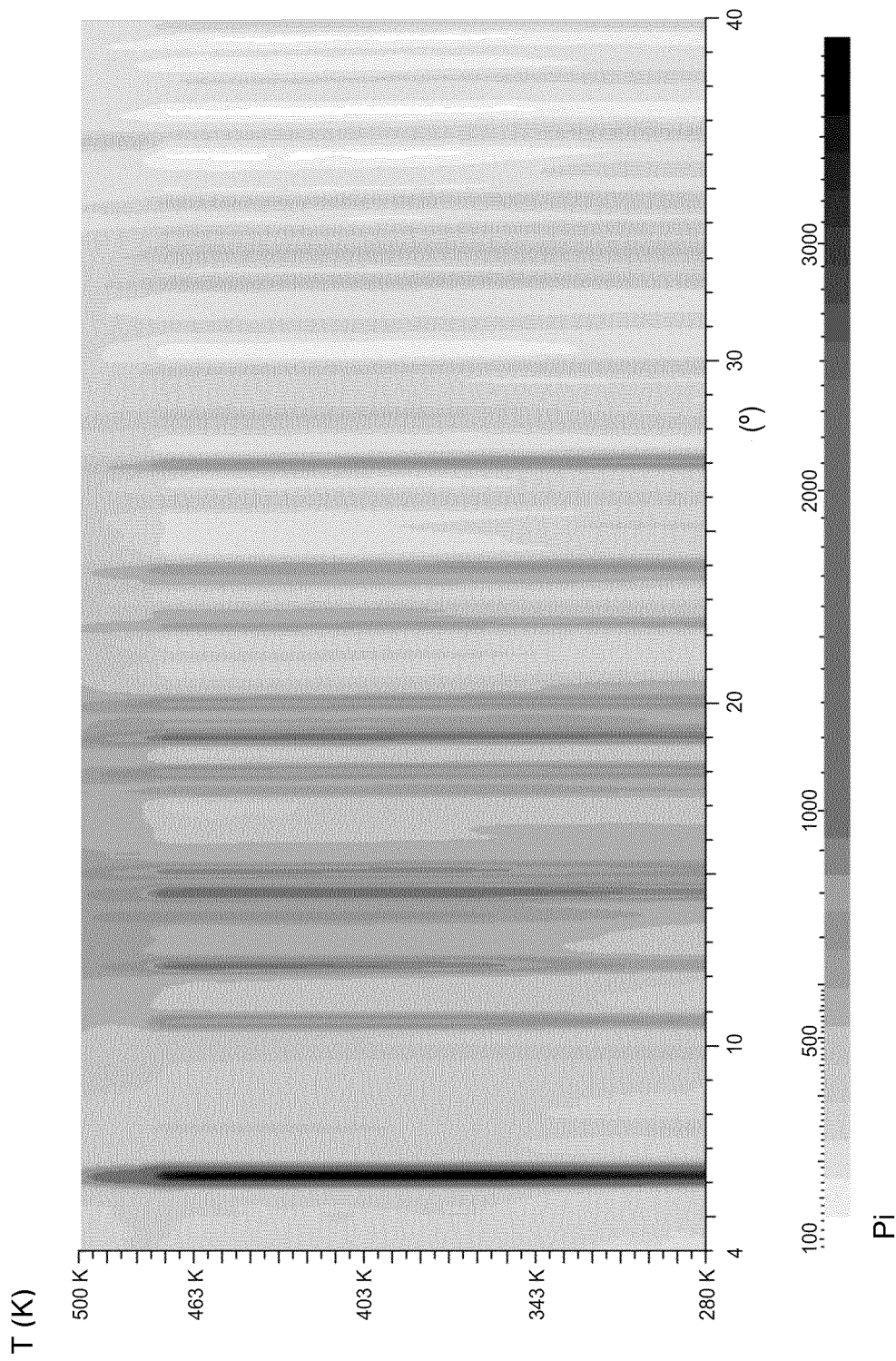
FIG. 10 shows the powder X-ray diffraction pattern of the MOF of the invention having repeating units of formula (SS)-(IB1') after being submitted to the thermal stability test described in Example 2 at temperatures between 280K and 500K. The pattern expresses temperature (K) versus 2 Theta-Scale(°), where Pi refers to peak intensity counts per second.
Figure 11:
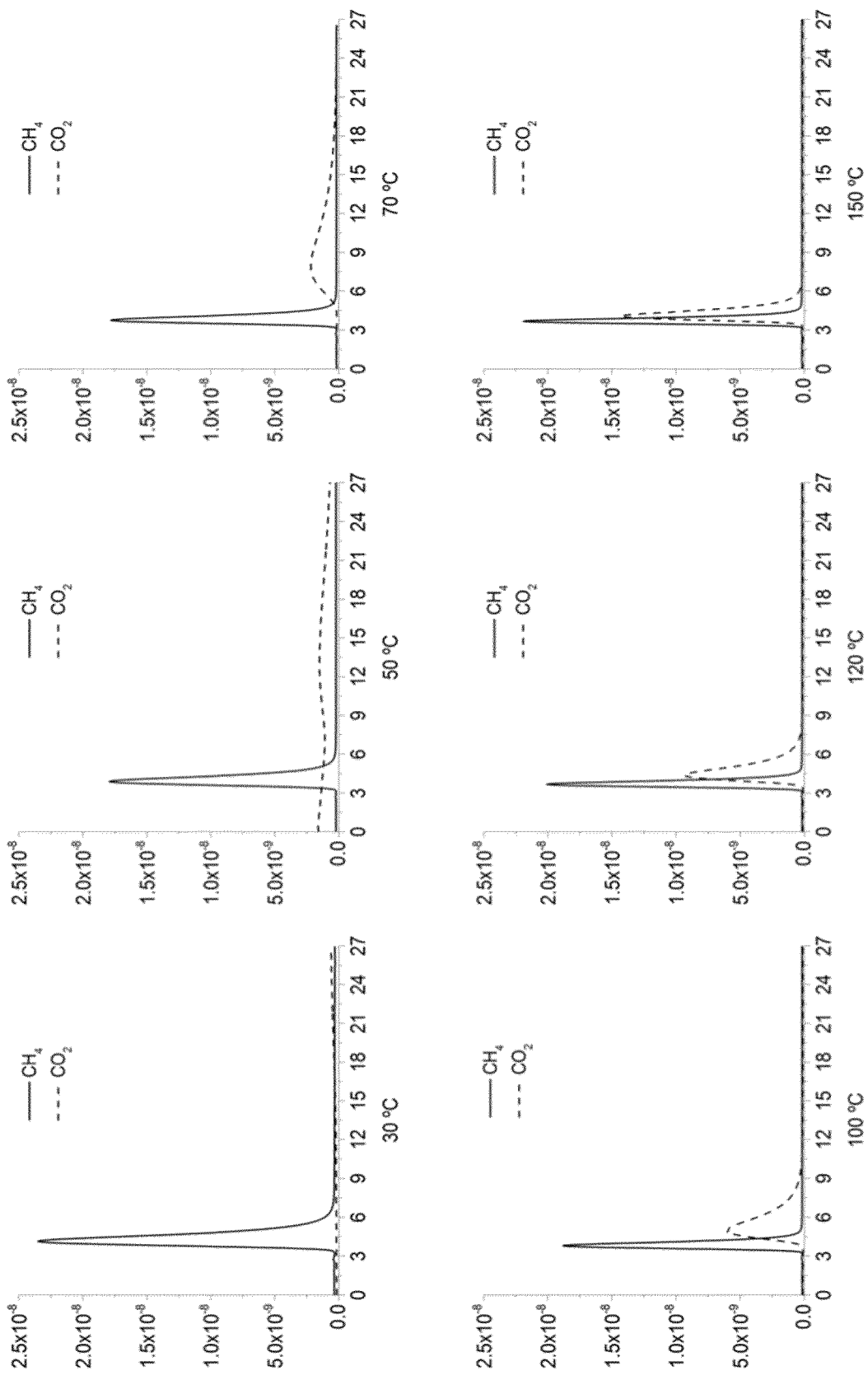
FIG. 11 shows the separation of an equimolar mixture of carbon dioxide and methane (0.34 mL) passing through a bed of MOF having repeating units of formula (SS)-(IA1) (0.8 g) at ambient pressure and at different temperatures. The exit gas was analysed with mass spectrometry as a function of time. The curves express intensity (a.u) versus time (min).

FIG. 9 shows the $N_2$ sorption isotherms of the MOF having repeating units of (SS)-(IB1') submitted at the conditions disclosed in the stability test (temperature and pH disclosed in previous section)

Conclusions

The values of pore volume and the $N_2$ BET surface area of Table 5 show that the MOFs of the present invention are stable even at extreme pH values such as for example pH 2 and pH 9. Furthermore, the $N_2$ adsorption-desorption isotherms of FIG. 9 show that the MOF of the invention maintain its adsorption/desorption capacity even at the above mentioned extreme condition.

Thus, the above results demonstrate that the MOFs of the invention are stable maintaining the adsorption/desorption capacity.

Example 3. Gas Separation Activity

3.1. Temperature Adsorption Test

Retention times for a $CO_2$ pulse through a column containing the MOFs having repeating units of (SS)-(IA) of the invention using $N_2$ stream as gas carrier at different temperatures were measured.

Separation of gas mixtures was studied by pulse chemisorption mass spectrometry on a TPDRO 1100 Series (Thermo Electron Corporation) coupled to a calibrated mass spectrometer (Pffeifer Omnistar GSD 301 C).

Prior to analysis, the MOFs having repeating units of (SS)-(IA1) of the invention was prepared from the MOFs having repeating units of (SS)-(IB1') by activation in vacuum at 150° C. for 12 h.

Next, the sample was transferred to a TPDRO quartz fixed-bed reactor (10 mm internal diameter) for drying under nitrogen for 2 h (20 cm$^3$ STP min$^{-1}$) and the temperature was raised from room temperature to 150° C. at 10° C. min$^{-1}$. A known volume of $CO_2$/$CH_4$ (0.34 mL) was then injected as pulse, by using a six-port valve, in the temperature range from 30° C. to 150° C. in nitrogen flow. The experiments done at temperatures comprised 30° C. to 70° C. were followed by temperature programmed desorption (TPD) at 80° C. under nitrogen flow. Masses m/z 15 ($CH_4$), 18 ($H_2O$), 28 ($N_2$), 32 ($O_2$), 44 ($CO_2$) were continuously monitored by mass spectrometry.

Results

Table 6 summarizes the intensity of the retention (expressed as a.u.) and the time of retention (expressed in minutes) of carbon dioxide:

TABLE 6

| Temperature (° C.) | Intensity (a.u.) | Time (min) |
|---|---|---|
| 40 | 8.66E−9 | 19.79 |
| 60 | 4.72E−8 | 18.16 |
| 80 | 1.21E−7 | 11.18 |
| 100 | 2.36E−7 | 6.17 |
| 120 | 3.31E−7 | 3.93 |
| 140 | 4.05E−7 | 3.53 |

The values of intensity and time of retention of $CO_2$ show that the MOFs of the present invention are capable of adsorbing selectively the $CO_2$ between room temperature and 140° C.

3.2. Selectivity Adsorption Test

3.2.1. High-Pressure Adsorption

Method

The high-pressure adsorption isotherms of $CO_2$, $CH_4$, Hz, $N_2$ and CO of the MOF having repeating units of (SS)-(IA1) of the present invention were collected in an Autosorb iQ at 313 K.

Prior to analysis, the MOFs having repeating units of (SS)-(IA1) of the invention was prepared from the MOFs having repeating units of (SS)-(IB1') by activation. Particularly, the method comprises preliminary loading of the fresh sample of the MOFs having repeating units of (SS)-(IB1') into the chemisorption cell and activation from room temperature to 150° C. (heating rate 2° C. min$^{-1}$) in $N_2$ atmosphere for 12 h. Once activated, the gas was switched from $N_2$ to $CO_2$ (or $CH_4$, or CO, or $H_2$) and the isothermal experiments were performed.

Results

Figure 6:
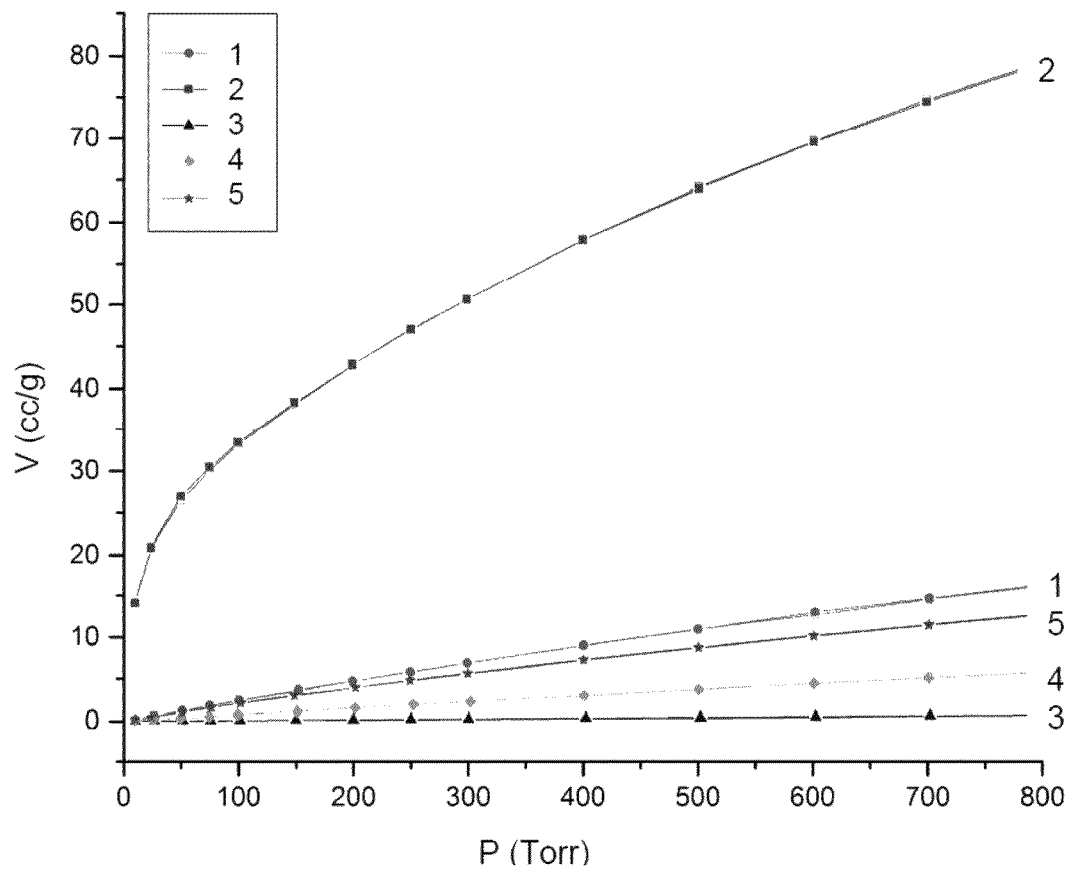
FIG. 6 shows the high-pressure adsorption isotherms of $CH_4$(1), $CO_2$(2), $H_2$ (3), $N_2$ (4) and CO (5) by the MOF of the invention having repeating units of formula (SS)-(IA1). The curve expresses the volume (cc/g) versus the pressure (Torr).
Figure 7:
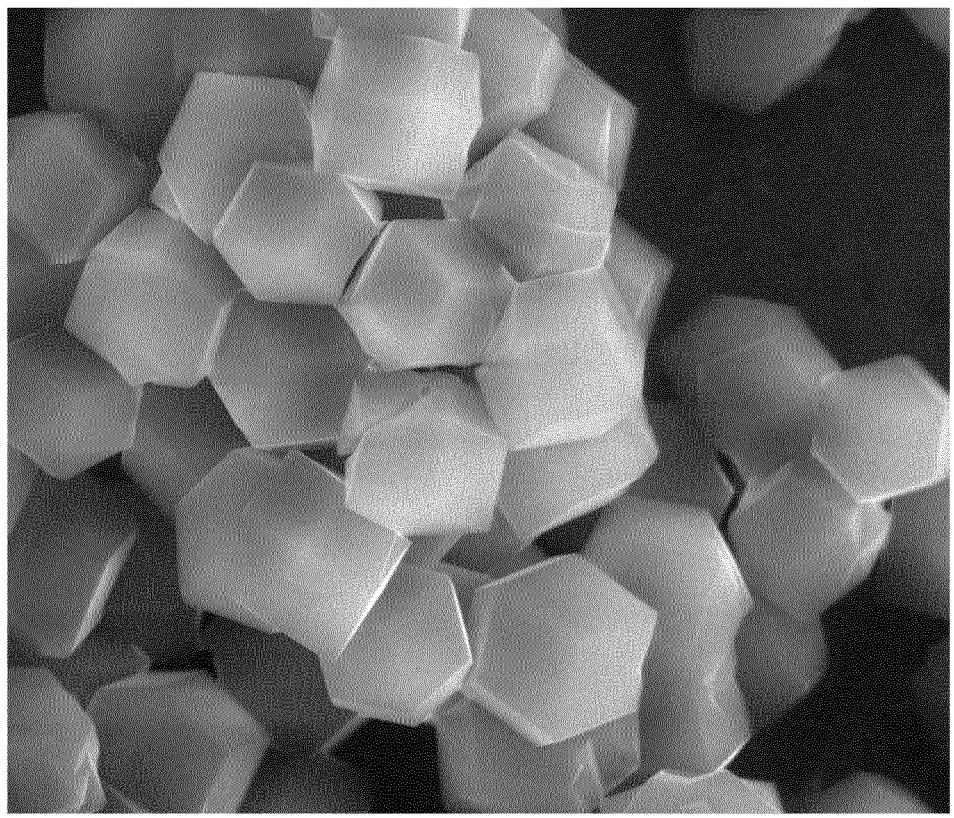
FIG. 7 shows the scanning electron microscopy (SEM) image of the MOF of the invention having repeating units of formula (SS)-(IB1').

As it is shown in the high-pressure adsorption isotherms of 002, $CH_4$, Hz, $N_2$ and CO of the MOF having repeating units of (SS)-(IA1) in FIG. 6, the MOFs of the invention exhibit maximum uptakes of 79, 16.3, 0.7, 5.79 and 12.68 cc/g respectively at 800 Torr.

It means that the MOFs of the invention have a high capacity of adsorption of $CO_2$ even in the presence of other gases at different pressures. It is advantageous because the MOF as defined in the present invention allow the high selective adsorption of carbon dioxide even at high pressures.

3.2.2. Temperature Adsorption Test

Retention times for a $CH_4$ and $CO_2$ (1:1) pulse through a column containing the MOF having repeating units of (SS)-(IA1) of the present invention using $N_2$ stream as gas carrier at different temperatures were measured. Prior to analysis, the MOFs having repeating units of (SS)-(IA1) of the invention was prepared from the MOFs having repeating units of (SS)-(IB1') by activation as defined above in section 3.2.1.

The evolution of the gases during 002 trapping was studied by pulse chemisorption mass spectrometry on a TPDRO 1100 Series (Thermo Electron Corporation) coupled to a calibrated mass spectrometer (Pffeifer Omnistar GSD 301 C). Prior to analysis, the MOFs having repeating units of (SS)-(IB1') was activated in vacuum at 150° C. for 12 h on a Quantachrome Autosorb iQ analyzer to obtain MOFs having repeating units of (SS)-(IA1). Next, the sample was transferred to a TPDRO quartz fixed-bed reactor (10 mm i.d.) for drying under nitrogen for 2 h (20 cm$^3$ STP min$^{-1}$) and the temperature was raised from room temperature to 150° C. at 10° C. min$^{-1}$. A known volume of $CO_2/CH_4$ (0.34 mL) was then injected as pulse, by using a six port valve, in the temperature range from 30° C. and 150° C. in nitrogen flow. The experiments done at a temperature from 30° C. and 70° C. were followed by temperature programmed desorption (TPD) at 80° C. under nitrogen flow. Masses m/z 15 ($CH_4$), 18 ($H_2O$), 28 ($N_2$), 32 ($O_2$), 44 ($CO_2$) were continuously monitored by mass spectrometry.

Results

Table 7 summarizes the retention time of $CO_2$ by the MOF having repeating units of (SS)-(IA1), particularly the intensity of the retention (expressed as a.u.) and the time of retention (expressed in minutes) of each one of the gases.

TABLE 7

| Temperature (° C.) | Intensity (a.u.) | | Time (min) | |
|---|---|---|---|---|
| | $CO_2$ | $CH_4$ | $CO_2$ | $CH_4$ |
| 30 | — | 2.32E-8 | — | 4.21 |
| 40 | — | 1.93E-8 | — | 3.62 |
| 50 | 5.42E-10 | 1.77E-8 | 19.99 | 3.07 |
| 60 | 1.17E-9 | 1.76E-8 | 20.21 | 2.87 |
| 70 | 2.01E-9 | 1.76E-8 | 22.22 | 2.87 |
| 80 | 3.01E-9 | 1.80E-8 | 20.30 | 2.84 |
| 90 | 4.29E-9 | 1.83E-8 | 12.75 | 2.52 |
| 100 | 5.94E-9 | 1.86E-8 | 10.31 | 2.20 |
| 110 | 7.67E-9 | 1.93E-8 | 7.93 | 2.22 |
| 120 | 9.28E-9 | 1.99E-8 | 6.47 | 1.97 |
| 130 | 1.06E-8 | 2.04E-8 | 6.47 | 1.87 |
| 140 | 1.24E-8 | 2.12E-8 | 5.34 | 1.87 |
| 150 | 1.42E-8 | 2.17E-8 | 4.50 | 1.87 |

The values of intensity and time of retention of $CO_2$ and $CH_4$ show that depending on the temperature of the gas stream, the MOFs of the present invention are capable of adsorbing selectively $CO_2$ or $CH_4$.

3.3. Hydrogenation Reaction

The evolution of the gases during hydrogenation reaction was studied by pulse chemisorption mass spectrometry on a TPDRO 1100 Series (Thermo Electron Corporation) coupled to a calibrated mass spectrometer (Pffeifer Omnistar GSD 301 C).

Prior to analysis, the MOFs having repeating units of (SS)-(IA1) of the invention was prepared from the MOFs having repeating units of (SS)-(IB1') by activation. Particularly, the MOF having repeating units of (SS)-(IB1') was activated in vacuum at 150° C. for 12 h on a Quantachrome Autosorb iQ analyzer. Next, the sample was transferred to a TPDRO quartz fixed-bed reactor (10 mm i.d.) for drying under nitrogen for 2 h (20 cm$^3$ STP min$^{-1}$) and the temperature was raised from room temperature to 150° C. at 10° C. min$^{-1}$.

A known volume of $CO_2$ (0.34 mL) was then injected as pulse, by using a six port valve, in the temperature range from 30° C. to 150° C. in 5% $H_2$ in $N_2$ stream. The experiments done at a temperature from 30° C. to 70° C. were followed by temperature programmed desorption (TPD) at 80° C. under nitrogen flow. Masses m/z 15 ($CH_4$), 16 ($CH_4$, $O_2$), 18 ($H_2O$), 28 ($N_2$, CO, $H_2CO$, $C_2H_4$), 30 ($H_2CO$), 31 ($CH_3OH$, $CH_3CH_2OH$), 32 ($O_2$, $CH_3OH$), 44 ($CO_2$, $CH_3COH$), 46 (HCOOH, $CH_3CH_2OH$) were continuously monitored by mass spectrometry.

Results

Figure 12:
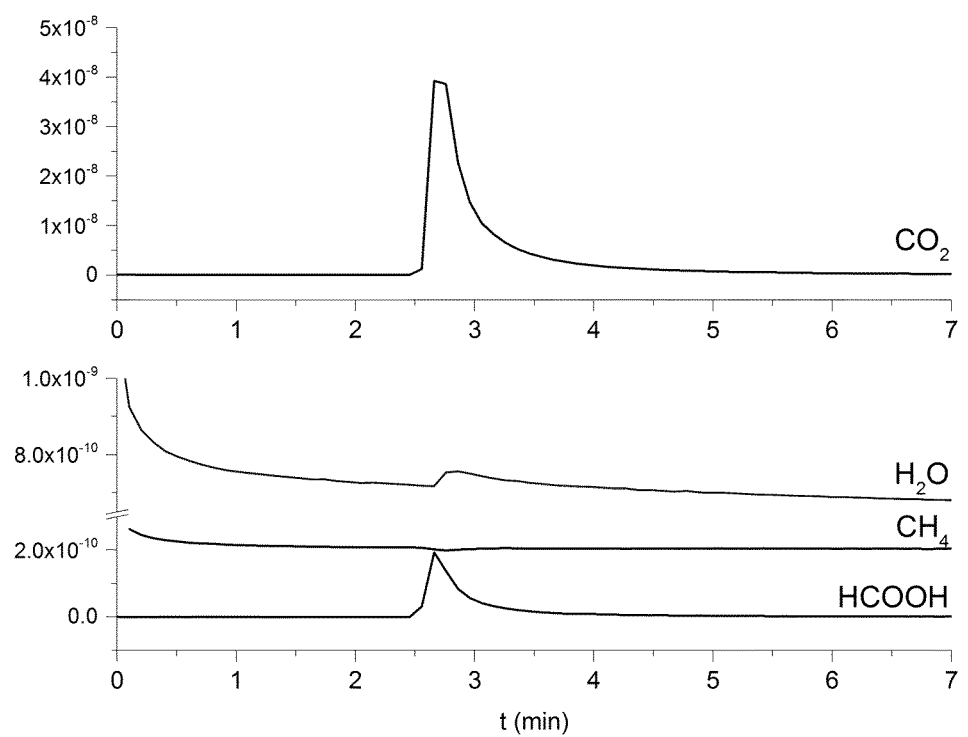
FIG. 12 shows the analysis of products from the hydrogenation reaction at 70° C. of passing one $CO_2$ (0.34 mL) pulse through a bed of MOF having repeating units of formula (SS)-(IA1) using a stream of 5% $H_2$ in $N_2$. The pulse yields $CO_2$ (unreacted, top figure), (bottom figure) $H_2O$ and HCOOH (major product of the hydrogenation reaction). The curves express intensity (arbitrary units) versus time (min).

As it is shown in FIG. 12, the MOF having repeating units of (SS)-(IA1) catalyses the hydrogenation reaction leading to the formations of mainly HCOOH at temperatures comprised from 30° C. to 150° C.

Example 4. Enantioselective Separation

4.1. Method

Prior to analysis, the MOFs having repeating units of (SS)-(IA1) of the invention was prepared from the MOFs having repeating units of (SS)-(IB1') by activation. Particularly, MOFs having repeating units of (SS)-(IB1') was activated in vacuum at 150° C. for 12 h on a Schlenk line.

30 mg of the activated MOF having repeating units of (SS)-(IA1) was placed into a solvent as defined in Table 8 at the appropriate temperature as shown in Table 8 with racemic ibuprofen (50% S/R) in a molar ratio (SS)-(IA1): ibuprofen of 1:3. The reaction was stirred at the temperature indicated in Table 8 overnight. The reaction was filtered to remove the solid, which was washed with a small amount of fresh acetonitrile to remove any ibuprofen sorbed on the surface of the framework. The term "mother liquor" refers to the mixture of the filtrate and the first wash.

The amount and chirality of ibuprofen sorbed by the activated MOF was extracted from the solid by suspension in CHCl$_3$ (2 ml) at room temperature for 1 hour. After this time the solid was removed by filtration and the filtrate was analysed by $^1$H NMR.

The enantiomeric excess was determined comparing with the commercially available pure enantiomer, (S)-(+)-Ibuprofen or (S)-(+)-4-Isobutyl-α-methylphenylacetic acid, or (S)-(+)-2-(4-Isobutylphenyl)propionic acid (CAS: 51146-56-6, Sigma-Aldrich); and (R)-(+)-Ibuprofen or (R)-(+)-4-Isobutyl-α-methylphenylacetic acid or (R)-(+)-2-(4-Isobutylphenyl)propionic acid (CAS: 51146-57-7, Santa Cruz Bio Biotech) using a ultra-performance convergence chromatography (UPPC), ACQUITY UPC2 Waters system with Diode Array Detector; a Column: ChiralPak IA 4.6 mm×100 mm, 3 μm, under the following conditions: CO$_2$/ACN/TFA 88:12:0.5, 3 ml/min, 1500 psi.

4.2. Results

Table 8 summarizes the amount of each one of the enantiomer of ibuprofen in the mother liquor and also in the ibuprofen extracted from the MOFs having repeating units of (SS)-(IA1) of the in the invention. Furthermore, Table 8 also specifies the solvent and the temperature of each one of the independent runs:

TABLE 8

| Run[a] | Solvent | T (° C.) | Ibuprofen in mother liquor[b] S/R (%) | Ibuprofen extracted from MOF S/R (%) |
|---|---|---|---|---|
| 1 | H$_2$O | RT | 51.4/48.6 | 49.7/50.3 |
| 2 | ACN | 70 | 51.26/48.74 | 30.9/69.1 |
| 3[d] | ACN | 70 | 56.9/43.1 | 32.9/67.1 |
| 4 | ACN | RT | 50.7/49.3 | 35.0/65.0 |
| 5 | EtOH | 70 | 49.8/50.2 | 47.5/52.5 |
| 6 | CHCl$_3$ | 50 | 50/50 | 49.1/50.9 |
| 7 | CH$_2$Cl$_2$ | RT | 49.6/50.4 | 54.6/45.4 |
| 8 | THF | 70 | 49.9/50.1 | 55.9/44.1 |
| 9 | Toluene | 100 | 48.1/51.9 | 56.7/43.3 |
| 10 | Hexane | 60 | 48.7/51.3 | 49.8/50.2 |

[a]Conditions: 30 mg of activated MOF having repeating units of (SS)-(IA1) prepared from MOF having repeating units of (SS)-(IB1') by activation, 0.14 mmol Ibuprofen (28.9 mg), in a molar ratio 1/3 (MOF/Ibuprofen), 3 mL solvent, overnight. CHCl$_3$ used as solvent to remove the ibuprofen sorbed by the activated MOF having repeating units of (SS)-(IA1).
[b]Includes mother liquor and first wash of the loaded activated MOF having repeating units of (SS)-(IA1). Both aliquots give the same analyses separately.
[c]Ibuprofen solution was adjusted to pH 11 and was added to activated MOF having repeating units of (SS)-(IA1) to solubilize ibuprofen in water.
[d]In excess of activated MOF having repeating units of (SS)-(IA1) molar ratio MOF/Ibuprofen 3:1 RT is the abbreviation of the room temperature

Example 5. Asymmetric Ring Opening of Epoxides

5.1. Method

Prior to analysis, the MOFs having repeating units of (SS)-(IA1) of the invention was prepared from the MOFs having repeating units of (SS)-(IB1') by activation. Particularly, MOFs having repeating units of (SS)-(IB1') was activated in vacuum at 150° C. for 12 h on a Schlenk line.

The activated MOF having repeating units of (SS)-(IA1) (0.05 mmol), styrene oxide (0.5 mmol) and an amine as defined in Tables 9-11 (0.5 mmol) were stirred in a solvent and at the temperature specified in Tables 9-11 overnight. Then, the reaction mixture was filtered and the structure of the reaction products 4 and 5 were determined by $^1$H NMR in CDCl$_3$.

5.2. Results

Section A.

Table 9 summarizes the conversion and regioselectivity of formation of compounds 4 and 5; as well as the specific amount of each one of the enantiomers of compounds 4 and 5 when the asymmetric ring opening reaction is performed by reacting styrene oxide with the amine of formula (3) in the presence of the activated MOF of the invention having repeating units of (SS)-(IA1) under the following reaction conditions: epoxide (0.5 mmol), amine of formula (3) (0.5 mmol), activated MOF having repeating units of (SS)-(IA1) (10 mol %), 2 mL solvent, overnight:

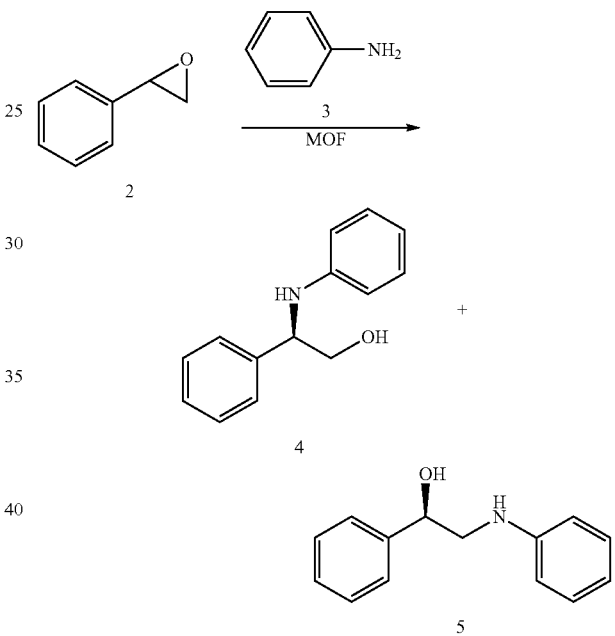

Table 9 also specifies the solvent and the temperature of the opening reaction.

TABLE 9

| | | | | Compound 4 | | | Compound 5 | | |
|---|---|---|---|---|---|---|---|---|---|
| Entry | Solvent | Temp (° C.) | Conv. (%)[b] | Sel. 4 (%)[b] | 4R (%)[c] | 4S (%)[c] | Sel. 5 (%)[b] | 5R (%)[c] | 5S (%)[c] |
| 1 | — | RT | 44.4 | 76.2 | 45.5 | 55.5 | 23.8 | 55.1 | 44.9 |
| 2 | — | 80 | 87.9 | 67.2 | 52.6 | 47.4 | 32.8 | 51.2 | 48.8 |
| 3 | ACN | RT | 26.1 | 94.1 | 68.3 | 31.7 | 5.9 | 42 | 58 |
| 4 | ACN | 40 | 53.15 | 83.4 | 66.7 | 33.3 | 13.6 | 46.4 | 53.8 |
| 5 | ACN | 60 | 64 | 91.8 | 63 | 37 | 8.2 | 50.5 | 49.5 |
| 6 | ACN | 80 | 84 | 87 | 60 | 40 | 13 | 46.2 | 53.8 |
| 7 | ACN | 100 | 49 | 80 | 61.8 | 38.2 | 20 | 42.1 | 57.9 |
| 8[d] | ACN | 0 | 33 | 83.5 | 53.6 | 47.4 | 16.5 | 48.6 | 51.4 |
| 9 | Toluene | RT | <1 | >95 | 35.8 | 64.2 | <5 | 63.3 | 36.7 |
| 10 | Toluene | 80 | 10.8 | 69.1 | 30 | 65 | 30.9 | 63 | 37 |
| 11 | Toluene | 100 | 21.8 | 66.6 | 40.6 | 59.4 | 33.4 | 60 | 40 |
| 12 | THF | RT | <1 | >95 | 38.7 | 61.3 | <5 | 47.2 | 52.8 |
| 13 | THF | 60 | 1 | >90 | 43.7 | 56.3 | <10 | 60.1 | 39.9 |
| 14 | THF | 80 | 30.6 | 80.7 | 48.4 | 51.6 | 19.3 | 59.7 | 40.3 |

TABLE 9-continued

| | | | | Compound 4 | | | Compound 5 | | |
|---|---|---|---|---|---|---|---|---|---|
| Entry | Solvent | Temp (° C.) | Conv. (%)[b] | Sel. 4 (%)[b] | 4R (%)[c] | 4S (%)[c] | Sel. 5 (%)[b] | 5R (%)[c] | 5S (%)[c] |
| 15 | EtOAc | 80 | 32.2 | 69.1 | 43.5 | 56.5 | 30.9 | 59.1 | 40.9 |
| 16 | Acetone | 40 | 18.22 | 45.6 | 40.5 | 59.5 | 54.4 | 67.4 | 32.6 |

[b]Conversion and regioselectivity were determined by ¹H NMR and compared with the compounds disclosed in the bibliography (C. E. Harris et al., "Boranes in Synthesis. 6. A New Synthesis of .beta.-Amino Alcohols from Epoxides. Use of Lithium Amides and Aminoborane Catalysts To Synthesize .beta.-Amino Alcohols from Terminal and Internal Epoxides in High Yield", *J. Org. Chem.*, 1994, vol. 59 (25), pp. 7746-7751).
[c]Determined by Ultra performant chromatography. (UPPC)-(IA column), $CO_2$/IPA gradient (from 0 to 40% IPA), 3 ml/min 1500 psi.
[d]Reaction time: 3 days Section B.

Table 10 summarizes the conversion and regioselectivity of formation of compounds 4 and 5; as well as the specific amount of each one of the enantiomers of compounds 4 and 5 when the asymmetric ring opening reaction is performed in acetonitrile by reacting styrene oxide with the amine of formula (3) in the presence of the activated MOF of the invention that have repeating units of (SS)-(IA1) under the following reaction conditions: epoxide (0.5 mmol), amine of formula (3) (0.5 mmol), activated MOF having repeating units of (SS)-(IA1) (20 mol %), 2 ml ACN, overnight.

Table 10 also specifies the temperature of the opening reaction.

TABLE 10

| | | | Compound 4 | | | Compound 5 | | |
|---|---|---|---|---|---|---|---|---|
| Entry | Temp (° C.) | Conv (%)[d] | Sel. 4 (%)[d] | 4R (%)[e] | 4S (%)[e] | Sel. 5 (%)[d] | 5R (%)[e] | 5S (%)[e] |
| 1[a] | RT | 34.4 | 92.9 | 67.5 | 32.5 | 7.1 | 44.2 | 55.8 |
| 2[a] | 60 | 66.7 | 90 | 58.2 | 41.8 | 10 | 48 | 52 |
| 3[a] | 80 | 65.2 | 88 | 53.3 | 46.7 | 12 | 45.5 | 54.5 |
| 4[a] | 100 | 43.2 | 84.4 | 55.1 | 44.9 | 15.6 | 42.5 | 57.5 |
| 5[b] | RT | 5 | >99 | 67.9 | 32.1 | >1 | 41 | 59 |
| 6[b] | 40 | 24.1 | 79.2 | 69.1 | 30.9 | 10.8 | 41.5 | 58.5 |
| 7[b] | 60 | 24 | 86.6 | 66.1 | 33.9 | 13.4 | 43.1 | 56.9 |
| 8[b] | 80 | 19.7 | 80.8 | 56.7 | 43.3 | 19.2 | 42.4 | 57.6 |
| 9[c] | 40 | 26.6 | 94.5 | 68.8 | 31.2 | 5.5 | 43.4 | 56.6 |
| 10[c'] | 40 | 54 | 87.9 | 61.5 | 38.5 | 12.1 | 47.2 | 52.8 |

[a]Reaction conditions: epoxide (0.5 mmol), amine of formula (3) (0.5 mmol), activated MOF having repeating units of (SS)-(IA1) (20 mol %). 2 ml ACN, overnight.
[b]Reaction conditions: epoxide (0.5 mmol), amine of formula (3) (0.5 mmol), activated MOF having repeating units of (SS)-(IA1) (3 mol %), 2 ml ACN, overnight.
[c]Reaction conditions: epoxide (0.75 mmol), amine of formula (3) (0.5 mmol), activated MOF having repeating units of (SS)-(IA1) (10 mol %), 2 ml ACN, overnight.
[c']Reaction conditions: epoxide (0.5 mmol), amine of formula (3) (0.75 mmol), activated MOF having repeating units of (SS)-(IA1) (10 mol %), 2 ml ACN, overnight.
[d]Conversion and regioselectivity were determined by ¹H NMR and compared with the bibliography (C. E. Harris et al., "Boranes in Synthesis. 6. A New Synthesis of beta-Amino Alcohols from Epoxides. Use of Lithium Amides and Aminoborane Catalysts To Synthesize beta-Amino Alcohols from Terminal and Internal Epoxides in High Yield", *J. Org. Chem.*, 1994, vol. 59 (25), pp. 7746-7751).
[e]Determined by Ultra performant chromatography. (UPPC)-(IA column), $CO_2$/IPA gradient (from 0 to 40% IPA), 3 ml/min 1500 psi

5.3. Conclusion

As it is shown in Tables 9-10, the MOFs of the invention are useful as catalysts. Particularly, the activated MOF of the invention having repeating units of (SS)-(IA1) is useful as catalyst for the asymmetric ring opening of epoxides.

Example 6. Recycling of MOF

6.1. Method

Prior to analysis, the MOFs having repeating units of (SS)-(IA1) of the invention was prepared from the MOFs having repeating units of (SS)-(IB1') by activation. Particularly, MOFs having repeating units of (SS)-(IB1') was activated in vacuum at 150° C. for 12 h on a Schlenk line.

Activated MOF having repeating units of (SS)-(IA1), styrene oxide and an amine (3) were stirred in acetonitrile at 40° C. overnight. Then, the reaction mixture was filtered, washed with ACN to remove the traces of the product, reactant and impurities. The MOF was dried on vacuum at 50° C. during 30 minutes, and reused in the next cycle. The structure of the reaction products 4 and 5 were elucidated by ¹H NMR in $CDCl_3$.

6.2. Results

Tables 11 and 12 show the conversion and regioselectivity of the compounds of formula 4 and 5 when recycled MOF having repeating units of (SS)-(IA1) was used as a catalyst for the asymmetric opening of styrene oxide. Table 11 is referred to the reusability of the activated MOF having repeating units of (SS)-(IA1) and Table 12 is referred to the reusability of the MOF having repeating units of (SS)-(IB1').

TABLE 11

| | | | Compound 4 | | | Compound 5 | |
|---|---|---|---|---|---|---|---|
| Run | Conv. (%)[c] | Sel. 4 (%)[c] | 4R (%)[d] | 4S (%)[d] | Sel. 5 (%)[c] | 5R (%)[d] | 5S (%)[d] |
| 1[a] | 43.7 | 90 | 66.5 | 33.5 | 10 | 46.5 | 53.5 |
| 2[a] | 34.5 | 87.3 | 63 | 37 | 12.7 | 43.2 | 56.8 |
| 3[b] | 15 | 80.7 | 55.4 | 44.6 | 19.3 | 40.5 | 59.5 |
| 4[b] | 11 | 73 | 58.1 | 41.9 | 27 | 37.7 | 62.3 |
| 5[b] | 13.6 | 68.5 | 56.4 | 43.6 | 31.5 | 41.7 | 58.3 |

[a]Reaction conditions: epoxide (0.5 mmol), amine of formula (3) (0.5 mmol), activated MOF having repeating units of (SS)-(IA1) (10 mol %), 2 ml ACN, overnight.
[b]Reaction conditions: epoxide (0.25 mmol), amine of formula (3) (0.25 mmol), activated MOF having repeating units of (SS)-(IA1) (10 mol %), 1 ml ACN, overnight.
[c]Conversion and regioselectivity were determined by 1H NMR and compared with the bibliography (C. E. Harris et al., "Boranes in Synthesis. 6. A New Synthesis of .beta.-Amino Alcohols from Epoxides. Use of Lithium Amides and Aminoborane Catalysts To Synthesize .beta.-Amino Alcohols from Terminal and Internal Epoxides in High Yield", *J. Org. Chem.*, 1994, vol. 59 (25), pp. 7746-7751).
[d]Determined by Ultra performant chromatography. (UPPC)-(IA column), $CO_2$/IPA gradient (from 0 to 40% IPA), 3 ml/min 1500 psi.

TABLE 12

| | | | Compound 4 | | | Compound 5 | |
|---|---|---|---|---|---|---|---|
| Run | Conv. (%)[c] | Sel. 4 (%)[c] | 4R (%)[d] | 4S (%)[d] | Sel. 5 (%)[c] | 5R (%)[d] | 5S (%)[d] |
| 1[a] | 36.1 | 86.2 | 63.2 | 36.8 | 13.8 | 48.8 | 51.2 |
| 2[a] | 37 | 85.5 | 65.7 | 34.3 | 14.5 | 44.5 | 55.5 |
| 3[b] | 27.8 | 85 | 67.4 | 32.6 | 15 | 43.3 | 56.7 |

TABLE 12-continued

|     | | Compound 4 | | | | Compound 5 | | |
| --- | --- | --- | --- | --- | --- | --- | --- | --- |
| Run | Conv. (%)$^c$ | Sel. 4 (%)$^c$ | 4R (%)$^d$ | 4S (%)$^d$ | | Sel. 5 (%)$^c$ | 5R (%)$^d$ | 5S (%)$^d$ |
| 4$^b$ | 13.8 | 79.6 | 65.1 | 34.9 | | 20.4 | 39 | 61 |
| 5$^b$ | 10.6 | 80.8 | 65.4 | 34.6 | | 19.2 | 39.3 | 60.7 |

$^a$Reaction conditions: epoxide (0.5 mmol), amine of formula (3) (0.5 mmol), MOF having repeating units of (SS)-(IB1') (10 mol %), 2 ml ACN, overnight.
$^a$Reaction conditions: epoxide (0.25 mmol), amine of formula (3) (0.25 mmol), MOF having repeating units of (SS)-(IB1') (10 mol %), 1 ml ACN, overnight.
$^c$Conversion and regioselectivity were determined by 1H NMR and compared with the bibliography. (C. E. Harris et al., "Boranes in Synthesis. 6. A New Synthesis of .beta.-Amino Alcohols from Epoxides. Use of Lithium Amides and Aminoborane Catalysts To Synthesize .beta.-Amino Alcohols from Terminal and Internal Epoxides in High Yield", J. Org. Chem., 1994, vol. 59 (25), pp. 7746-7751.)
$^d$Determined by Ultra performant chromatography. (UPPC)-(IA column), CO$_2$/IPA gradient (from 0 to 40% IPA), 3 ml/min 1500 psi

6.3. Conclusion

As it is illustrated in the results of Tables 11 and 12, the MOF of the invention, particularly, the MOFs having repeating units of formula (RR)-(IA) or (SS)-(IA) or (RS)-(IA) or (SR)-(IA); or alternatively (RR)-(IB) or (SS)-(IB) or (RS)-(IB) or (SR)-(IB); preferably those having repeating units of formula (SS)-(IA1) and (SS)-(IB1') can be recycled for at least five consecutive runs without having a loss of catalytic efficiency as it can be observed in the values of the regioselectivity and enantioselectivity. The use of (SS)-(IB1') as a catalyst is particularly advantageous since there is no need to re-activate (through heating under vacuum) the catalyst before its re-utilization in a further catalytic reaction.

Example 7. Compositions Comprising MOF of the Present Invention

7.1. "Ink": Composition Comprising the MOF of the Invention and at Least a Liquid Carrier

7.1.1. Ink 1 Comprising Poly(Vinylidene Fluoride) as an Organic Polymeric Liquid Carrier Method
Following the synthetic procedure reported in Denny Jr M. S. et al., Angew. Chem. Int. Ed. 2015, vol. 54(31), pp. 9029, 150 mg of MOF having repeating units of (SS)-(IB1') were dispersed in 5 mL acetone with bath sonication for 30 minutes. 1.0 g polyvinildene fluoride (PVDF) solution (7.5 wt % in DMF) was then added to the previous MOF suspension so that the final MOF:PVDF ratio was 2:1 w/w.

The combined MOF/PVDF suspension was sonicated for 30 minutes. Afterwards, acetone was removed by rotatory evaporation to obtain the "ink" comprising the MOF having repeating units of (SS)-(IB1') of the invention and PVDF in DMF.

7.1.2. Ink 2 Comprising Poly(Vinylidene Fluoride) as an Organic Polymeric Liquid Carrier Method
A suspension of 1.46 g of the MOF having repeating units of (SS)-(IB1') in 6 mL DMF was sonicated for 10 min in a Bandelin Sonopuls apparatus using a microtip MS73 (50% energy), then 785 mg of PVDF pellets were added to the suspension and the resulting mixture was stirred at 70° C. for 1 h 40 in this case, to obtain an ink with a final concentration of 0.15 g PVDF per mL DMF and a composition of 65% in weight of the MOF (ink 2).

7.2. "Membrane": Composition Comprising the MOF of the Invention and at Least a Solid Carrier

7.2.1. Membrane 1 Comprising Poly(Vinylidene Fluoride) as an Organic Polymeric Liquid Carrier The ink 1 obtained in section 7.1.1 was cast by hand onto glass substrates with the help of a Pasteur pipette. The films were then heated in an isothermal oven at 70° C. for an hour, to remove the solvent. Delamination of the films was easily made by hand.

Figure 13:
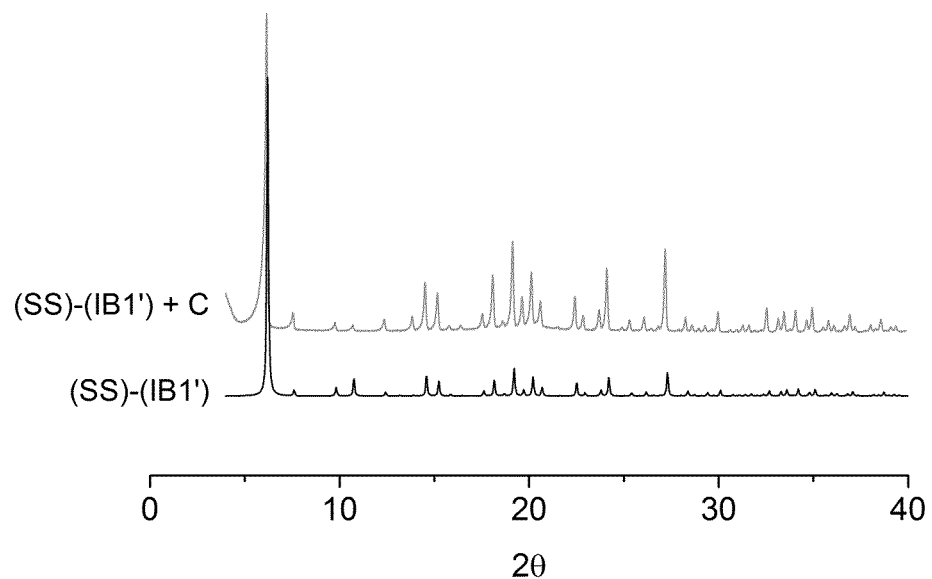
FIG. 13 shows the powder X-ray diffraction pattern of the MOF of the invention having repeating units of formula (SS)-(IB1') and the powder X-ray diffraction pattern of the membrane 1 prepared from the "ink" 1 which comprises the MOF of the invention having repeating units of formula (SS)-(IB1'). The pattern expresses intensity (counts) versus 2 Theta angle (°).

The powder X-ray diffraction pattern of membrane 1 which comprises the MOF of the invention having repeating units of formula (SS)-(IB1') and the polyvinylidene fluoride (PVDF) as a carrier is shown in FIG. 13.

7.2.2. Membrane 2 Comprising Poly(Vinylidene Fluoride) as an Organic Polymeric Liquid Carrier The ink 2 obtained in section 7.1.2 was cast by Dr. Blade onto a flat glass plate, over a length of 125 mm, using a blade height of 2 mm (film thickness) and a speed of 3 cm per second. The resulting mixed matrix membrane (MMM) was dried at room temperature for 45 min and then at 65° C. for 4 h. The MMM was then delaminated with water.

7.3. Gas Separation Activity of Membranes

7.3.1 Gas Separation Activity of Membrane 1

Figure 14:
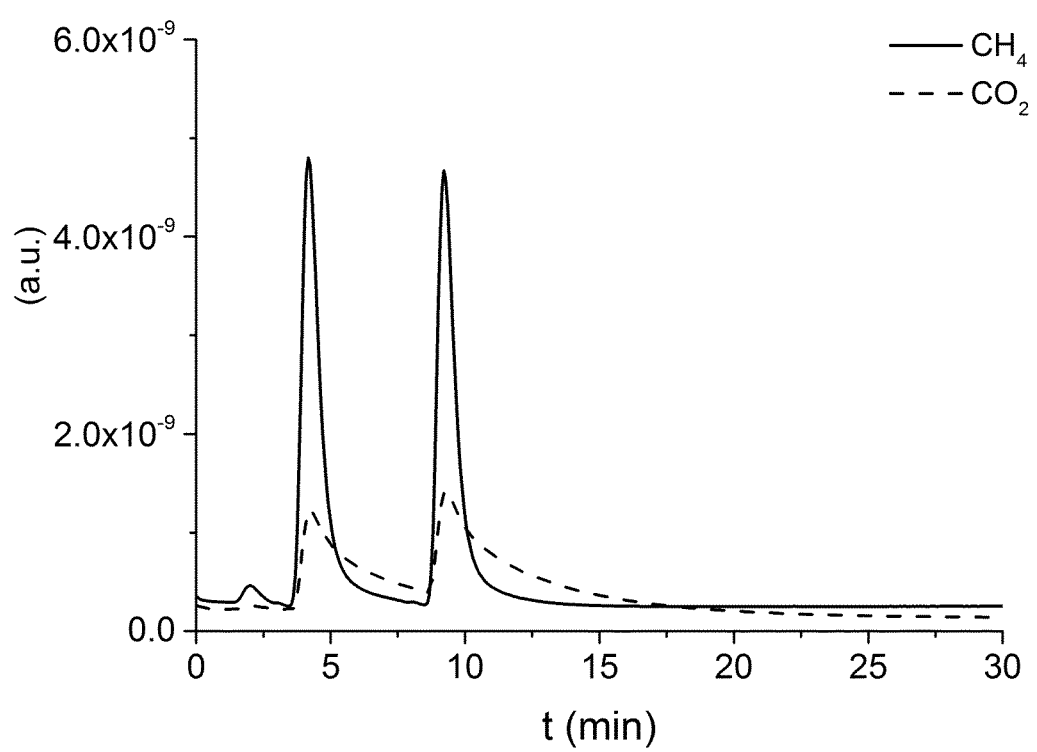
FIG. 14 shows the separation of an equimolar mixture of carbon dioxide and methane passing through a bed of the membrane 1 of the invention prepared from the "ink"1 which comprises the MOF having repeating units of formula (SS)-(IA1) at ambient pressure and at 30° C., wherein the carrier is polyvinylidene fluoride (PVDF). The exit gas was analysed with mass spectrometry as a function of time. The curves express intensity (a.u) versus time (min).

Following the method as defined in section 3.1; the capability of gas separation of membrane 1 was analysed.
An equimolar mixture of carbon dioxide and methane was passed through a bed of the membrane 1 at atmospheric pressure and at 30° C. The exit gas was analysed with mass spectrometry as a function of time. The retention times for carbon dioxide and methane were analysed (cf. FIG. 14).
The values of intensity and time of retention of CO$_2$ and methane show that a composition in form of a membrane having the MOFs of the present invention are capable of separating selectively the CO$_2$ even at room temperature.

7.3.2. Gas Separation Activity of Membrane 2

Figure 15:
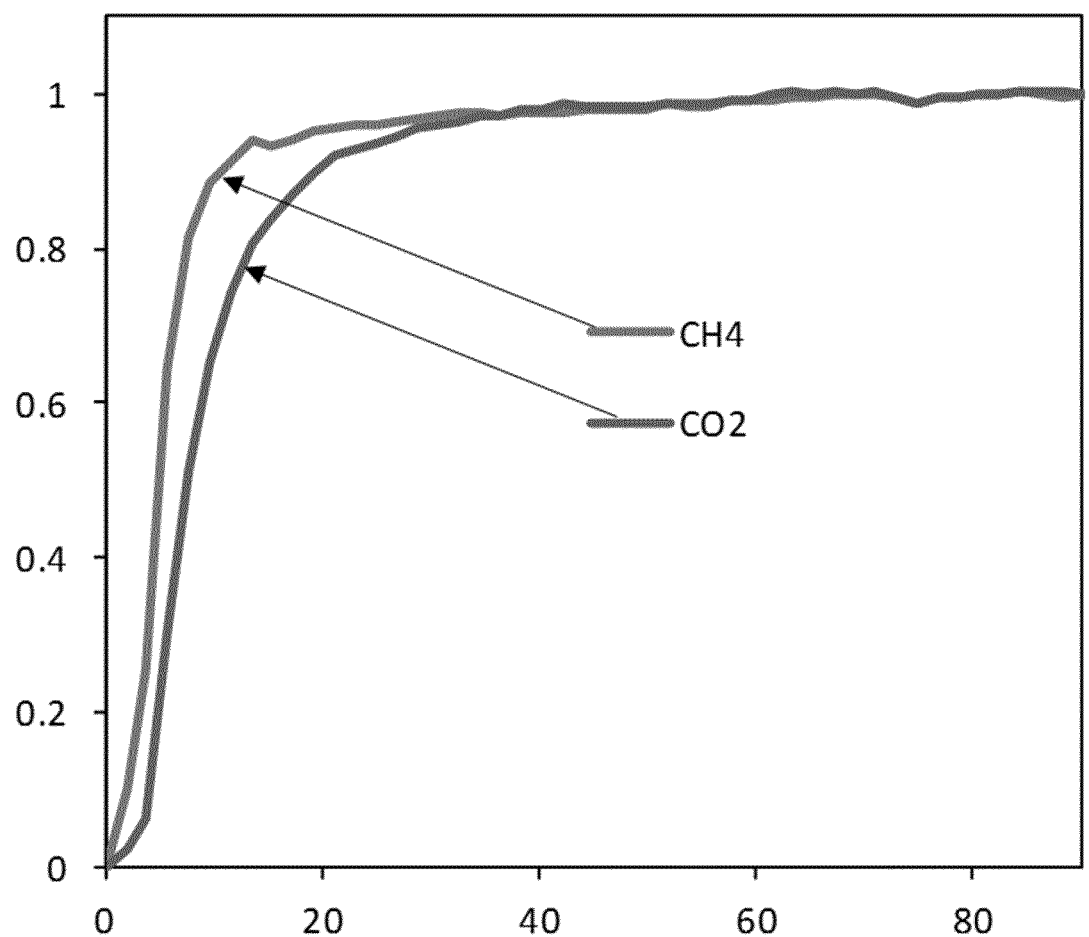
FIG. 15 shows the separation of an equimolar mixture of carbon dioxide and methane passing through a bed of the membrane 2 of the invention obtained in Example 7.2.2. at ambient pressure and at 30° C. The exit gas was analysed with mass spectrometry as a function of time. The curves express the ratio of the concentration of a gas over the initial concentration versus time (min).

Following the method as defined in section 3.1; the capability of gas separation of membrane 2 was analysed. An equimolar mixture of carbon dioxide and methane was passed through a bed of the membrane 2 at atmospheric pressure and at 30° C. The exit gas was analysed with mass spectrometry as a function of time. The concentration of each gas for carbon dioxide and methane were analysed as a function of time (cf. FIG. 15).
Membrane 2 is suitable for use in the separation of substances in gas phase comprising carbon dioxide, in particular for the separation of methane and carbon dioxide. Indeed, FIG. 15 shows that the time required for carbon dioxide to pass through a bed of membrane 2 is higher than the time required for methane to pass through it.

PRIOR ART DISCLOSED IN THE APPLICATION

1. S. Brunauer et al., "Adsorption of Gases in Multimolecular Layers", J. Am. Chem. Soc. 1938, vol. 60, pp. 309-319.
2. B. C. Lippens et al., "Studies on pore systems in catalysts: V. The t method", J. Catal. 1965, vol. 4, pp. 319-323.

3. G. M. Sheldrick, "A short history of SHELX", *Acta Cryst.* 2008, vol. A64, pp. 112-122.
4. C. B. Hübschle et al., "ShelXle: a Qt graphical user interface for SHELXL, *J. Appl. Cryst.,* 2011, vol 44, pp. 1281-1284.
5. R. K. Bartlett et al. "Transaminations of NN-dimethylformamide azine", *J. Chem. Soc. (C),* 1967, pp. 1664-1666.
6. D. Bradshaw et al., "Permanent Microporosity and Enantioselective Sorption in a Chiral Open Framework", *J. Am. Chem. Soc.,* 2004, vol. 126, pp. 6106-6114.
7. C. E. Harris et al., "Boranes in Synthesis. 6. A New Synthesis of .beta.-Amino Alcohols from Epoxides. Use of Lithium Amides and Aminoborane Catalysts To Synthesize .beta.-Amino Alcohols from Terminal and Internal Epoxides in High Yield", *J. Org. Chem.,* 1994, vol. 59 (25), pp. 7746-7751.
8. A. Mukherjee et al., "Gold-Catalyzed 1,2-Difunctionalizations of Aminoalkynes Using Only N- and O-Containing Oxidants", *J. Am. Chem. Soc,* 2011, Vol. 33 (39), pp 15372-15375.
9. M. S. Denny Jr et al., "In Situ Modification of Metal-Organic Frameworks in Mixed-Matrix Membranes" *Angew. Chem. Int. Ed.,* 2015, vol 54 (31), pp 9029-9032.

The invention claimed is:

1. A crystalline metal organic framework which comprises repeating units of formula (IA), or alternatively a crystalline metal organic framework which comprises repeating units of formula (IB), comprising a metal $M^{2+}$ and two ligands $L_1^-$

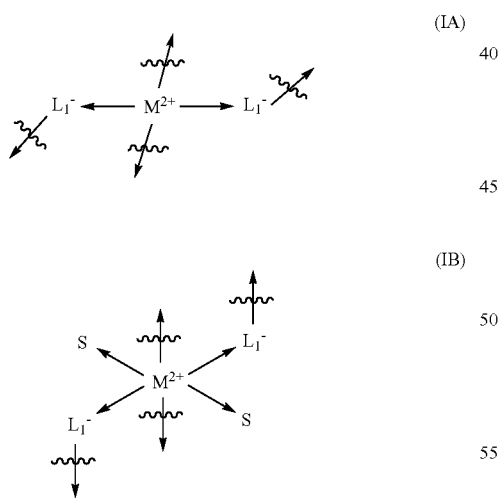

wherein:
the two ligands $L_1^-$ can be the same or different,
$M^{2+}$ is a divalent metal cation,
each $L_1^-$ is an anion independently selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II);

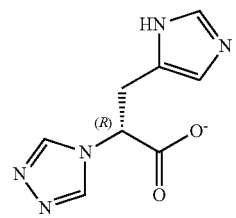

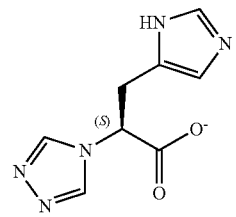

in the repeating unit of formula (IB), the metal M is coordinated to two solvent molecules S, both S are equal and are a solvent molecule selected from the group consisting of water, methanol, ethanol, isopropanol, tert-butanol, diethyl ether, 1,4-dioxane tetrahydrofuran, N,N-dimethylformamide, acetonitrile, acetone, 1,2-ethyleneglycol, dimethylsulfoxide and pyridine, → represents a coordination bond between the metal $M^{2+}$ and a nitrogen atom of each ligand $L_1^-$, wherein one of the coordination bonds is between the metal $M^{2+}$ and the nitrogen atom $N^1$ of one $L_1^-$, and the other coordination bond is between the metal $M^{2+}$ and the nitrogen atom $N^2$ of the other $L_1^-$, and between the metal $M^{2+}$ and the solvent molecules S; thereby the repeating unit has the formula (RR)-(IA), or alternatively, the formula (SS)-(IA)

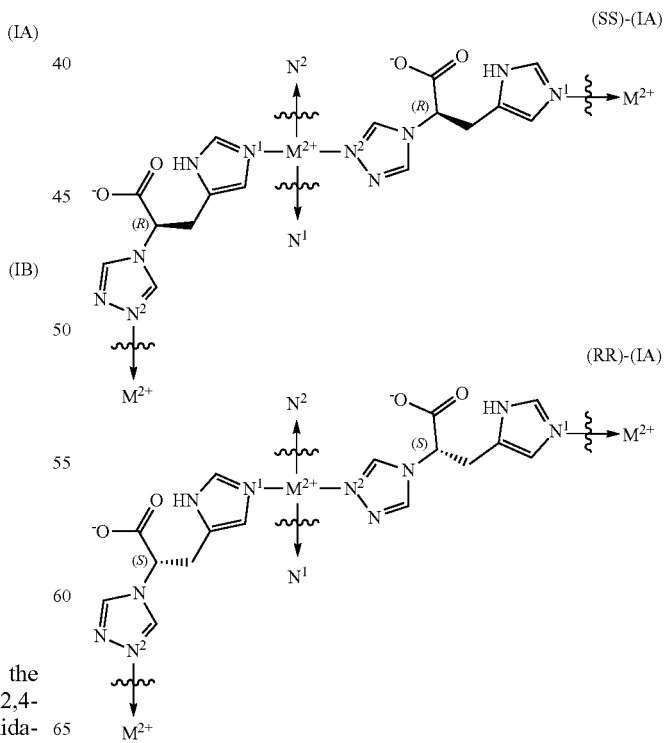

or alternatively, the formula (RS)-(IA), or alternatively, the formula (SR)-(IA)

or alternatively, the formula (RS)-(IB), or alternatively, the formula (SR)-(IB)

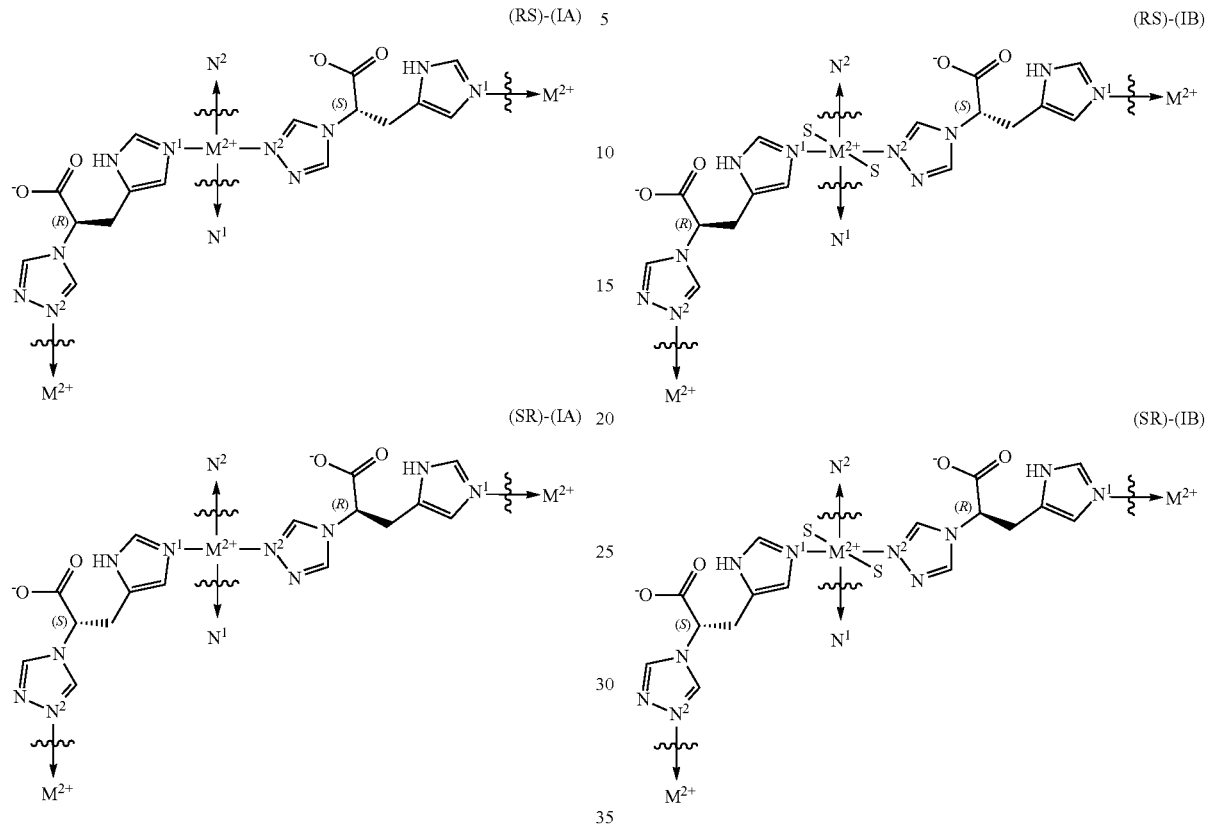

or alternatively, the formula (RR)-(IB), or alternatively, the formula (SS)-(IB)

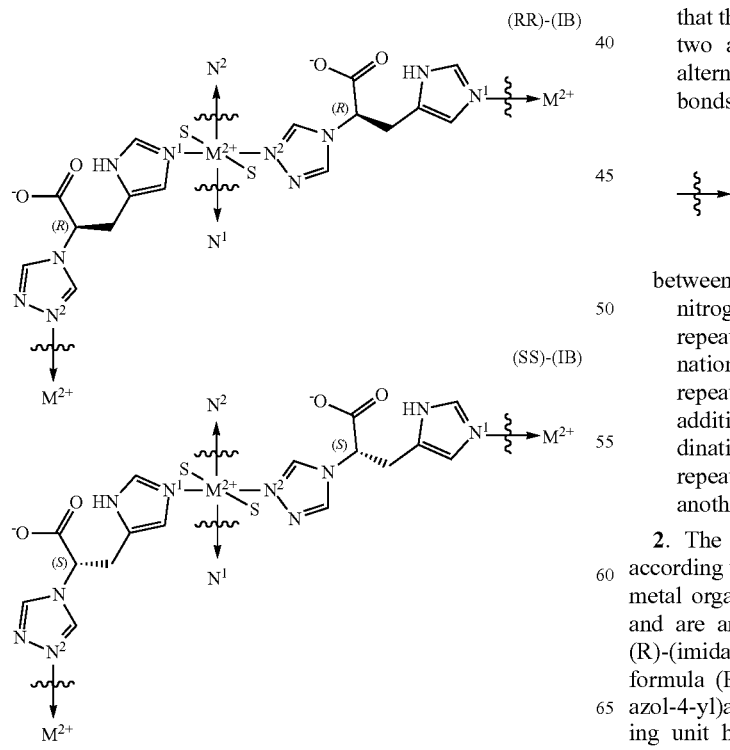

wherein each repeating unit in the metal organic framework is connected to other repeating units in such a way that the metal $M^{2+}$ of one repeating unit is connected to two additional repeating units of formula (IA), or alternatively of formula (IB), through coordination bonds represented by

between the metal $M^{2+}$ of the first repeating unit and the nitrogen atoms of the ligands $L_1^-$ of the additional repeating units, wherein one of the additional coordination bonds is between the metal $M^{2+}$ of the first repeating unit and the nitrogen atom $N^1$ of an $L_1^-$ of an additional repeating unit; and the other additional coordination bond is between the metal $M^{2+}$ of the first repeating unit and the nitrogen atom $N^2$ of an $L_1^-$ of another additional repeating unit.

2. The crystalline enriched metal organic framework according to claim 1, which is an enantiomerically enriched metal organic framework and wherein both $L_1^-$ are equal and are an anion selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II); and thereby the repeating unit has the formula (RR)-(IA) or alternatively, the formula (SS)-(IA)

(RR)-(IA)

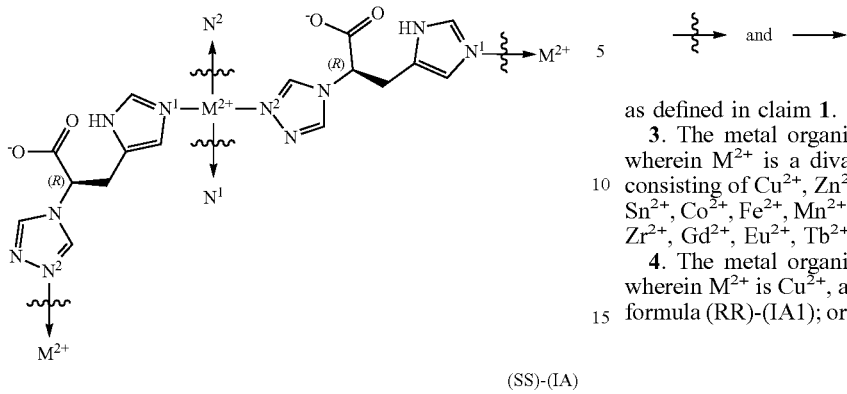

(SS)-(IA)

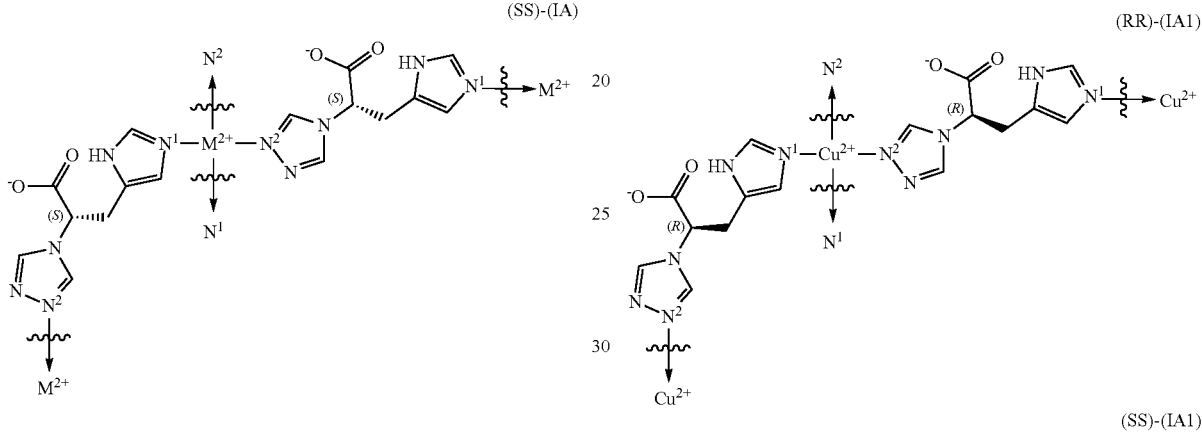

or alternatively the formula (RR)-(IB), or alternatively, the formula (SS)-(IB)

(RR)-(IB)

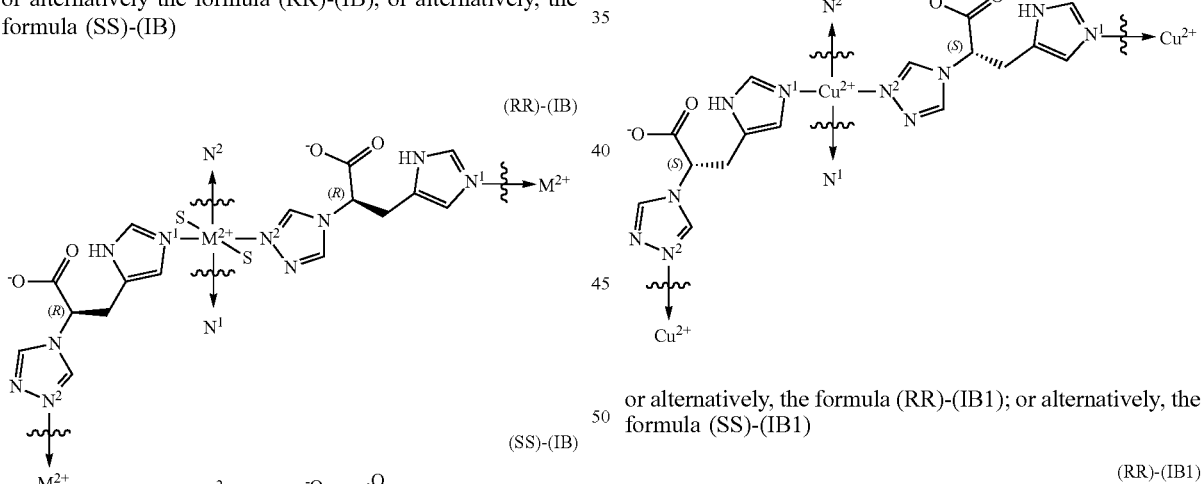

(SS)-(IB)

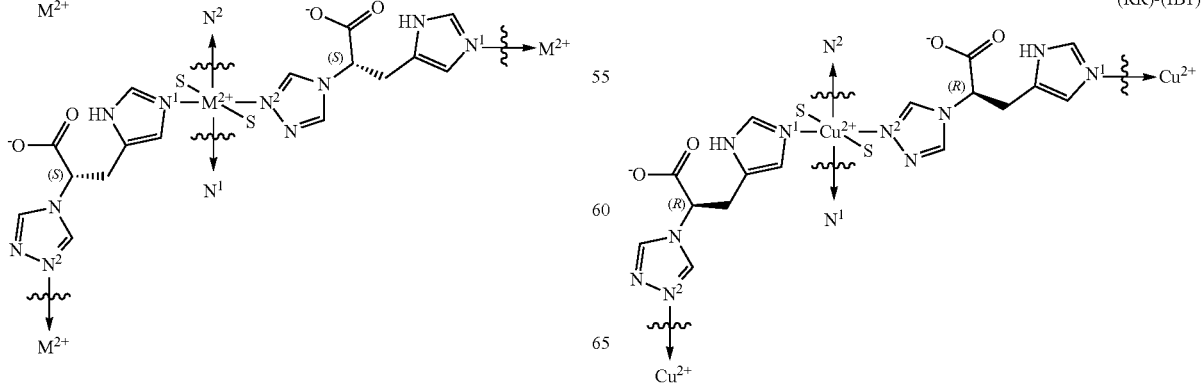

being $M^{2+}$, S, $$\text{\{---} \quad \text{and} \quad \longrightarrow$$

as defined in claim 1.

3. The metal organic framework according to claim 1, wherein $M^{2+}$ is a divalent metal selected from the group consisting of $Cu^{2+}$, $Zn^{2+}$, $V^{2+}$, $Pd^{2+}$, $Pt^{2+}$, $Ni^{2+}$, $Ru^{2+}$, $Hg^{2+}$, $Sn^{2+}$, $Co^{2+}$, $Fe^{2+}$, $Mn^{2+}$, $Cr^{2+}$, $Cd^{2+}$, $Be^{2+}$, $Mg^{2+}$, $Ca^{2+}$, $Ba^{2+}$, $Zr^{2+}$, $Gd^{2+}$, $Eu^{2+}$, $Tb^{2+}$ and mixtures thereof.

4. The metal organic framework according to claim 1, wherein $M^{2+}$ is $Cu^{2+}$, and thereby the repeating unit has the formula (RR)-(IA1); or alternatively, the formula (SS)-(IA1)

(RR)-(IA1)

(SS)-(IA1)

or alternatively, the formula (RR)-(IB1); or alternatively, the formula (SS)-(IB1)

(RR)-(IB1)

-continued (SS)-(IB1)

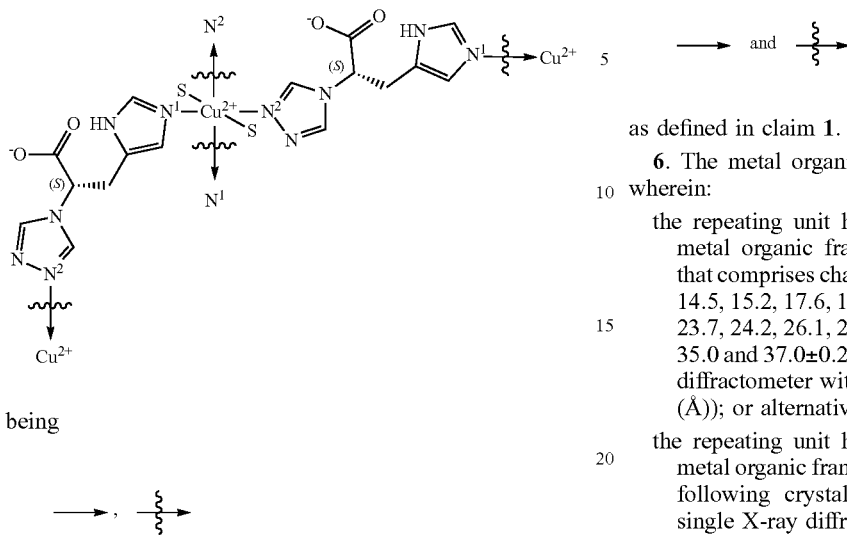

being

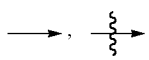

and S as defined in claim 1.

5. The metal organic framework according to claim 1, which is an enantiomerically enriched metal organic framework and wherein:
both $L_1^-$ are equal and are an anion selected from the group consisting of (R)-(imidazole-5-ylmethyl)-(1,2,4-triazol-4-yl)acetate of formula (R)-(II) and (S)-(imidazole-5-ylmethyl)-(1,2,4-triazol-4-yl)acetate of formula (S)-(II); $M^{2+}$ is $Cu^{2+}$ and both S are a water molecule, and thereby the repeating unit has the formula (RR)-(IB1'); or alternatively, the formula (SS)-(IB1')

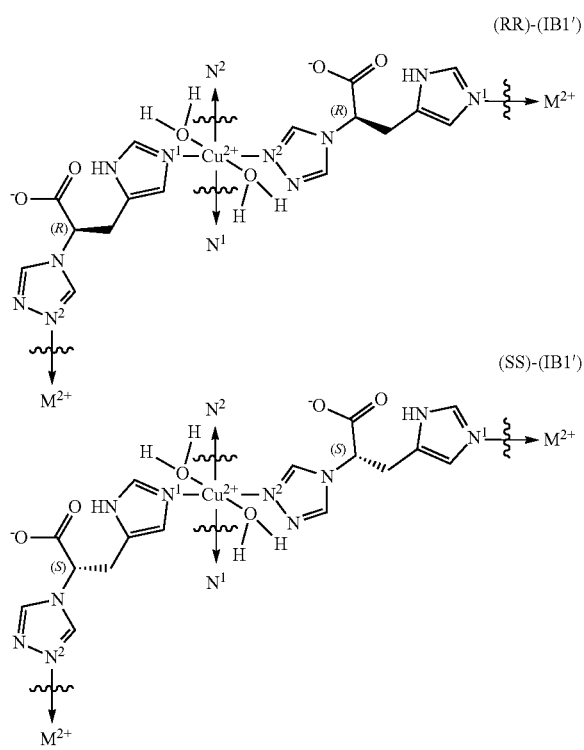

being

→ , -ξ- as defined in claim 1.

6. The metal organic framework according to claim 5, wherein:
the repeating unit has the formula (SS)-(IB1') and the metal organic framework has a X-ray diffractogram that comprises characteristic peaks at 6.2, 7.6, 9.8, 10.7, 14.5, 15.2, 17.6, 18.1, 19.2, 19.7, 20.2, 20.6, 22.5, 22.9, 23.7, 24.2, 26.1, 27.2, 28.3, 30.0, 32.6, 33.2, 33.5, 34.1, 35.0 and 37.0±0.2 degrees 2 theta measured in an X-ray diffractometer with Cu Kα radiation (1.5406*$10^{-10}$ m (Å)); or alternatively
the repeating unit has the formula (SS)-(IB1') and the metal organic framework is characterized by having the following crystallographic parameters measured by single X-ray diffraction:

Crystal system: cubic;
Space group: P4(3)/32;
Unit cell dimensions: a = 20.172(2) * $10^{-10}$ m (Å) α = 90°,
b = 20.172(2) * $10^{-10}$ m (Å) β = 90°,
c = 20.172(2) * $10^{-10}$ m (Å) γ = 90°;
Volume: 8208(2) * $10^{-10}$ m³(Å); and
Density: 1.359 Mg/m³.

7. The metal organic framework according to claim 5, wherein
the repeating unit has the formula (SS)-(IA1) and the metal organic framework has a BET surface area from 250 to 1800 m²/g; or alternatively
the repeating unit has the formula (SS)-(IA1) and the metal organic framework has a pore volume from 0.10 to 0.70 cm³/g; or alternatively
the repeating unit has the formula (SS)-(IA1) and the metal organic framework has a BET surface area from 850 to 1050 m²/g and a pore volume from 0.30 to 0.40 cm³/g.

8. A process for the preparation of a metal organic framework as defined in claim 1, having repeating units of formula (RR)-(IB) or alternatively, of formula (SS)-(IB) or alternatively, of formula (RS)-(IB) or alternatively, of formula (SR)-(IB) which comprises:
(a) adding a solution of a solvent S and of a salt of formula $MA_2$ to a solution of a solvent S and of the compound (R)-(imidazol-5-ylmethyl)-(1,2,4-triazol-4-yl)acetic acid of formula (R)-(III); or alternatively, of the compound (5)-(imidazol-5-ylmethyl)-(1,2,4-triazol-4-yl) acetic acid of formula (S)-(III);

(R)-(III)

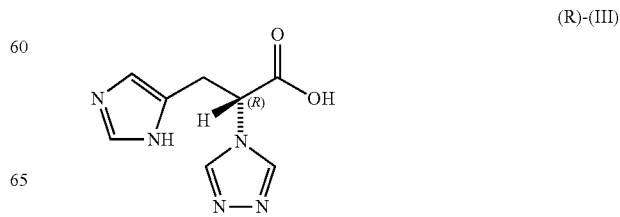

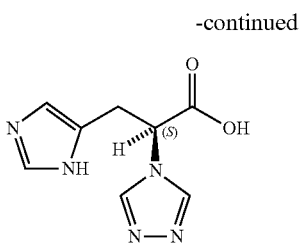

(S)-(III)

or alternatively, of a mixture of the compound (R)-(imidazol-5-ylmethyl)-(1,2,4-triazol-4-yl)acetic acid of formula (R)-(III) and (S)-(imidazol-5-ylmethyl)-(1,2,4-triazol-4-yl)acetic acid of formula (S)-(III); wherein S is as defined in claim 1 and the pH of the aqueous solution of the compound of formula (R)-(III); or alternatively, of the compound of formula (S)-(III) or alternatively, of the mixture of the compound of formula (R)-(III) and (S)-(III) is comprised from 4 to 7;

(b) maintaining the solution obtained in step (a) at a temperature comprised from 20° C. to 35° C. for the necessary period of time to crystallize the metal organic framework; and (c) isolating the metal organic framework thus obtained, wherein:

M is the divalent metal cation $M^{2+}$ as defined in claim 1; and

A is a monovalent anion $A^-$ selected from the group consisting of an organic anion and an inorganic anion.

9. A process for the preparation of a metal organic framework as defined in claim 8, having:

repeating units of formula (RR)-(IA) or alternatively, of formula (SS)-(IA) or alternatively, of formula (RS)-(IA) or alternatively of formula (SR)-(IA) which comprises:

(d) submitting the metal organic framework having repeating units of formula (RR)-(IB); or alternatively of formula (SS)-(IB), or alternatively of formula (RS)-(IB); or alternatively of formula (SR)-(IB) at such reaction conditions to remove at least both solvent molecules S; or repeating units of formula (RR)-(IB) or alternatively, of formula (SS)-(IB) or alternatively, of formula (RS)-(IB) or alternatively of formula (SR)-(IB) which comprises:

(f) contacting the metal organic framework having repeating units of formula (RR)-(IA); or alternatively of formula (SS)-(IA) or alternatively, of formula (RS)-(IA) or alternatively, of formula (SR)-(IA) with solvent S as defined in claim 1 and under such reaction conditions to coordinate the two solvent molecules S to the metal.

10. A composition comprising a metal organic framework as defined in claim 1 and one or more carriers.

11. The composition according to claim 10, wherein the carrier is a porous solid carrier selected from the group consisting of a porous organic solid carrier and a porous inorganic solid carrier.

12. The composition according to claim 10, wherein the carrier is a porous polymeric organic carrier:

selected from the group consisting of poly(vinylesters), poly(ethylenimine), polyimides, polysulfones, poly(methyl methacrylate), poly(vinylacetate), poly(pyrroles), poly(acetylenes), poly(thiophenes); or alternatively selected from the group consisting of polyvinylidene fluoride (PVDF), poly(methyl methacrylate) (PMMA), 5(6)-amino-1-(4' aminophenyl)-1,3,-trimethylindane, poly(ethylenimine) (PEI) and polyvinyl acetate (PVAc).

13. The composition according to claim 12, wherein the carrier is polyvinylidene fluoride (PVDF).

14. The composition according to claim 10, which comprises from 20% to 90% by weight of the metal organic framework in relation to the total weight of the composition.

15. The composition according to claim 14, which comprises from 60% to 70% by weight of the metal organic framework in relation to the total weight of the composition.

* * * * *